(12) United States Patent
Kato et al.

(10) Patent No.: US 7,477,833 B2
(45) Date of Patent: Jan. 13, 2009

(54) INFORMATION PROCESSING APPARATUS AND METHOD, PROGRAM, AND RECORDED MEDIUM SPECIFYING PARTICULAR PICTURE CHARACTERISTICS

(75) Inventors: Motoki Kato, Kanagawa (JP); Toshiya Hamada, Saitama (JP)

(73) Assignee: Sony Corporation, Tokyo (JP)

( * ) Notice: Subject to any disclaimer, the term of this patent is extended or adjusted under 35 U.S.C. 154(b) by 1245 days.

(21) Appl. No.: 10/018,838

(22) PCT Filed: Apr. 20, 2001

(86) PCT No.: PCT/JP01/03414

§ 371 (c)(1),
(2), (4) Date: Jun. 10, 2002

(87) PCT Pub. No.: WO01/82608

PCT Pub. Date: Nov. 1, 2001

(65) Prior Publication Data

US 2005/0019007 A1      Jan. 27, 2005

(30) Foreign Application Priority Data

Apr. 21, 2000  (JP)  ............... 2000-183770
Sep. 5, 2000   (JP)  ............... 2000-268043

(51) Int. Cl.
  *H04N 5/00*   (2006.01)
  *H04N 5/91*   (2006.01)
  *H04N 5/93*   (2006.01)
  *H04N 9/64*   (2006.01)
  *G11B 27/00*  (2006.01)

(52) U.S. Cl. .............. 386/125; 386/95; 386/126; 386/52; 386/55; 386/69; 369/83; 348/700; 348/701; 348/702

(58) Field of Classification Search ............ 386/55, 386/52, 69–70, 95, 125–126; 715/723; 369/83; 348/700–702
See application file for complete search history.

(56) References Cited

U.S. PATENT DOCUMENTS

| | | | | |
|---|---|---|---|---|
| 5,537,528 A | * | 7/1996 | Takahashi et al. | ............ 715/512 |
| 5,642,174 A | * | 6/1997 | Kazui et al. | ................. 348/700 |
| 6,353,702 B1 | * | 3/2002 | Ando et al. | .................... 386/95 |
| 6,556,773 B2 | * | 4/2003 | Tsumagari et al. | ............ 386/95 |
| 6,580,872 B1 | * | 6/2003 | Kikuchi et al. | ................. 386/95 |

FOREIGN PATENT DOCUMENTS

| | | |
|---|---|---|
| EP | 0 910 087 | 4/1999 |
| EP | 1 089 565 | 4/2001 |
| JP | 10-290432 | 10/1998 |
| JP | 11-273227 | 10/1999 |
| JP | 2000-341646 | 12/2000 |

* cited by examiner

*Primary Examiner*—Thai Tran
*Assistant Examiner*—Daquan Zhao
(74) *Attorney, Agent, or Firm*—Frommer Lawrence & Haug LLP; William S. Frommer; Thomas F. Presson

(57) ABSTRACT

An information processing apparatus includes a generating unit for generating ClipMark formed by a mark specifying a characteristic picture extracted from an input AV stream, as management information for supervising the AV stream, and for generating PlayListMark, formed by marks pointing to a picture optionally specified by a user, from a reproduction domain corresponding to the PlayList defining the combination of preset domains in the AV stream, and a recording unit for recording the ClipMark and PlayListMark as respective independent tables on a recording medium. With the information processing apparatus, it is possible to access a desired location of an AV stream promptly and reliably.

20 Claims, 118 Drawing Sheets

| SYNTAX | NUMBER OF BYTES | ABBREVIATION |
|---|---|---|
| info.dvr { | | |
| TableOfPlayLists_Start_address | 32 | uimsbf |
| MakersPrivateData_Start_address | 32 | uimsbf |
| reserved | 192 | bslbf |
| DVRVolume() | | |
| for (i=0;i<N1;i++){ | | |
| padding_word | 16 | bslbf |
| } | | |
| TableOfPlayLists() | | |
| for (i=0;i<N2;i++){ | | |
| padding_word | 16 | bslbf |
| } | | |
| MakersPrivateData() | | |
| } | | |

FIG.15

| SYNTAX | NUMBER OF BYTES | ABBREVIATION |
|---|---|---|
| DVRVolume(){ | | |
|     version_number | 8*4 | bslbf |
|     length | 32 | uimsbf |
|     ResumeVolume() | | |
|     UIAppInfoVolume() | | |
| } | | |

FIG.16

| SYNTAX | NUMBER OF BYTES | ABBREVIATION |
|---|---|---|
| ResumeVolume() { | | |
| reserved | 15 | bslbf |
| valid_flag | 1 | bslbf |
| resume_PlayList_name | 8*10 | bslbf |
| } | | |

FIG.17

| SYNTAX | NUMBER OF BYTES | ABBREVIATION |
|---|---|---|
| UIAppInfoVolume(){ | | |
| character_set | 8 | bslbf |
| name_length | 8 | uimsbf |
| Volume_name | 8*256 | bslbf |
| reserved | 15 | bslbf |
| Volume_protect_flag | 1 | bslbf |
| PIN | 8*4 | bslbf |
| ref_thumbnail_index | 16 | uimsbf |
| reserved_for_future_use | 256 | bslbf |
| } | | |

FIG.18

| VALUE | CHARACTER LETTER ENCODING |
|---|---|
| 0x00 | Reserved |
| 0x01 | ISO/IEC 646 (ASCII) |
| 0x02 | ISO/IEC 10646-1 (Unicode) |
| 0x03-0xff | Reserved |

FIG.19

| SYNTAX | NUMBER OF BYTES | ABBREVIATION |
|---|---|---|
| TableOfPlayLists(){ | | |
|     version_number | 8*4 | bslbf |
|     length | 32 | uimsbf |
|     number_of_PlayLists | 16 | uimsbf |
|     for (i=0; i<*number_of_PlayLists*; i++){ | | |
|         PlayList_file_name | 8*10 | bslbf |
|     } | | |
| } | | |

FIG.20

| SYNTAX | NUMBER OF BYTES | ABBREVIATION |
|---|---|---|
| TableOfPlayLists(){ | | |
|     version_number | 8*4 | bslbf |
|     length | 32 | uimsbf |
|     number_of_PlayLists | 16 | uimsbf |
|     for (i=0; i<*number_of_PlayLists*; i++){ | | |
|         PlayList_file_name | 8*10 | bslbf |
|         UIAppInfoPlayList() | | |
|     } | | |
| } | | |

FIG.21

| SYNTAX | NUMBER OF BYTES | ABBREVIATION |
|---|---|---|
| MakersPrivateData(){ | | |
|     version_number | 8*4 | bslbf |
|     length | 32 | uimsbf |
|     if (length !=0){ | | |
|         mpd_blocks_start_address | 32 | uimsbf |
|         number_of_maker_entries | 16 | uimsbf |
|         mpd_block_size | 16 | uimsbf |
|         number_of_mpd_blocks | 16 | uimsbf |
|         reserved | 16 | bslbf |
|         for (i=0; i<*number_of_maker_entries*; i++){ | | |
|             maker_ID | 16 | uimsbf |
|             maker_model_code | 16 | uimsbf |
|             start_mpd_block_number | 16 | uimsbf |
|             reserved | 16 | bslbf |
|             mpd_length | 32 | uimsbf |
|         } | | |
|         stuffing_bytes | 8*2*L1 | bslbf |
|         for(j=0; j<*number_of_mpd_blocks*; j++){ | | |
|             mpd_block | mpd_block_size*1024*8 | |
|         } | | |
|     } | | |
| } | | |

FIG.22

| SYNTAX | NUMBER OF BYTES | ABBREVIATION |
|---|---|---|
| xxxxx.rpls / yyyyy.vpls { | | |
|     PlayListMark_Start_address | 32 | uimsbf |
|     MakersPrivateData_Start_address | 32 | uimsbf |
|     reserved | 192 | bslbf |
|     PlayList() | | |
|     for (i=0;i<N1;i++){ | | |
|         padding_word | 16 | bslbf |
|     } | | |
|     PlayListMark() | | |
|     for (i=0;i<N2;i++){ | | |
|         padding_word | 16 | bslbf |
|     } | | |
|     MakersPrivateData() | | |
| } | | |

FIG.23

| SYNTAX | NUMBER OF BYTES | ABBREVIATION |
|---|---|---|
| PlayList(){ | | |
|     version_number | 8*4 | bslbf |
|     length | 32 | uimsbf |
|     PlayList_type | 8 | uimsbf |
|     CPI_type | 1 | bslbf |
|     reserved | 7 | bslbf |
|     UIAppInfoPlayList() | | |
|     number_of_PlayItems    // main path | 16 | uimsbf |
|     if (<Vertual PlayList>){ | | |
|         number_of_SubPlayItems  // sub path | 16 | uimsbf |
|     }else{ | | |
|         reserved | 16 | bslbf |
|     } | | |
|     for (PlayItem_id=0;<br>        PlayItem_id<nymber_of_PlayItems;<br>        PlayItem_id++){ | | |
|         PlayItem()    //main path | | |
|     } | | |
|     if (<Virtual PlayList>){ | | |
|         if (CPI_type==0 && PlayList_type==0){ | | |
|             for (i=0; i<number_of_SubPlayItems; i++) | | |
|             SubPlayItem()    //sub path | | |
|         } | | |
|     } | | |
| } | | |

FIG.25

| PlayList_type | MEANING |
|---|---|
| 0 | PLAY LIST FOR AV RECORDING<br>ALL CLIPS REFERENCED IN THIS PLAY LIST MUST CONTAIN ONE OR MORE VIDEO STREAMS |
| 1 | PLAY LIST FOR AUDIO RECORDING<br>ALL CLIPS REFERENCED IN THIS PLAYLIST MUST CONTAIN ONE OR MORE AUDIO STREAMS AND MUST NOT CONTAIN VIDEO STREAMS |
| 2-255 | reserved |

FIG.26

| SYNTAX | NUMBER OF BYTES | ABBREVIATION |
|---|---|---|
| UIAppInfoPlayList2(){ | | |
|     character_set | 8 | bslbf |
|     name_length | 8 | uimsbf |
|     PlayList_name | 8*256 | bslbf |
|     reserved | 8 | bslbf |
|     record_time_and_date | 4*14 | bslbf |
|     reserved | 8 | bslbf |
|     duration | 4*6 | bslbf |
|     valid_period | 4*8 | bslbf |
|     maker_id | 16 | uimsbf |
|     maker_code | 16 | uimsbf |
|     reserved | 11 | bslbf |
|     playback_control_flag | 1 | bslbf |
|     write_protect_flag | 1 | bslbf |
|     is_played_flag | 1 | bslbf |
|     archive | 2 | bslbf |
|     ref_thumbnail_index | 16 | uimsbf |
|     reserved_for_future_use | 256 | bslbf |
| } | | |

FIG.27

| write_protect_flag | MEANING |
|---|---|
| 0b | THE PlayList CAN BE ERASED FREELY |
| 1b | THE PlayList CONTENTS SHOULD NOT BE ERASED NOR CHANGED EXCEPT write-protect-flag |

FIG.28A

| is_played_flag | MEANING |
|---|---|
| 0b | THE PlayList HAS NOT BEEN REPRODUCED SINCE ITS RECORDING |
| 1b | THE PlayList WAS ONCE REPRODUCED SINCE ITS RECORDING |

FIG.28B

| archive | MEANING |
|---|---|
| 00b | NO MEANING DEFINED |
| 01b | ORIGINAL |
| 10b | COPY |
| 11b | reserved |

FIG.28C

| SYNTAX | NUMBER OF BYTES | ABBREVIATION |
|---|---|---|
| PlayItem(){ | | |
|     Clip_information_file_name | 8*10 | bslbf |
|     reserved | 24 | bslbf |
|     STC_sequence_id | 8 | uimsbf |
|     IN_time | 32 | uimsbf |
|     OUT_time | 32 | uimsbf |
|     reserved | 14 | bslbf |
|     connection_condition | 2 | bslbf |
|     if (<Virtual PlayList>){ | | |
|         if (*connection_condition*=='*10*'){ | | |
|             BridgeSequenceInfo() | | |
|         } | | |
|     } | | |
| } | | |

FIG.32

| CPI_type in the PlayList() | SEMANTICS OF IN_time |
|---|---|
| EP_map type | IN_time MUST INDICATE UPPER 32 BITS OF 33 BIT LENGTH CORRESPONDING TO FIRST PRESENTATION UNIT IN PlayItem |
| TU_map type | IN_time MUST BE TIME ON TU_map_time_axis, AND MUST BE ROUNDED TO time_unit PRECISION. IN-time IS CALCULATED BY FOLLOWING EQUATION: $$IN\_time = TU\_start\_time \%2^{32}$$ |

FIG.33

| CPI_type in the PlayList() | SEMANTICS OF OUT_time |
|---|---|
| EP_map type | OUT_time MUST INDICATE UPPER 32 BITS OF THE VALUE OF Presentation_end_TS CALCULATED BY FOLLOWING EQUTION:<br>$$Presentation\_end\_TS = PTS\_out + AU\_duration$$<br>WHERE PTS_out IS 33-BIT LONG PTS CORRESPONDING TO LAST PRESENTATION UNIT IN PlayItem. AU_duration IS 90 kHz-DISPLAY TIME OF LAST PRESENTATION UNIT. |
| TU_map type | OUT_time MUST BE TIME ON TU_map_time_axis AND BE ROUNDED TO time_unit PRECISION. OUT_time IS CALCULATED BY FOLLOWING EQUATION:<br>$$OUT\_time = TU\_start\_time \,\%\, 2^{32}$$ |

FIG.34

| connection _condition | MEANING |
|---|---|
| 00 | · CONNECTION OF PREVIOUS PlayItem TO CURRENT PlayItem IS NOT SURE AS TO SEAMLESS REPLAY.<br>· IF CPI_type OF PlayList IS TU_map type, THIS VALUE MUST BE SET IN connection_condition. |
| 01 | · THIS STATE IS ALLOWED ONLY WHEN CPI_type OF PlayList IS EP_map type.<br>· PREVIOUS PlayItem AND CURRENT PlayItem INDICATE DIVISION BECAUSE OF NON-CONTINUOUS POINT OF SYSTEM TIMEBASE (STC BASE). |
| 10 | · THIS STATE IS ALLOWED ONLY WHEN CPI_type OF PlayList IS EP_map type.<br>· THIS STATE IS ALLOWED ONLY FOR Virtual PlayList.<br>· CONNECTION OF PREVIOUS PlayItem TO CURRENT PlayItem IS SURE AS TO SEAMLESS REPLAY.<br>· PREVIOUS PlayItem IS CONNECTED TO CURRENT PlayItem USING BridgeSequence. DVR MPEG-2 TRANSPORT STREAM MUST OBEY DVR-STD AS LATER DESCRIBED. |
| 11 | · THIS STATE IS ALLOWED ONLY WHEN CPI_type OF PlayList IS EP_map type.<br>· CONNECTION OF PREVIOUS PlayItem TO CURRENT Play Item IS SURE AS TO SEAMLESS REPLAY.<br>· PREVIOUS PlayItem IS CONNECTED TO CURRENT PlayItem WITHOUT USING BridgeSequence. DVR MPEG-2 TRANSPORT STREAM MUST OBEY DVR-STD AS LATER DESCRIBED. |

FIG.35 connection_condition='00' connection_condition='01' connection_condition='10' connection_condition='11'

| SYNTAX | NUMBER OF BYTES | ABBREVIATION |
|---|---|---|
| BridgeSequenceInfo() { | | |
|     Bridge_Clip_information_file_name | 8*10 | bslbf |
|     RSPN_exit_from_previous_Clip | 32 | uimsbf |
|     RSPN_enter_to_current_Clip | 32 | uimsbf |
| } | | |

FIG.38

| SYNTAX | NUMBER OF BYTES | ABBREVIATION |
|---|---|---|
| SubPlayItem () { | | |
|     Clip_Information_file_name | 8*10 | bslbf |
|     SubPath_type | 8 | bslbf |
|     sync_PlayItem_id | 8 | uimsbf |
|     sync_start_PTS_of_PlayItem | 32 | uimsbf |
|     SubPath_IN_time | 32 | uimsbf |
|     SubPath_OUT_time | 32 | uimsbf |
| } | | |

FIG.40

| SubPath_type | MEANING |
|---|---|
| 0x00 | Auxiliary audio steam path |
| 0x01-0xff | reserved |

FIG.41

| SYNTAX | NUMBER OF BYTES | ABBREVIATION |
|---|---|---|
| PlayListMark(){ | | |
|     version_number | 8*4 | bslbf |
|     length | 32 | uimsbf |
|     number_of_PlayList_marks | 16 | uimsbf |
|     for (i=0;i<*number_of_PlayList_marks*;i++){ | | |
|         reserved | 8 | bslbf |
|         mark_type | 8 | bslbf |
|         mark_time_stamp | 32 | uimsbf |
|         PlayItem_id | 8 | uimsbf |
|         reserved | 24 | uimsbf |
|         character_set | 8 | bslbf |
|         name_length | 8 | uimsbf |
|         mark_name | 8*256 | bslbf |
|         ref_thumbnail_index | 16 | uimsbf |
|     } | | |
| } | | |

FIG.42

| Mark_type | MEANING | COMMENT |
|---|---|---|
| 0x00 | resume-mark | REPLAY RESUME POINT. THE NUMBER OF REPLAY RESURE POINTS DEFINED IN PlayListMark() MUST BE 0 OR 1. |
| 0x01 | book-mark | REPLAY ENTRY POINT OF PlayList. THIS MARK CAN BE SET BY USER AND USED AS MARK SPECIFYING START POINT OF FAVORITE SCENE. |
| 0x02 | skip-mark | SKIP MARK POINT. PLAYER SKIPS PROGRAM FROM THIS POINT TO THE END OF PROGRAM. THE NUMBER OF SKIP MARK POINTS DEFINED IN PlayListMark() MUST BE 0 RO 1. |
| 0x03-0x8F | reserved | |
| 0x90-0xFF | reserved | Reserved for ClipMark() |

FIG.43

| CPI_type in the PlayList() | SEMANTICS OF mark_time_stamp |
|---|---|
| EP_map type | mark_time_stamp MUST INDICATE UPPER 32 BITS OF 33 BIT LENGTH PTS CORRESPONDING TO PRESENTATION UNIT REFERENCED BY MARK. |
| TU_map type | mark_time_stamp MUST BE TIME ON TU_map_time_axis AND MUST BE ROUNDED TO time_unit PRECISION. mark_time_stamp IS·CALCULATED BY FOLLOWING EQUATION:<br><br>$\text{mark\_time\_stamp} = \text{TU\_start\_time} \% 2^{32}$ |

FIG.44

| SYNTAX | NUMBER OF BYTES | ABBREVIATION |
|---|---|---|
| zzzzz.clpi { | | |
|     STC_Info_Start_address | 32 | uimsbf |
|     ProgramInfo_Start_address | 32 | uimsbf |
|     CPI_Start_address | 32 | uimsbf |
|     ClipMark_Start_address | 32 | uimsbf |
|     MakersPrivateData_Start_address | 32 | uimsbf |
|     reserved | 96 | bslbf |
|     ClipInfo() | | |
|     for (i=0;i<N1;i++){ | | |
|         padding_word | 16 | bslbf |
|     } | | |
|     STC_Info() | | |
|     for (i=0;i<N2;i++){ | | |
|         padding_word | 16 | bslbf |
|     } | | |
|     ProgramInfo() | | |
|     for (i=0;i<N3;i++){ | | |
|         padding_word | 16 | bslbf |
|     } | | |
|     CPI() | | |
|     for (i=0;i<N4;i++){ | | |
|         padding_word | 16 | bslbf |
|     } | | |
|     ClipMark() | | |
|     for (i=0;i<N5;i++){ | | |
|         padding_word | 16 | bslbf |
|     } | | |
|     MakersPrivateData() | | |
| } | | |

FIG.45

| SYNTAX | NUMBER OF BYTES | ABBREVIATION |
|---|---|---|
| ClipInfo() { | | |
|     version_number | 8*4 | bslbf |
|     length | 32 | uimsbf |
|     Clip_stream_type | 8 | bslbf |
|     offset_SPN | 32 | uimsbf |
|     TS_recording_rate | 24 | uimsbf |
|     reserved | 8 | bslbf |
|     record_time_and_date | 4*14 | bslbf |
|     reserved | 8 | bslbf |
|     duration | 4*6 | bslbf |
|     reserved | 7 | bslbf |
|     time_controlled_flag | 1 | bslbf |
|     TS_average_rate | 24 | uimsbf |
|     *if(Clip_stream_type==1) // Bridge-Clip AV stream* | | |
|         RSPN_arrival_time_discontinuity | 32 | uimsbf |
|     else | | |
|         reserved | 32 | bslbf |
|     reserved_for_system_use | 144 | bslbf |
|     reserved | 11 | bslbf |
|     is_format_identifier_valid | 1 | bslbf |
|     is_original_network_ID_valid | 1 | bslbf |
|     is_transport_stream_ID_valid | 1 | bslbf |
|     is_service_ID_valid | 1 | bslbf |
|     is_country_code_valid | 1 | bslbf |
|     format_identifier | 32 | bslbf |
|     original_network_ID | 16 | uimsbf |
|     transport_stream_ID | 16 | uimsbf |
|     service_ID | 16 | uimsbf |
|     country_code | 24 | bslbf |
|     stream_format_name | 16*8 | bslbf |
|     reserved_for_fortune_use | 256 | bslbf |
| } | | |

FIG.46

| Clip_stream_type | MEANING |
|---|---|
| 0 | Clip AV STREAM |
| 1 | Bridge-Clip AV STREAM |
| 2-255 | Reserved |

FIG.47

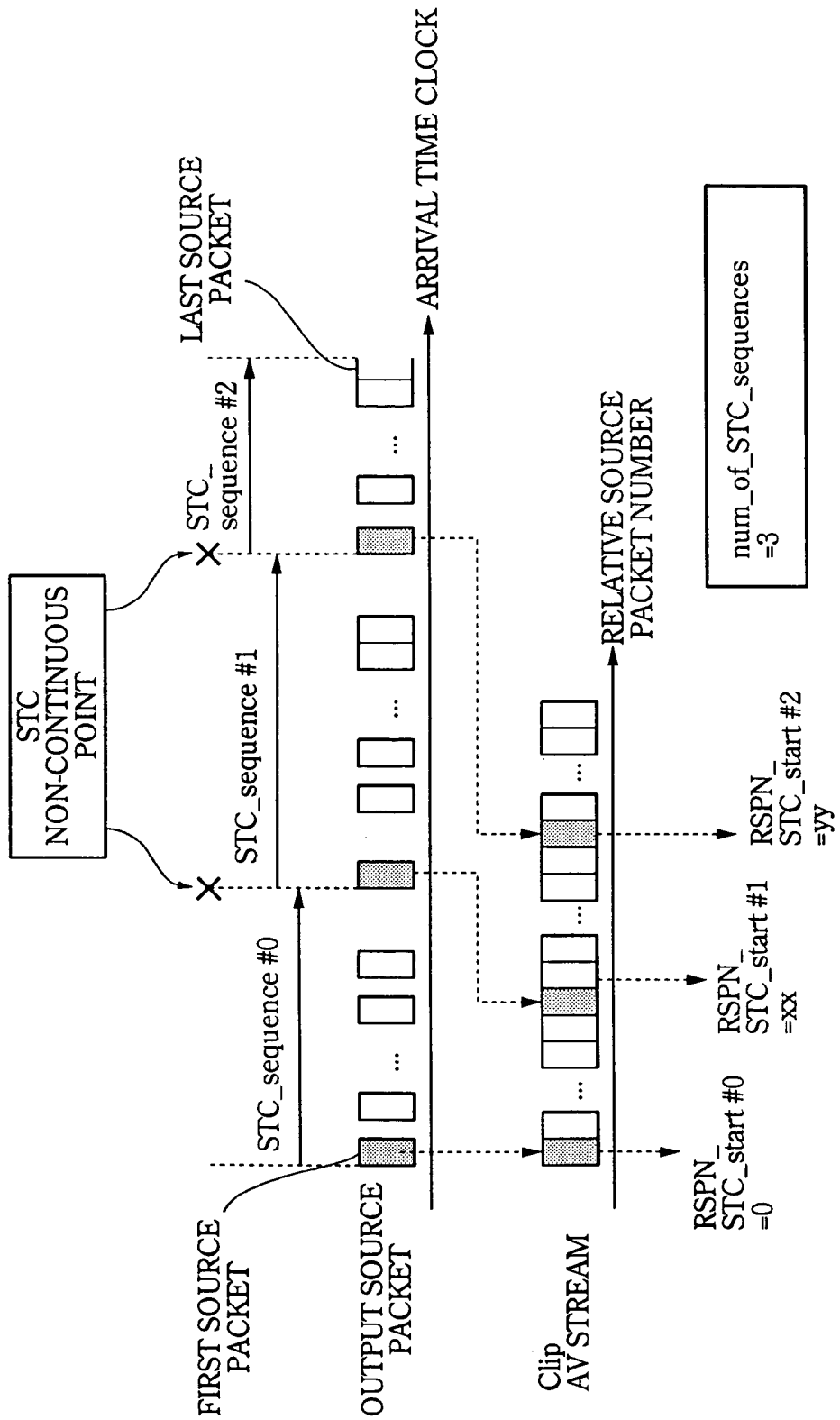

| SYNTAX | NUMBER OF BYTES | ABBREVIATION |
|---|---|---|
| STC_Info(){ | | |
|     version_number | 8*4 | bslbf |
|     length | 32 | uimsbf |
|     if (length !=0){ | | |
|         reserved | 8 | bslbf |
|         num_of_STC_sequences | 8 | uimsbf |
|         for (STC_sequence_id=0; STC_sequence_id<num_of_STC_sequences; STC_sequence_id++){ | | |
|             resereved | 32 | bslbf |
|             RSPN_STC_start | 32 | uimsbf |
|         } | | |
|     } | | |
| } | | |

FIG.52

| SYNTAX | NUMBER OF BYTES | ABBREVIATION |
|---|---|---|
| ProgramInfo(){ | | |
|     version_number | 8*4 | bslbf |
|     length | 32 | uimsbf |
|     if (length !=0){ | | |
|         reserved | 8 | bslbf |
|         number_of_program_sequences | 8 | uimsbf |
|         for (i=0;i<*number_of_program_sequences*;i++){ | | |
|             RSPN_program_sequence_start | 32 | uimsbf |
|             reserved | 48 | bslbf |
|             PCR_PID | 16 | bslbf |
|             number_of_videos | 8 | uimsbf |
|             number_of_audios | 8 | uimsbf |
|             for (k=0;k<*number_of_videos*;k++){ | | |
|                 video_stream_PID | 16 | bslbf |
|                 VideoCodingInfo() | | |
|             } | | |
|             for (k=0;k<*number_of_audios*;k++){ | | |
|                 audio_stream_PID | 16 | bslbf |
|                 AudioCodingInfo() | | |
|             } | | |
|         } | | |
|     } | | |
| } | | |

FIG.54

| SYNTAX | NUMBER OF BYTES | ABBREVIATION |
|---|---|---|
| VideoCodingInfo() { | | |
|     video_format | 8 | uimsbf |
|     frame_rate | 8 | uimsbf |
|     display_aspect_ratio | 8 | uimsbf |
|     reserved | 8 | bslbf |
| } | | |

FIG.55

| video_format | MEANING |
|---|---|
| 0 | 480i |
| 1 | 576i |
| 2 | 480p(including 640×480p format) |
| 3 | 1080i |
| 4 | 720p |
| 5 | 1080p |
| 6-254 | reserved |
| 255 | No information |

FIG.56

| frame_rate | MEANING |
|---|---|
| 0 | forbidden |
| 1 | 24 000/1001 (23.976...) |
| 2 | 24 |
| 3 | 25 |
| 4 | 30 000/1001 (29.97..) |
| 5 | 30 |
| 6 | 50 |
| 7 | 60 000/1001 (59.94..) |
| 8 | 60 |
| 9-254 | reserved |
| 255 | No information |

FIG.57

| display_aspect_ratio | MEANING |
|---|---|
| 0 | forbidden |
| 1 | reserved |
| 2 | 4:3 display aspect ratio |
| 3 | 16:9 display aspect ration |
| 4-254 | reserved |
| 255 | No information |

FIG.58

| SYNTAX | NUMBER OF BYTES | ABBREVIATION |
|---|---|---|
| AudioCodingInfo() { | | |
|     audio_format | 8 | uimsbf |
|     audio_component_type | 8 | uimsbf |
|     sampling_frequency | 8 | uimsbf |
|     reserved | 8 | bslbf |
| } | | |

FIG.59

| audio_coding | MEANING |
|---|---|
| 0 | MPEG-1 audio layer I or II |
| 1 | Dolby AC-3 audio |
| 2 | MPEG-2 AAC |
| 3 | MPEG-2 multi-channel audio, backward compatible to MPEG-1 |
| 4 | SESF LPCM audio |
| 5-254 | reserved |
| 255 | No information |

FIG.60

| audio_component_type | MEANING |
|---|---|
| 0 | single mono channel |
| 1 | dual mono channel |
| 2 | stereo (2-channel) |
| 3 | multi-lingual, multi-channel |
| 4 | surround sound |
| 5 | audio description for the visually impaired |
| 6 | audio for the hard of hearing |
| 7-254 | reserved |
| 255 | No information |

FIG.61

| sampling_frequency | MEANING |
|---|---|
| 0 | 48 kHz |
| 1 | 44.1 kHz |
| 2 | 32 kHz |
| 3-254 | reserved |
| 255 | No information |

FIG.62

| SYNTAX | NUMBER OF BYTES | ABBREVIATION |
|---|---|---|
| CPI(){ | | |
|     version_number | 8*4 | bslbf |
|     length | 32 | uimsbf |
|     reserved | 15 | bslbf |
|     CPI_type | 1 | bslbf |
|     if (CPI_type==0) | | |
|         EP_map() | | |
|     else | | |
|         TU_map() | | |
| } | | |

FIG.65

| CPI_type | MEANING |
|---|---|
| 0 | EP map type |
| 1 | TU map type |
FIG.66
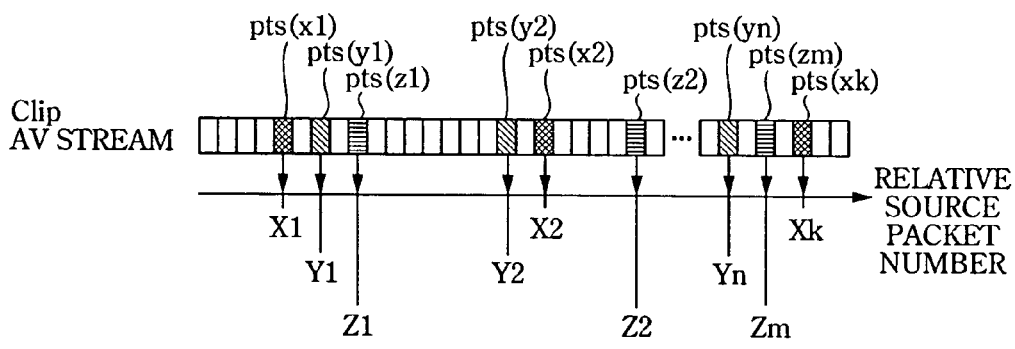
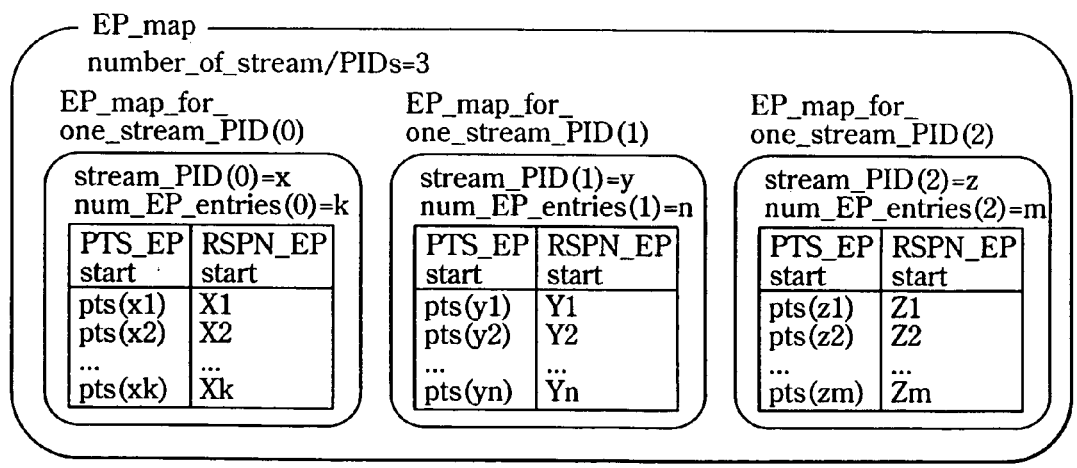
FIG.67

| SYNTAX | NUMBER OF BYTES | ABBREVIATION |
|---|---|---|
| EP_map(){ | | |
|    reserved | 12 | bslbf |
|    EP_type | 4 | uimsbf |
|    number_of_stream_PIDs | 16 | uimsbf |
|    for (k=0;k<*number_of_stream_PIDs*;k++){ | | |
|      stream_PID(k) | 16 | bslbf |
|      num_EP_entries(k) | 32 | uimsbf |
|      EP_map_for_one_stream_PID_Start_address(k) | 32 | uimsbf |
|    } | | |
|    for (i=0;i<X;i++){ | | |
|      padding_word | 16 | bslbf |
|    } | | |
|    for (k=0;k<*number_of_stream_PIDs*;k++){ | | |
|      EP_map_for_one_stream_PID(*num_EP_entries(k)*) | | |
|      for (i=0;i<Y;i++){ | | |
|        padding_word | 16 | bslbf |
|      } | | |
|    } | | |
| } | | |

FIG.70

| EP_type | MEANING |
|---|---|
| 0 | video |
| 1 | audio |
| 2-15 | reserved |

FIG.71

| SYNTAX | NUMBER OF BYTES | ABBREVIATION |
|---|---|---|
| EP_map_for_one_stream_PID(*N*) { | | |
|     for (i=0;i<*N*;i++){ | | |
|         PTS_EP_start | 32 | uimsbf |
|         RSPN_EP_start | 32 | uimsbf |
|     } | | |
| } | | |

FIG.72

| SYNTAX | NUMBER OF BYTES | ABBREVIATION |
|---|---|---|
| TU_map() { | | |
|     offset_time | 32 | bslbf |
|     time_unit_size | 32 | uimsbf |
|     number_of_time_unit_entries | 32 | uimsbf |
|     for (k=0;k<*number_of_time_unit_entries*;k++) | | |
|         RSPN_time_unit_start | 32 | uimsbf |
| } | | |

FIG.74

| SYNTAX | NUMBER OF BYTES | ABBREVIATION |
|---|---|---|
| ClipMark()  { | | |
|     version_number | 8*4 | bslbf |
|     length | 32 | uimsbf |
|     number_of_Clip_marks | 16 | uimsbf |
|     for (i=0; i<*number_of_clip_marks*; i++){ | | |
|         reserved | 8 | bslbf |
|         mark_type | 8 | bslbf |
|         mark_time_stamp | 32 | uimsbf |
|         STC_sequence_id | 8 | uimsbf |
|         reserved | 24 | bslbf |
|         character_set | 8 | bslbf |
|         name_length | 8 | uimsbf |
|         mark_name | 8*256 | bslbf |
|         ref_thumbnail_index | 16 | uimsbf |
|     } | | |
| } | | |

FIG.75

| Mark_type | MEANING | COMMENT |
|---|---|---|
| 0x00-0x8F | reserved | Reserved for PlayListMark0 |
| 0x90 | Event-start mark | MARK POINT INDICATING PROGRAM START POINT |
| 0x91 | Local event-start mark | MARK POINT INDICATING LOCAL SCENE IN PROGRAM |
| 0x92 | Scene-start mark | MARK POINT SHOWING SCENE CHANGE POINT |
| 0x93-0xFF | reserved | |

FIG.76

| CPI_type in the PlayList() | SEMANTICS OF mark_time_stamp |
|---|---|
| EP_map type | mark_time_stamp MUST INDICATE UPPER 32 BITS OF 33 BIT LENGTH PTS CORRESPONDING TO PRESENTATION UNIT REFERENCED BY MARK. |
| TU_map type | mark_time_stamp MUST BE TIME ON TU_map_time_axis AND MUST BE ROUNDED TO time_unit PRECISION. mark_time_stamp IS CALCULATED BY FOLLOWING EQUATION:<br><br>$\text{mark\_time\_stamp} = \text{TU\_start\_time} \: \%2^{32}$ |

FIG.77

| SYNTAX | NUMBER OF BYTES | ABBREVIATION |
|---|---|---|
| ClipMark() { | | |
|     version_number | 8*4 | bslbf |
|     length | 32 | uimsbf |
|     number_of_Clip_marks | 16 | uimsbf |
|     for (i=0; i<number_of_Clip_marks; i++){ | | |
|         reserved | 8 | bslbf |
|         mark_type | 8 | bslbf |
|         reserved_for_MakerID | 16 | bslbf |
|         mark_entry() | | |
|         representative_picture_entry() | | |
|         ref_thumbnail_index | 16 | uimsbf |
|     } | | |
| } | | |

FIG.78

| Mark_type | MEANING | COMMENT |
|---|---|---|
| 0x00-0x8F | reserved | Reserved for PlayListMark() |
| 0x90 | Event-start mark | MARK POINT INDICATING PROGRAM START POINT |
| 0x91 | Local event-start mark | MARK POINT INDICATING LOCAL SCENE IN PROGRAM |
| 0x92 | Scene-start mark | MARK POINT INDICATING SCENE START POINT |
| 0x93 | Scene-end mark | MARK POINT INDICATING SCENE END POINT |
| 0x94 | CM-start mark | MARK POINT INDICATING CM START POINT |
| 0x95 | CM-end mark | MARK POINT INDICATING CM END POINT |
| 0x96-0xBF | DVR FORMAT IS RESERVED FOR FUTURE EXTENSION OF ClipMark | |
| 0xC0-0xFF | ALLOCATBLE TO MARK USED IN MAKER-UNIQUE APPLICCATION | |

FIG.79

| SYNTAX | NUMBER OF BYTES | ABBREVIATION |
|---|---|---|
| mark_entry()/representative_picture_entry(){ | | |
| mark_time_stamp | 32 | uimsbf |
| STC_sequence_id | 8 | uimsbf |
| reserved | 24 | bslbf |
| } | | |

| SYNTAX | NUMBER OF BYTES | ABBREVIATION |
|---|---|---|
| mark_entry()/representative_picture_entry(){ | | |
| RSPN_ref_EP_start | 32 | uimsbf |
| offset_num_pictures | 32 | uimsbf |
| } | | |

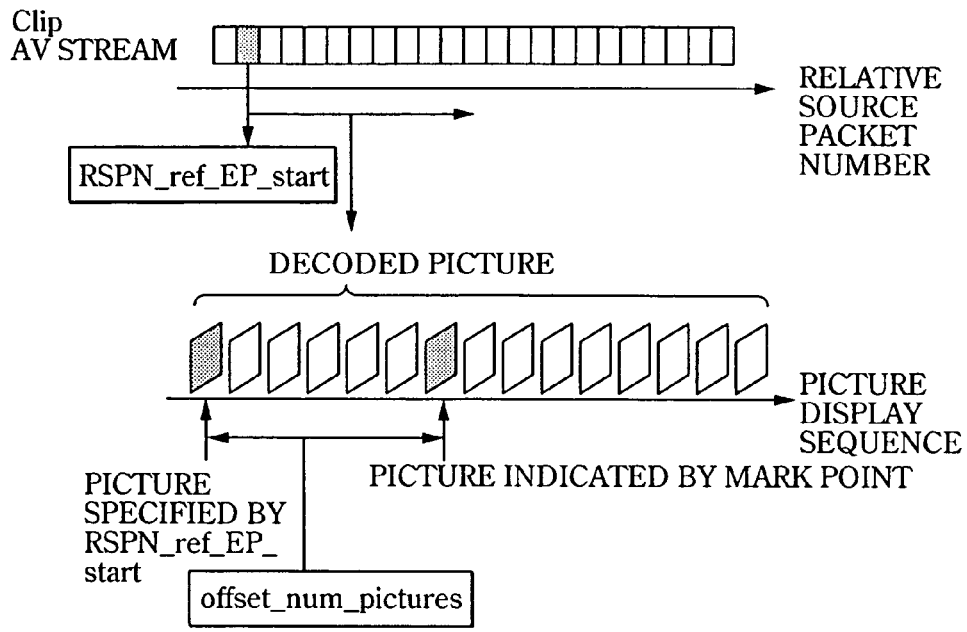
FIG.83
| SYNTAX | NUMBER OF BYTES | ABBREVIATION |
|---|---|---|
| mark_entry()/representative_picture_entry(){ | | |
| RSPN_mark_point | 32 | uimsbf |
| } | | |
FIG.84
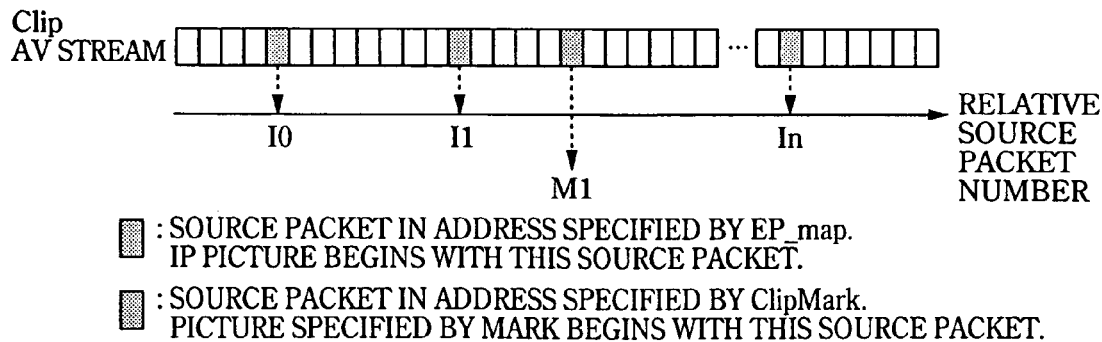
☐ : SOURCE PACKET IN ADDRESS SPECIFIED BY EP_map.
　　IP PICTURE BEGINS WITH THIS SOURCE PACKET.
▨ : SOURCE PACKET IN ADDRESS SPECIFIED BY ClipMark.
　　PICTURE SPECIFIED BY MARK BEGINS WITH THIS SOURCE PACKET.
FIG.85

| SYNTAX | NUMBER OF BYTES | ABBREVIATION |
|---|---|---|
| menu.thmb/mark.thmb() { | | |
|    reserved | 256 | bslbf |
|    Thumbnail() | | |
|    for (i=0;i<N1;i++) | | |
|      padding_word | 16 | bslbf |
| } | | |

FIG.86

| SYNTAX | NUMBER OF BYTES | ABBREVIATION |
|---|---|---|
| Thumbnail(){ | | |
|     version_number | 8*4 | char |
|     length | 32 | uimsbf |
|     if (length !=0){ | | |
|         tn_blocks_start_address | 32 | bslbf |
|         number_of_thumbnails | 16 | uimsbf |
|         tn_block_size | 16 | uimsbf |
|         number_of_tn_blocks | 16 | uimsbf |
|         reserved | 16 | bslbf |
|         for (i=0; i<*number_of_thumbnails*; i++) { | | |
|             thumbnail_index | 16 | uimsbf |
|             thumbnail_picture_format | 8 | bslbf |
|             reserved | 8 | bslbf |
|             picture_data_size | 32 | uimsbf |
|             start_tn_block_number | 16 | uimsbf |
|             x_picture_length | 16 | uimsbf |
|             y_picture_length | 16 | uimsbf |
|             reserved | 16 | uimsbf |
|         } | | |
|         stuffing_bytes | 8*2*L1 | bslbf |
|         for(k=0; k<*number_of_tn_blocks*; k++){ | | |
|             tn_block | tn_block_size*1024*8 | |
|         } | | |
|     } | | |
| } | | |

FIG.87

| Thumbnail_picture_format | MEANING |
|---|---|
| 0x00 | MPEG-2 Video I-picture |
| 0x01 | DCF (restricted JPEG) |
| 0x02 | PNG |
| 0x03-0xff | reserved |
FIG.88
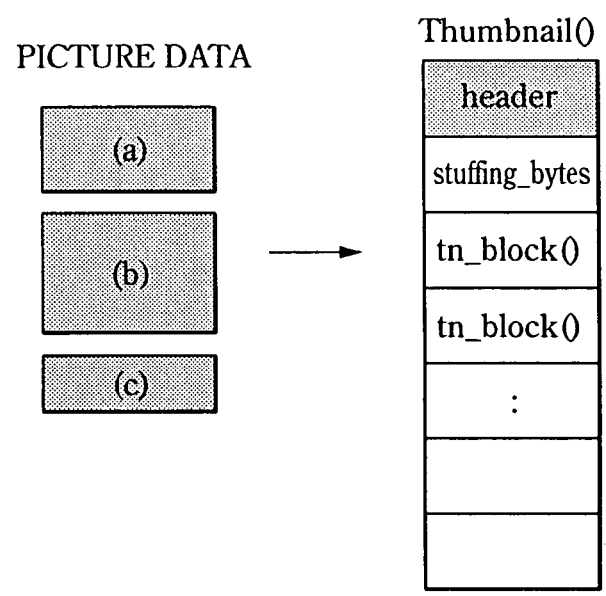
FIG.89A
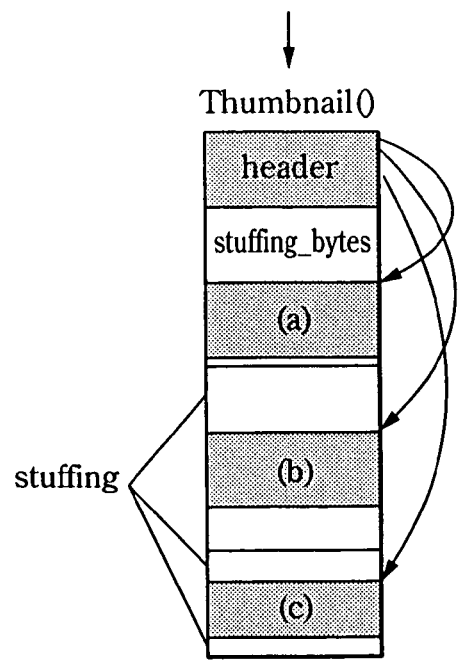
FIG.89B

| SYNTAX | NUMBER OF BYTES | ABBREVIATION |
|---|---|---|
| source_packet() { | | |
|     TP_extra_header() | | |
|     trasport_packet() | | |
| } | | |

FIG.93

| SYNTAX | NUMBER OF BYTES | ABBREVIATION |
|---|---|---|
| TP_extra_header() { | | |
|     copy_permission_indicator | 2 | uimsbf |
|     arrival_time_stamp | 30 | uimsbf |
| } | | |

FIG.94

| copy_permission_indicator | MEANING |
|---|---|
| 00 | copy free |
| 01 | no more copy |
| 10 | copy once |
| 11 | copy prohibited |

FIG.95

EP_map

| RSPN_EP_<br>start | PTS_EP_<br>start |
|---|---|
| ... | ... |
| A | PTS(A) |
| B | PTS(B) |
| C | PTS(C) |
| ... | ... |

ClipMark

| Mark_type | mark_entry | | representative_picture_entry | |
|---|---|---|---|---|
| | Mark_<br>Time_stamp | STC_sequence_<br>id | Mark_<br>Time_stamp | STC_sequence_<br>id |
| ...<br>0x92(scene start)<br>0x94(CM start)<br>0x95(CM end)<br>... | ...<br>PTS(a1)<br>PTS(b0)<br>PTS(c0)<br>... | ...<br>id0<br>id0<br>id0<br>... | ...<br>PTS(a2)<br>PTS(b0)<br>PTS(c0)<br>... | ...<br>id0<br>id0<br>id0<br>... |

EP_map

| RSPN_EP_start | PTS_EP_start |
|---|---|
| ... | ... |
| A | PTS(A) |
| B | PTS(B) |
| C | PTS(C) |
| ... | ... |

ClipMark

| mark_type | mark_entry | | representative_picture_entry | |
|---|---|---|---|---|
| | RSPN_ref_EP_start | offset_num_pictures | RSPN_ref_EP_start | offset_num_pictures |
| ... <br> 0x92(scene start) <br> 0x94(CM start) <br> 0x95(CM end) <br> ... | ... <br> A <br> B <br> C <br> ... | ... <br> M1 <br> N1 <br> N2 <br> ... | ... <br> A <br> B <br> C <br> ... | ... <br> M2 <br> N1 <br> N2 <br> ... |

| SYNTAX | NUMBER OF BYTES | ABBREVIATION |
|---|---|---|
| ClipMark() { | | |
|     version_number | 8*4 | bslbf |
|     length | 32 | uimsbf |
|     number_of_Clip_marks | 16 | uimsbf |
|     for (i=0; i<*number_of_Clip_marks*; i++) { | | |
|         reserved | 8 | bslbf |
|         mark_type | 8 | bslbf |
|         RSPN_mark | 32 | uimsbf |
|         reserved | 32 | bslbf |
|         ref_thumbnail_index | 16 | uimsbf |
|     } | | |
| } | | |

FIG.126

| SYNTAX | NUMBER OF BYTES | ABBREVIATION |
|---|---|---|
| ClipMark() { | | |
|     version_number | 8*4 | bslbf |
|     length | 32 | uimsbf |
|     number_of_Clip_marks | 16 | uimsbf |
|     for (i=0; i<*number_of_Clip_marks*; i++) { | | |
|         reserved | 8 | bslbf |
|         mark_type | 8 | bslbf |
|         RSPN_ref_EP_start | 32 | uimsbf |
|         offset_num_pictures | 32 | uimsbf |
|         ref_thumbnail_index | 16 | uimsbf |
|     } | | |
| } | | |

FIG.127

| SYNTAX | NUMBER OF BYTES | ABBREVIATION |
|---|---|---|
| PlayListMark(){ | | |
|     length | 32 | uimsbf |
|     number_of_PlayList_marks | 16 | uimsbf |
|     for (i=0;i<*number_of_PlayList_marks*;i++){ | | |
|         mark_invalid_flag | 1 | uimsbf |
|         mark_type | 7 | uimsbf |
|         mark_name_length | 8 | uimsbf |
|         ref_to_PlayItem_id | 16 | uimsbf |
|         mark_time_stamp | 32 | uimsbf |
|         entry_ES_PID | 16 | uimsbf |
|         ref_to_thumbnail_index | 16 | uimsbf |
|         mark_name | 8*32 | bslbf |
|     } | | |
| } | | |

FIG.135

| VALUES | MEANING | NOTS |
|---|---|---|
| 0x00 | Resume-mark | REPLAY RESUME POINT. THE NUMBER OF REPLAY RESUME POINTS DEFINED IN PlayListMark() MUST BE 0 OR 1. |
| 0x01 | Book-mark | REPLAY ENTRY POINT OF PlayList. THIS MARK CAN BE SET BY USER AND USED AS MARK FOR SPECIFYING START POINT OF FAVORITE SCENE. A PLURAL NUMBER OF THIS MARK MAY BE PROVIDED IN PlayListMark(). |
| 0x02 | Chapter-mark | USER INTENDS THAT A CHAPTER IN PlayList BEGINS WITH THIS MARK. A PLURAL NUMBER OF THIS MARK MAY BE PROVIDED IN PlayListMARK(). |
| 0x03 | Skip-start-mark | IF ONE Skip-start-mark IS SET IN PlayListMark, ONE Skip-end-mark MUST BE SET DIRECTLY AFTER THE Skip-start-mark ENTRY. USER INTENDS TO SKIP PlayList REPLAY FROM TIME STAMP OF Skip-start-mark TO TIME STAMP OF Skip-end-mark. Skip-start-mark HAS SAME MEANING AS Skip-end-mark. IF entry-ES-PID IS NOT 0xFFFF, Skip-start-mark HAS SAME entry-ES-PID VALUE AS Skip-end-mark. THIS MARK CAN BE SET BY USER. THERE MAY BE PLURAL SUCH MARKS IN PlayListMark(). |
| 0x04 | Skip-end-mark | |
| 0x05-0x3F | Reserved for future use | Reserved for PlayListMark |
| 0x40-0x7F | Reserved for ClipMark | |

FIG.136

| SYNTAX | NUMBER OF BYTES | ABBREVIATION |
|---|---|---|
| ClipMark(){ | | |
|     length | 32 | uimsbf |
|     maker_ID | 16 | uimsbf |
|     number_of_Clip_marks | 16 | uimsbf |
|     for (i=0; i<*number_of_Clip_marks*; i++){ | | |
|         mark_invalid_flag | 1 | uimsbf |
|         mark_type | 7 | uimsbf |
|         ref_to_STC_id | 8 | uimsbf |
|         mark_time_stamp | 32 | uimsbf |
|         entry_ES_PID | 16 | uimsbf |
|         ref_to_thumbnail_index | 16 | uimsbf |
|         representative_picture_time_stamp | 32 | uimsbf |
|     } | | |
| } | | |

FIG.137

| Mark_type | MEANING | NOTES |
|---|---|---|
| 0x00-0x3F | reserved for future use | Reserved for PlayListMark |
| 0x40 | Scene-start-mark | MARK POINT INDICATING SCENE START POINT |
| 0x41-0x5F | Reserved for common ClipMark | |
| 0x60-0x7F | Maker defined ClipMark | MAKER SPECIFIED WITH maker_ID CAN FREELY DEFINE MEANING |

FIG.138

INFORMATION PROCESSING APPARATUS AND METHOD, PROGRAM, AND RECORDED MEDIUM SPECIFYING PARTICULAR PICTURE CHARACTERISTICS

TECHNICAL FIELD

This invention relates to an information processing method and apparatus, program and recording medium. More particularly, it relates to an information processing method and apparatus, program and recording medium in which a desired location of an AV stream can be accessed extremely promptly.

BACKGROUND ART

Recently, a variety of types of optical discs have been proposed as a recording medium that can be removed from a recording apparatus. These recordable optical discs have been proposed as a large capacity medium of several GBs and are thought to be promising as a medium for recording AV (audio visual) signals, Among the sources (supply sources) of digital AV signals, recorded on the recordable optical disc, there are, for example, a bitstream the recording apparatus itself forms on picture compression of analog input audio video signals in accordance with the MPEG-2 system, and a bitstream of the MPEG-2 system, directly obtained from electrical waves of digital television broadcast. In general, an MPEG-2 transport stream is used in digital television broadcast. A transport stream is composed of plural concatenated transport packets. Each transport packet is a packetized MPEG-2 video stream or MPEG-1 audio stream, with the data length of each transport packet being 188 bytes in length. If an AV program of a transport stream, received over digital television broadcast, is directly recorded on an optical disc by a recorder, recording can be made without deteriorating the video or audio quality whatsoever.

In order to permit a user to search a scene of interest, such as a program locating point, in the transport stream recorded on the optical disc, it is required to be able to perform random-access reproduction.

In general, in an MPEG-2 video stream, I-pictures are encoded at an interval of 0.5 sec, whilst other pictures are encoded as P- or B-pictures. Thus, in reproducing the video by random-accessing a transport stream recorded on the optical disc, I-pictures must be searched first.

However, if a transport stream, recorded on the optical disc, is random-accessed for video reproduction, it is difficult to search the starting byte of an I-picture efficiently. That is, the syntax of the video stream needs to be analyzed from a random byte position of a transport stream on the optical disc to search the start byte of the I-picture. So, the I-picture searching is extremely time-consuming, such that it is difficult to perform random-access reproduction with quick response to the user input.

DISCLOSURE OF THE INVENTION

It is therefore another object of the present invention to enable decision of the position of transport stream readout from the recording medium and stream decoding start quickly responsive to a random-access reproduction command of a user.

In one aspect, the present invention provides an information processing apparatus including generating means for generating ClipMark formed by a mark specifying a characteristic picture extracted from an input AV stream, as management information for supervising the AV stream, and for generating PlayListMark, formed by marks pointing to a picture optionally specified by a user, from a reproduction domain corresponding to the PlayList defining the combination of preset domains in the AV stream, and recording means for recording the ClipMark and PlayListMark as respective independent tables on a recording medium.

The generating means generates the ClipMark and the PlayListMark as a ClipInformation file and as a PlayList file, respectively.

The PlayListMark may further include a mark specifying a Resume point in reproducing the PlayList.

In reproducing the PlayList, reference may be made to the mark forming the ClipMark of the AV stream corresponding to the reproduction domain of the PlayList.

The mark of the PlayListMark may include presentation time stamp and the identification information for indicating one reproduction domain specified on the AV stream data forming the reproduction route of the PlayList.

The mark forming the ClipMark or the mark forming the PlayListMark may include the information specifying an entry point of an elementary stream.

The mark of the PlayListMark may include the information of the type at least including the Resume point of the start point of a favorite scene or a Resume point of the PlayList specified by a user.

The mark of the ClipMark and the mark of the PlayListMark may be represented by an address of a relative source packet corresponding to an entry point of the AV stream.

The mark of the ClipMark and the mark of the PlayListMark may be represented by a first address of a relative source packet corresponding to an entry point of the AV stream and by a second address of an offset from the first address, respectively.

The information processing apparatus may further include type detection means for detecting the type of the characteristic picture detected at the time of recording by the first recording means, with the first recording means then recording the mark forming the ClipMark and the type as detected by the detection means.

The mark of the ClipMark may include a scene change point, a commercial start point, commercial end point or a title displaying scene.

In another aspect, the present invention provides an information processing method including a step of generating ClipMark formed by a mark specifying a characteristic picture extracted from an input AV stream, as management information for supervising the AV stream, and of generating PlayListMark, formed by marks pointing to a picture optionally specified by a user, from a reproduction domain corresponding to the PlayList defining the combination of preset domains in the AV stream, and a step of recording the ClipMark and PlayListMark as respective independent tables on a recording medium.

In still another aspect, the present invention provides a recording medium having recorded thereon a computer-readable program, the computer-readable program including a step of generating ClipMark formed by a mark specifying a characteristic picture extracted from an input AV stream, as management information for supervising the AV stream, and of generating PlayListMark, formed by marks pointing to a picture optionally specified by a user, from a reproduction domain corresponding to the PlayList defining the combination of preset domains in the AV stream, and a step of recording the ClipMark and PlayListMark as respective independent tables on a recording medium.

In still another aspect, the present invention provides a program for having a computer execute a step of generating ClipMark formed by a mark specifying a characteristic picture extracted from an input AV stream, as management information for supervising the AV stream, and of generating PlayListMark, formed by marks pointing to a picture optionally specified by a user, from a reproduction domain corresponding to the PlayList defining the combination of preset domains in the AV stream, and a step of recording the ClipMark and PlayListMark as respective independent tables on a recording medium.

In still another aspect, the present invention provides a information processing apparatus including readout means for reading the management information for supervising the AV stream including ClipMark formed by marks pointing to a characteristic picture extracted from an AV stream, and also for reading, from a reproduction domain corresponding to the PlayList defining the combination of preset domains in the AV stream, PlayListMark formed by a mark pointing to a picture optionally specified by a user, presentation means for presenting the management information read out by the readout means and the information by the PlayListMark, referencing means for referencing, from the information presented by the presentation means, the ClipMark corresponding to the PlayList commanded to be reproduced by the user and reproducing means for reproducing the AV stream including the ClipMark, referenced by the referencing means, from a position corresponding to the ClipMark.

The presentation means may present a list by the thumbnail picture associated with the PlayListMark.

The mark corresponding to the ClipMark and the mark corresponding to the PlayListMark are represented by an address of a relative source packet corresponding to an entry point of the AV stream.

The mark of the ClipMark and the mark of the PlayListMark may be represented by a first address of a relative source packet corresponding to an entry point of the AV stream and by a second address of an offset from the first address, respectively.

The mark of the ClipMark may include a scene change point, a commercial start point, a commercial end point or a title displaying scene.

In still another aspect, the present invention provides an information processing method including a readout step of reading the management information for supervising the AV stream including ClipMark formed by marks pointing to a characteristic picture extracted from an AV stream, and also for reading, from a reproduction domain corresponding to the PlayList defining the combination of preset domains in the AV stream, PlayListMark formed by a mark pointing to a picture optionally specified by a user, a presentation step of presenting the management information read out by the readout step and the information by the PlayListMark, a referencing step of referencing, from the information presented by the presentation step, the ClipMark corresponding to the PlayList commanded to be reproduced by the user, and a reproducing step of reproducing the AV stream including the ClipMark, referenced by the referencing step, from a position corresponding to the ClipMark.

In another aspect, the present invention provides a recording medium having recorded thereon a computer-readable program, the computer-readable program including a readout step of reading the management information for supervising the AV stream including ClipMark formed by marks pointing to a characteristic picture extracted from an AV stream, and also for reading, from a reproduction domain corresponding to the PlayList defining the combination of preset domains in the AV stream, PlayListMark formed by a mark pointing to a picture optionally specified by a user, a presentation step of presenting the management information read out by the readout step and the information by the PlayListMark, a referencing step of referencing, from the information presented by the presentation step, the ClipMark corresponding to the PlayList commanded to be reproduced by the user and a step of recording the ClipMark and PlayListMark as respective independent tables on a recording medium.

In still another aspect, the present invention provides a program for having a computer execute a readout step of reading the management information for supervising the AV stream including ClipMark formed by marks pointing to a characteristic picture extracted from an AV stream, and also for reading, from a reproduction domain corresponding to the PlayList defining the combination of preset domains in the AV stream, PlayListMark formed by a mark pointing to a picture optionally specified by a user, a presentation step of presenting the management information read out by the readout step and the information by the PlayListMark, a referencing step of referencing, from the information presented by the presentation step, the ClipMark corresponding to the PlayList commanded to be reproduced by the user, and a step of recording the ClipMark and PlayListMark as respective independent tables on a recording medium.

In yet another aspect, the present invention provides a program having recorded thereon, as independent tables, the management information for supervising the AV stream including ClipMark formed by marks pointing to a characteristic picture extracted from an AV stream, and also for reading, from a reproduction domain corresponding to the PlayList defining the combination of preset domains in the AV stream, PlayListMark formed by a mark pointing to a picture optionally specified by a user.

With the information processing method and apparatus and the program, according to the present invention, the ClipMark formed by a mark indicating a characteristic picture extracted from an input AV stream is generated as management information for supervising the AV stream, whilst the PlayListMark, formed by marks pointing to the picture optionally specified by the user, is generated from the playback domain corresponding to the PlayList defining the combination of preset domains in the AV stream. The ClipMark and the PlayListMark are recorded as respective independent tables on the recording medium.

With the information processing method and apparatus and the program, according to the present invention, the management information for supervising the AV stream include ClipMark formed by mark pointing to a characteristic picture extracted from an AV stream, PlayListMark formed by a mark pointing to a picture optionally specified by a user are read out from a reproduction domain corresponding to the PlayList defining the combination of preset domains in the AV stream, the management information read out and the information by the PlayListMark are presented, the ClipMark corresponding to the PlayList commanded to be reproduced by the user is referenced from the so presented information, and the AV stream including the ClipMark is reproduced from a position corresponding to the ClipMark.

Other objects, features and advantages of the present invention will become more apparent from reading the embodiments of the present invention as shown in the drawings.

BRIEF DESCRIPTION OF THE DRAWINGS

FIG. 15 illustrates a syntax of infr.dvr.

FIG. 16 shows a syntax of DVRVolume.

FIG. 17 shows a syntax of ResumeVolume.

FIG. 18 shows a syntax of UIAppInfoVolume.

FIG. 19 shows a table of character set values.

FIG. 20 shows a syntax of TableOfPlayList.

FIG. 21 shows another syntax of TableOfPlayList.

FIG. 22 shows a syntax of the MakersPrivateData.

FIG. 23 shows a syntax of xxxx.rpls and yyyy.vpls.

FIG. 25 shows a syntax of PlayList.

FIG. 26 shows a table of PlayList_type.

FIG. 27 shows a syntax of UIAppInfoPlayList.

FIGS. 28A to 28C illustrate flags in the UIAppInfoPlayList syntax shown in FIG. 27.

FIG. 32 shows a syntax of the PlayItem.

FIG. 33 illustrates IN-time.

FIG. 34 illustrates OUT-time.

FIG. 35 shows a table of Connection_Condition.

FIG. 38 shows a syntax of BridgeSequenceInfo.

FIG. 40 shows a syntax of SubPlayItem.

FIG. 41 shows a table of Mark_type.

FIG. 42 shows a syntax of PlayListMark.

FIG. 43 shows a table of Mark_type.

FIG. 44 illustrates Mark_time_stamp.

FIG. 45 shows a syntax of zzzzz.clip.

FIG. 46 shows a syntax of ClipInfo.

FIG. 47 shows a table of Clip_stream_type.

FIG. 51 illustrates STC_Info.

FIG. 52 shows a syntax of STC_Info.

FIG. 54 shows a syntax of ProgramInfo.

FIG. 55 shows a syntax of VideoCondingInfo.

FIG. 56 shows a table of Video_format.

FIG. 57 shows a table of frame_rate.

FIG. 58 shows a table of display_aspect_ratio.

FIG. 59 shows a syntax of AudioCondingInfo.

FIG. 60 shows a table of audio_coding.

FIG. 61 shows a table of audio_component_type.

FIG. 62 shows a table of sampling_frequency.

FIG. 65 shows a syntax of CPI.

FIG. 66 shows a table of CPI_type.

FIG. 67 illustrates video EP_map.

FIG. 70 shows a syntax of EP_map.

FIG. 71 shows a table of EP_typevalues.

FIG. 72 shows a syntax of EP_map_for_one_stream_PID.

FIG. 74 shows a syntax of TU_map.

FIG. 75 shows a syntax of ClipMark.

FIG. 76 shows a table of Mark_type.

FIG. 77 shows a table of Mark_type_stamp.

FIG. 78 shows another syntax of ClipMark.

FIG. 79 shows another example of a table of Mark_type.

FIG. 83 shows the relation between RSPN_ref_EP_start and offset_num_pictures.

FIG. 84 shows another example of the syntax of mark_entry( ) and representative_picture_entry( ).

FIG. 85 shows the relation between ClipMark and EP_map.

FIG. 86 shows a syntax of menu.thmb and mark.thmb.

FIG. 87 shows a syntax of Thumbnail.

FIG. 88 shows a table of thumbnail_picture_format.

FIGS. 89A and 89B illustrate tn_block.

FIG. 93 shows a syntax of source packet.

FIG. 94 shows a syntax of TP_extra_header.

FIG. 95 shows a table of copy permission indicator.

FIG. 78 is the syntax of FIG. 81.

FIG. 78 is the syntax of FIG. 81.

FIG. 78 is the syntax of FIG. 81.

FIG. 78 is the syntax of FIG. 82.

FIG. 78 is the syntax of FIG. 82.

FIG. 78 is the syntax of FIG. 82.

FIG. 78 is the syntax of FIG. 82.

FIG. 78 is the syntax of FIG. 84.

FIG. 78 is the syntax of FIG. 84.

FIG. 120 shows an example of EP_map.

FIG. 121 shows an example of ClipMark.

FIG. 122 is a flowchart for illustrating the CM skipping reproducing processing in case the mark_entry( )/representative_picture_entry( ) of ClipMark in FIG. 75 or FIG. 78 is the syntax of FIG. 84.

Figure 122:
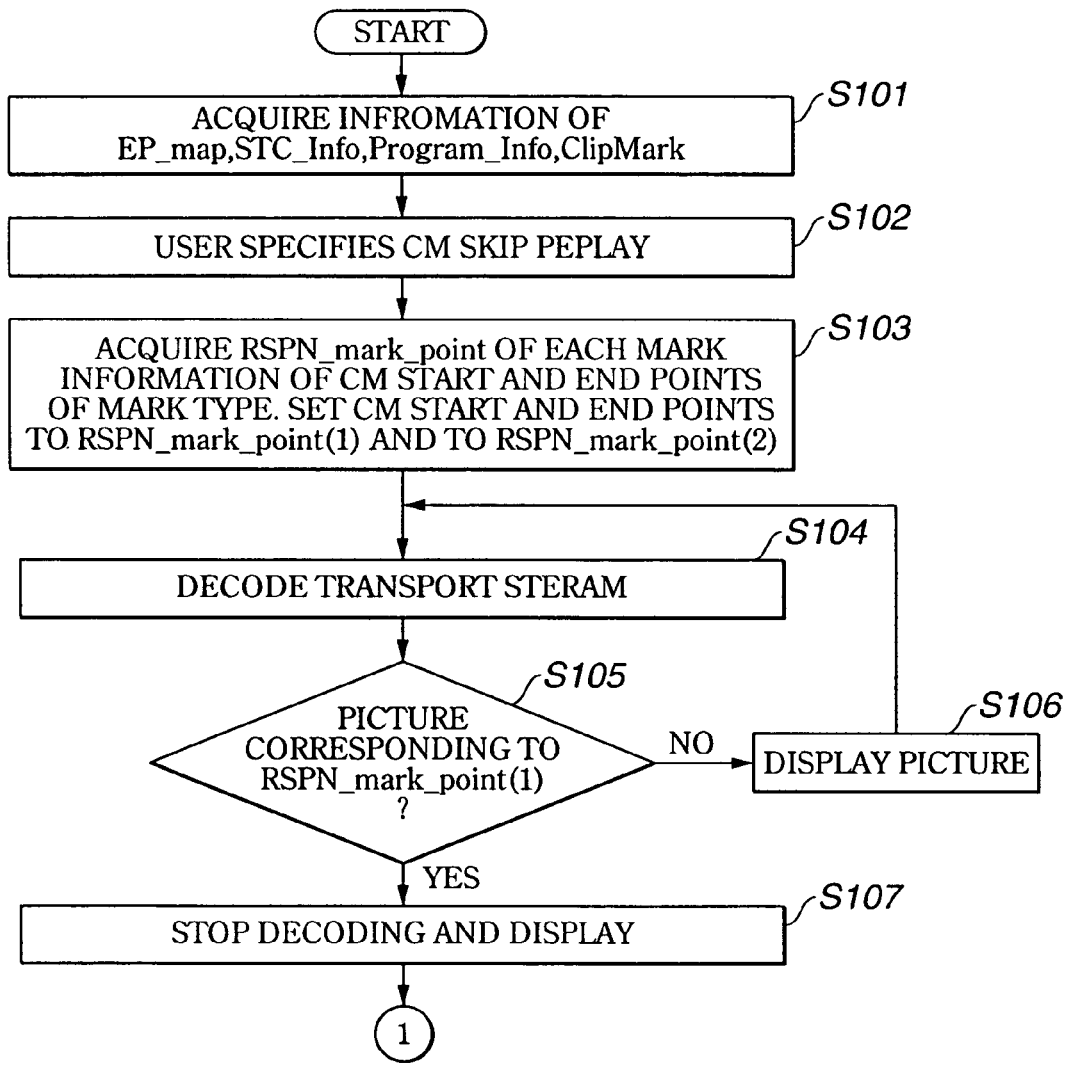
Figure 123:
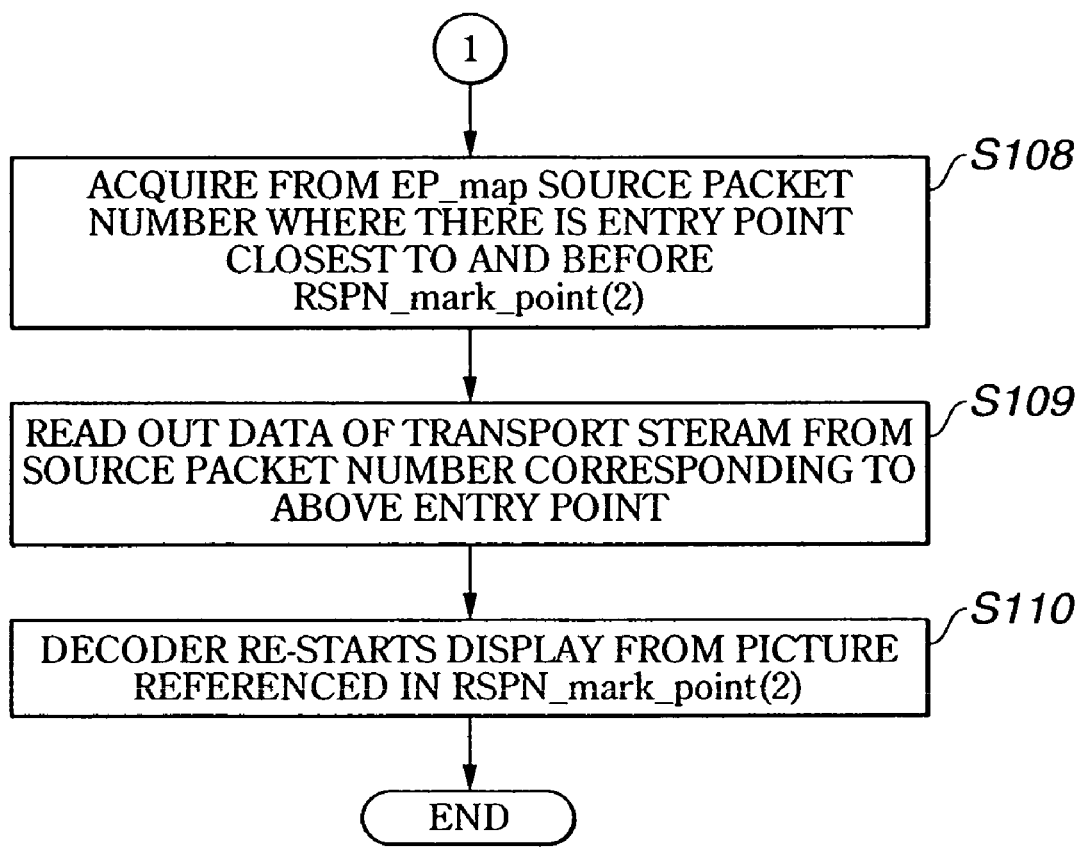

FIG. 123, continuing to FIG. 122, is a flowchart for illustrating the CM skipping reproducing processing in case the mark_entry( )/representative_picture_entry( ) of ClipMark in FIG. 75 or FIG. 78 is the syntax of FIG. 84.

Figure 124:
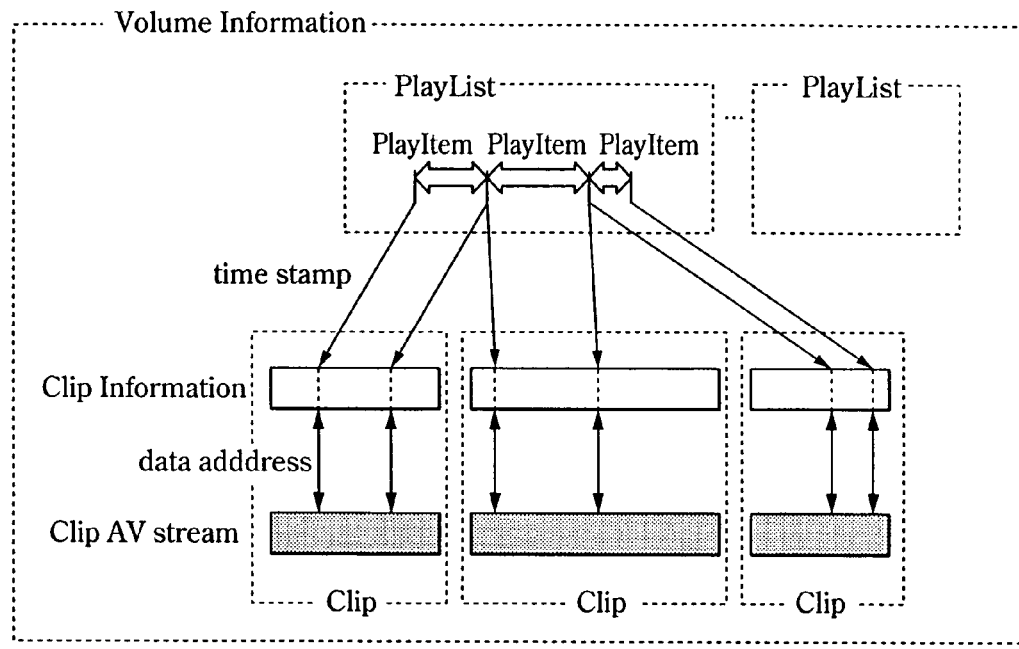

FIG. 124 shows an application format.

Figure 125:
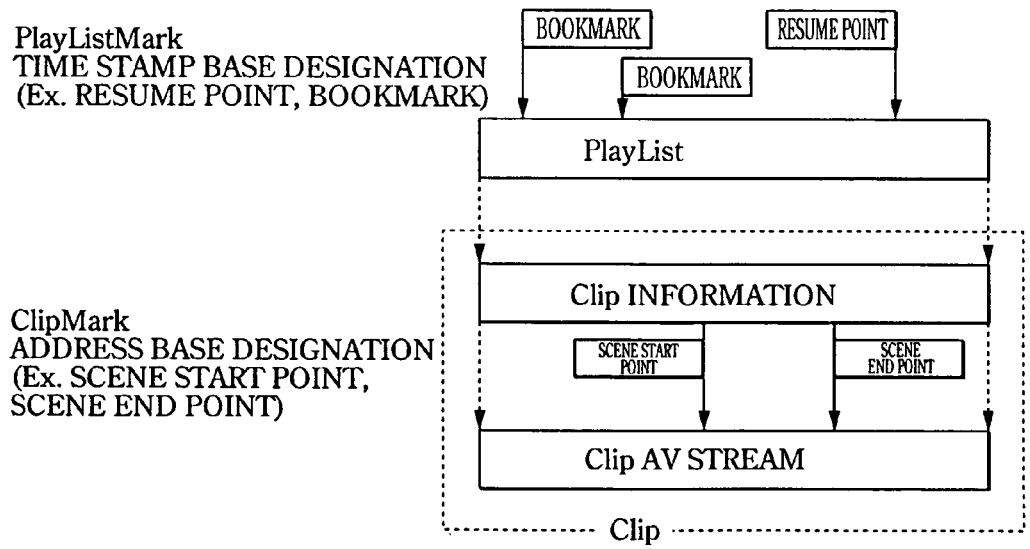

FIG. 125 illustrates a mark on PlayList and a mark on Clip.

FIG. 126 shows another example of the ClipMark syntax.

FIG. 127 shows still another example of the ClipMark syntax.

Figure 128:
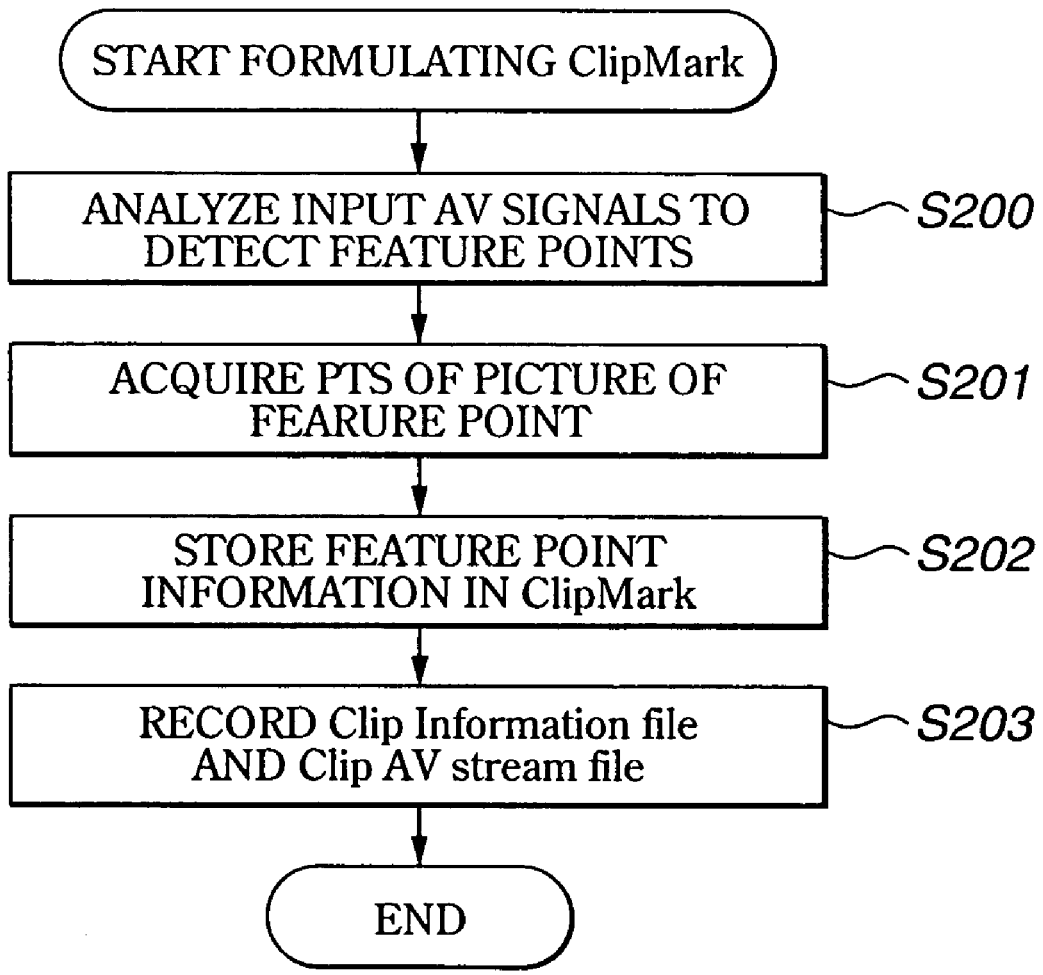

FIG. 128 is a flowchart for illustrating the preparation of ClipMark in case analog AV signals are encoded and recorded.

Figure 129:
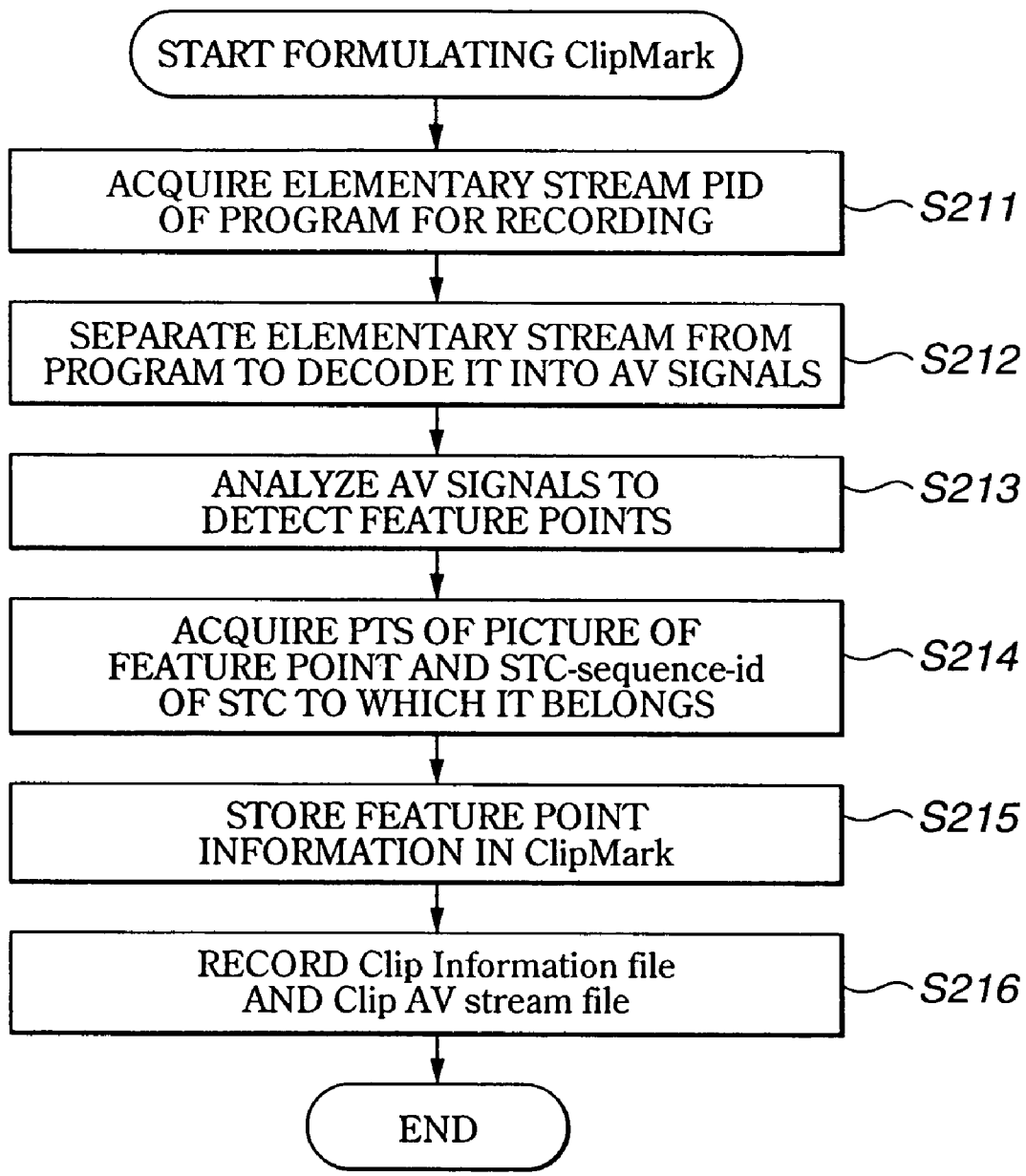

FIG. 129 is a flowchart for illustrating the preparation of ClipMark in case a transport stream is to be recorded.

Figure 130:
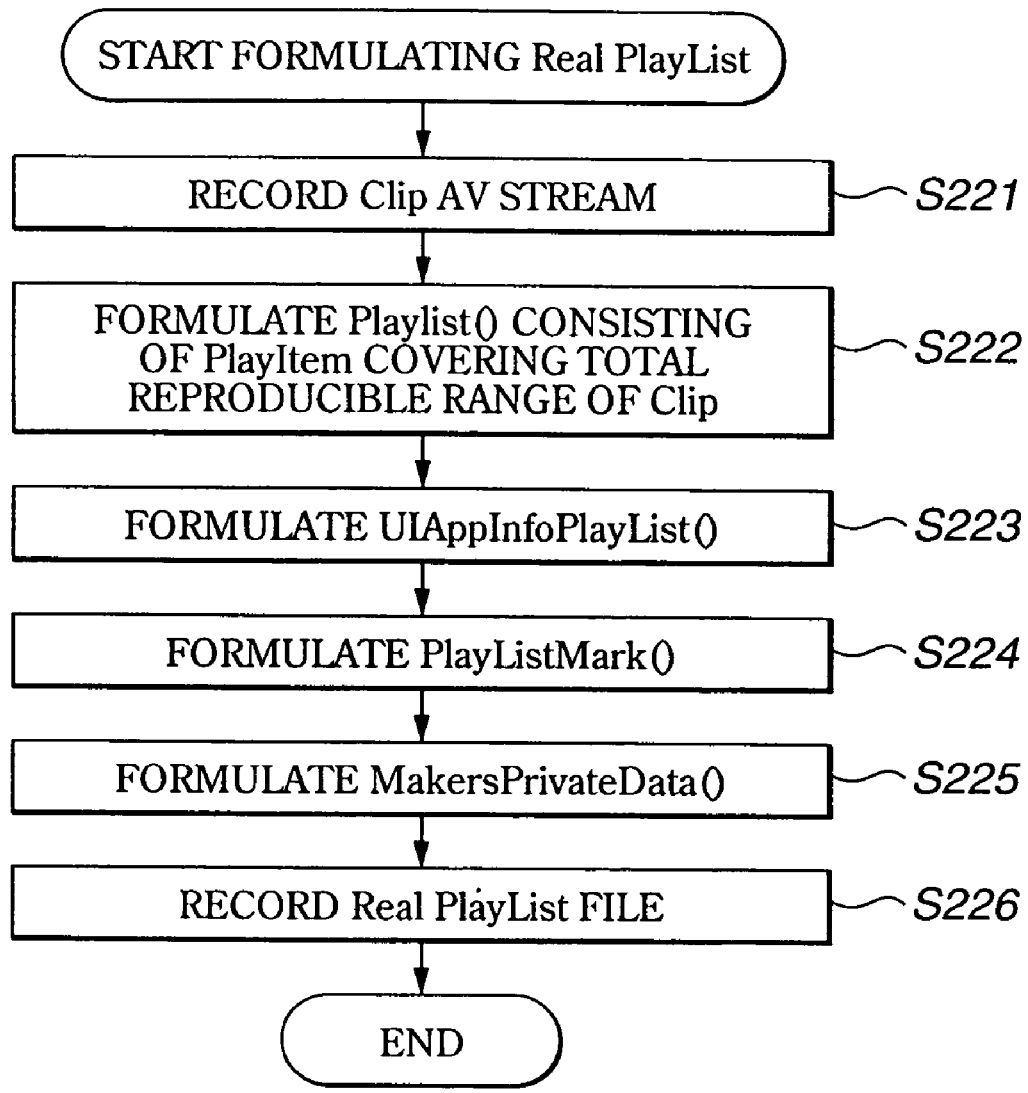

FIG. 130 is a flowchart for illustrating the preparation of RealPlayList.

Figure 131:
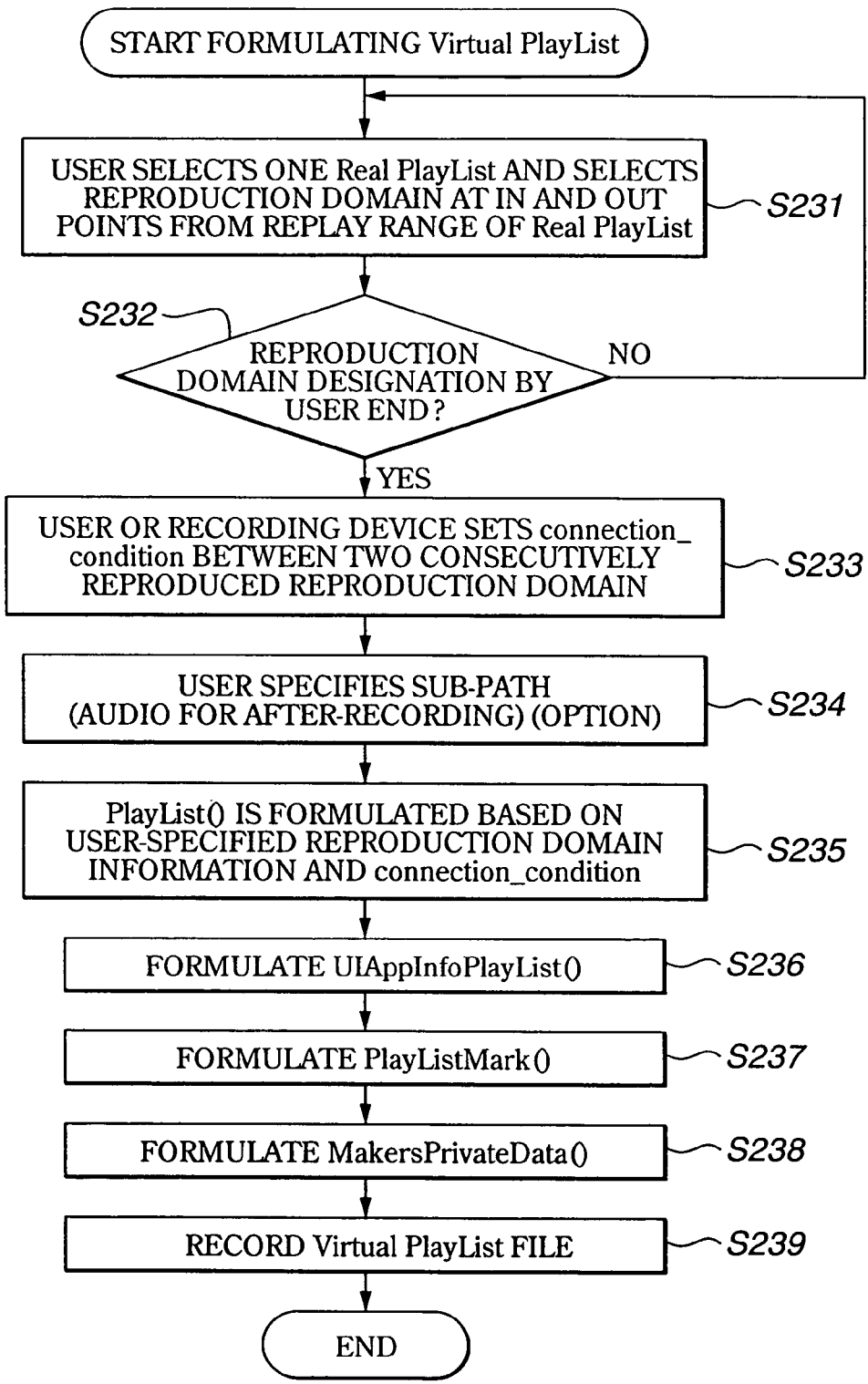

FIG. 131 is a flowchart for illustrating the preparation of VirtualPlayList.

Figure 132:
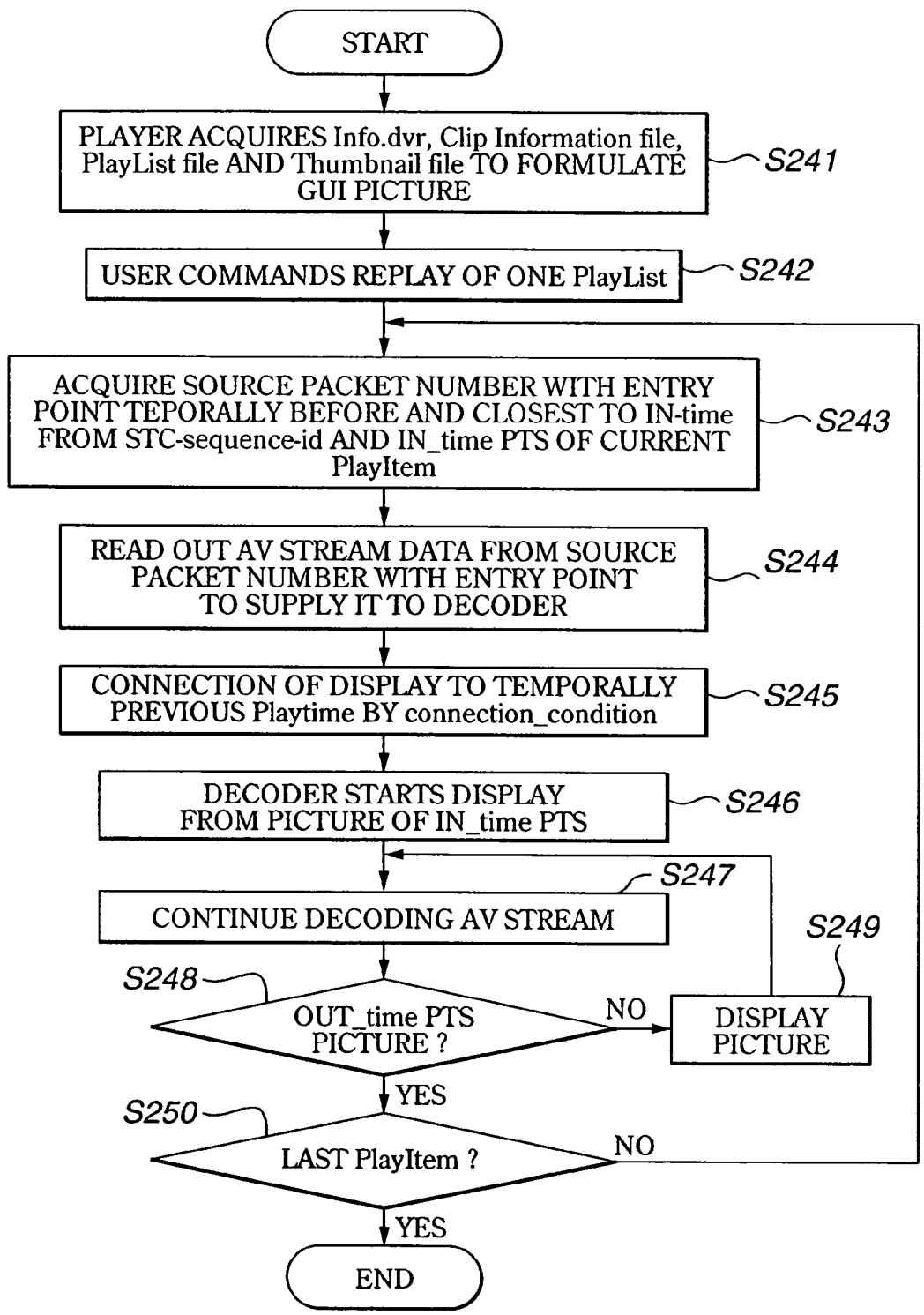

FIG. 132 is a flowchart for illustrating the reproduction of PlayList.

Figure 133:
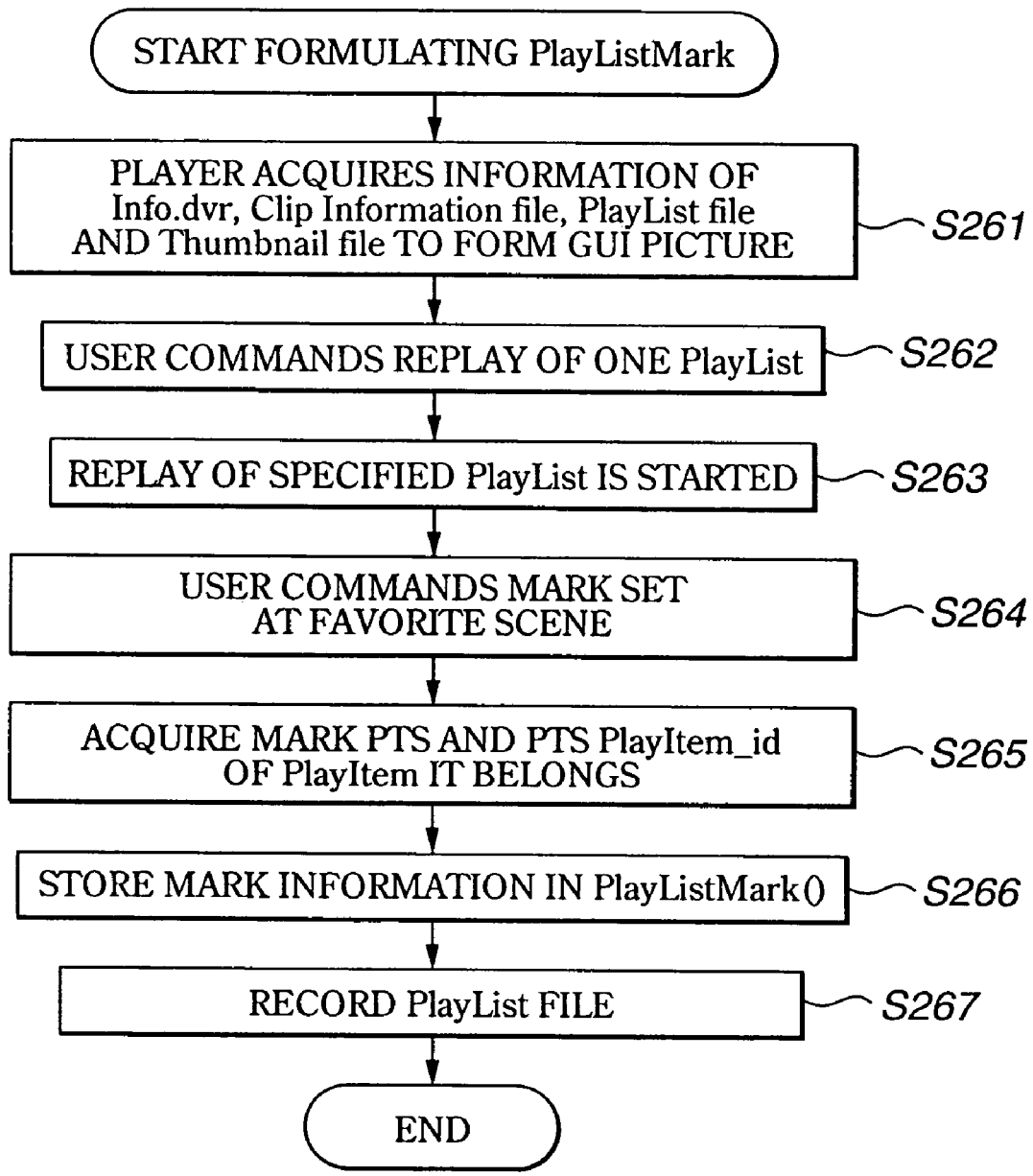

FIG. 133 is a flowchart for illustrating the preparation of PlayListMark.

Figure 134:
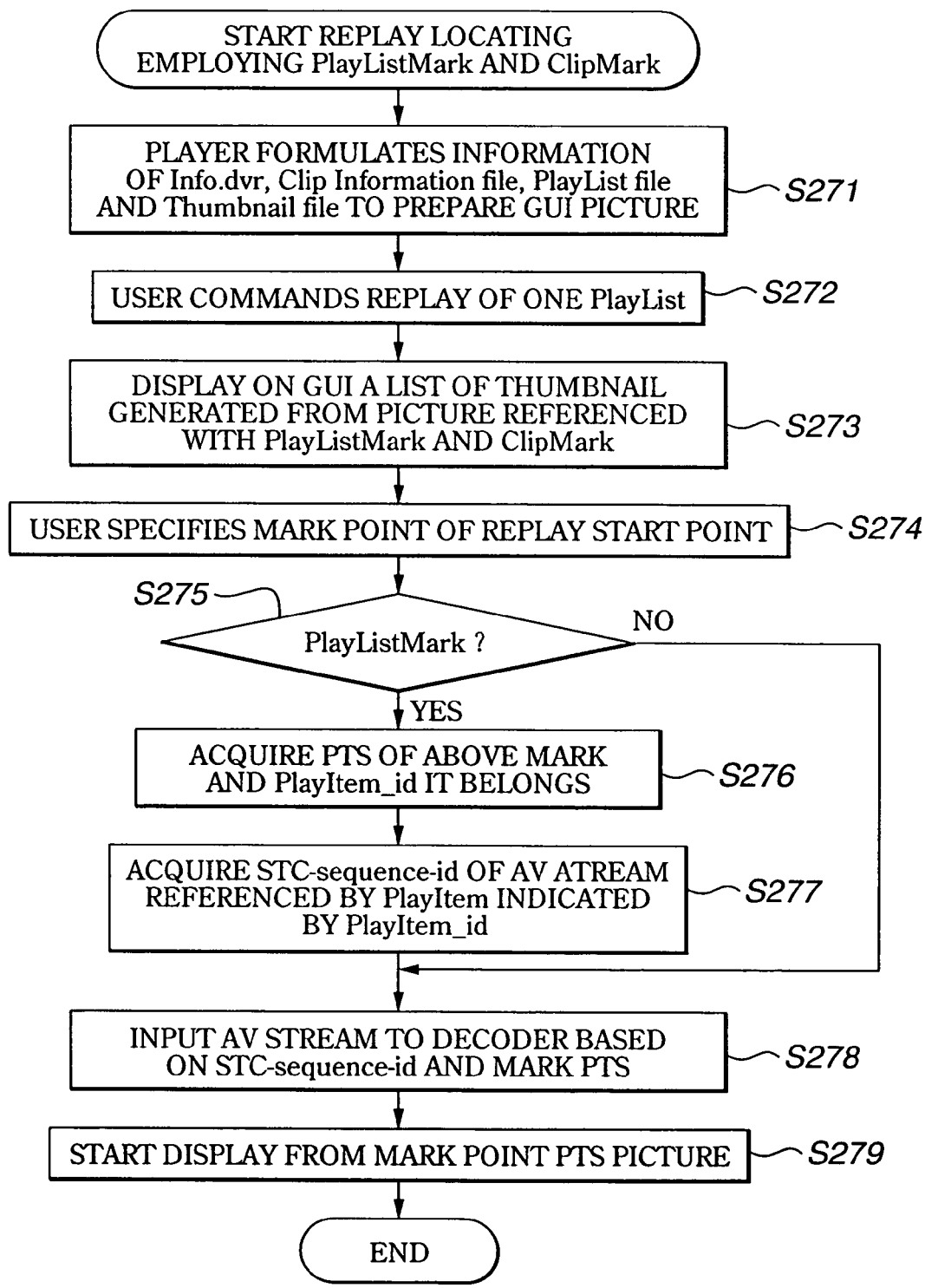

FIG. 134 is a flowchart for illustrating the locating reproduction for reproducing PlayList.

FIG. 135 shows the syntax of PlayListMark.

FIG. 136 illustrates Mark_type of PlayListMark.

FIG. 137 shows another syntax of ClipMark.

FIG. 138 illustrates mark_type of ClipMark.

Figure 139:
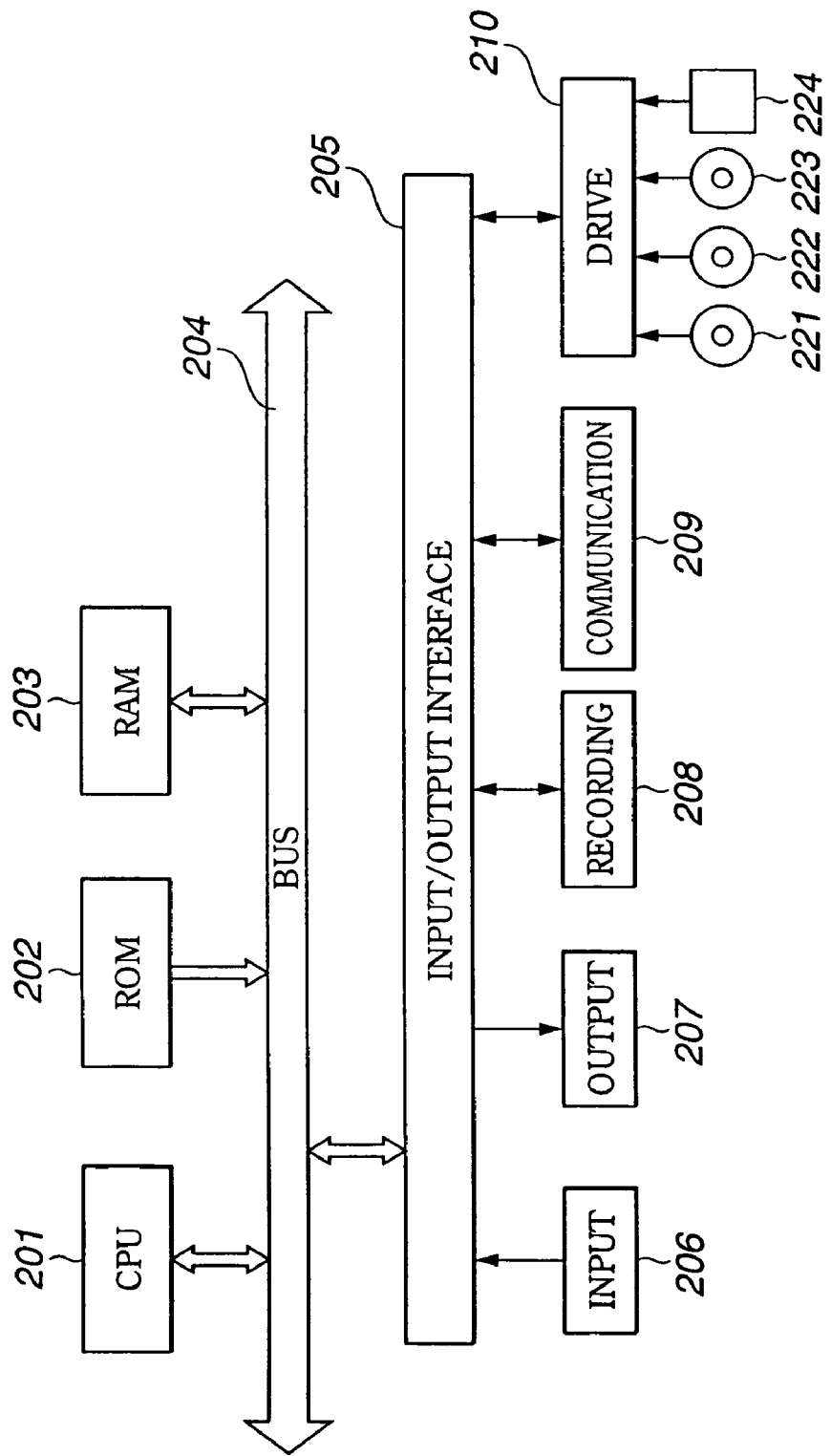

FIG. 139 illustrates a medium.

BEST MODE FOR CARRYING OUT THE INVENTION

Figure 1:
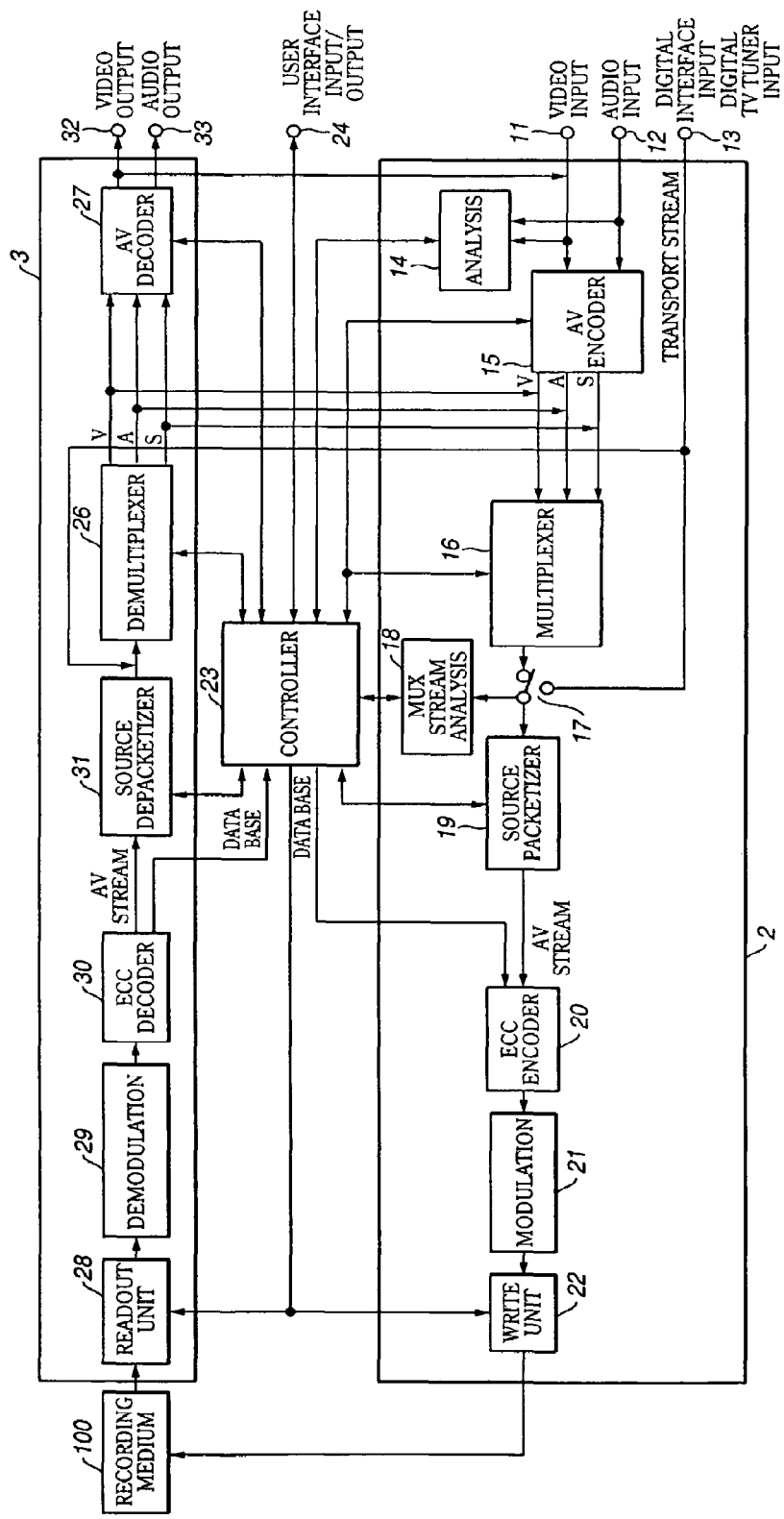
FIG. 1 shows a configuration of an embodiment of a recording and/or reproducing apparatus according to the present invention.

Referring to the drawings, present embodiment of the present invention will be explained in detail. FIG. 1 shows a typical inner structure of a recording and/or reproducing apparatus 1 embodying the present invention. First, the structure of a recording unit 2, configured for recording signals input from outside, is explained. The recording and/or reproducing apparatus 1 is configured for being fed with and recording analog or digital data.

Analog video signals and analog audio signals are fed to terminals 11, 12, respectively. The video signals, input to the terminal 11, are output to an analysis unit 14 and to an AV encoder 15. The audio signals, input to the terminal 12, are output to the analysis unit 14 and to the AV encoder 15. The analysis unit 14 extracts feature points, such as scene changes, from the input video and audio signals.

The AV encoder 15 encodes input video and audio signal to output the system information (S), such as an encoded video stream (V), an encoded audio stream (A) and AV synchronization, to a multiplexer 16.

The encoded video stream is a video stream encoded e.g., with the MPEG (Moving Picture Expert Group) 2 system, whilst the encoded audio stream is an audio stream encoded in accordance with the MPEG1 system, with the encoded audio stream being e.g., an audio stream encoded in e.g., the MPEG1 system or an audio stream encoded in accordance with the Dolby AC3™ system. The multiplexer 16 multiplexes the input video and audio streams, based on the input system information, to output a multiplexed stream through a switch 17 to a multiplexed stream analysis unit 18 and to a source packetizer 19.

The multiplexed stream is e.g., an MPEG-2 transport stream or an MPEG2 program stream. The source packetizer 19 encodes the input multiplexed stream into an AV stream composed of source packets in accordance with an application format of a recording medium 100 on which to record the stream. The AV stream is processed in ECC (error correction and coding) unit 20 and a modulation unit 21 with appendage of ECC codes and with modulation, before being output to a write unit 22, which then writes (records) an AV stream file based on a control signals output by the controller 23.

The transport stream, such as digital television broadcast, input from a digital interface or a digital television tuner, is input to a terminal 13. There are two recording systems for recording the transport stream input to the terminal 13, one being a transparent recording system and the other being a system in which recording is preceded by re-encoding aimed to lower e.g., the recording bit rate. The recording system command information is input from a terminal 24 as a user interface to a controller 23.

In the transparent recording of the input transport stream, a transport stream, input to a terminal 13, is output through a switch 17 to a multiplexed stream analysis unit 18 and to the source packetizer 19. The ensuing processing of recording an AV stream on a recording medium is the same as that of encoding and recording analog input audio and video signals, as described above, and hence is not explained here for simplicity.

If the input transport stream is re-encoded and subsequently recorded, the transport stream, input to the terminal 13, is fed to a demultiplexer 26, which demultiplexes the input transport stream to extract a video stream (V), an audio stream (A) and the system information (S).

Of the stream (information), as extracted by the demultiplexer 26, the video stream is output to an audio decoder 27, whilst the audio stream and the system information are output to the multiplexer 16. The audio decoder 27 decodes the input transport stream to output the encoded video stream (V) to the multiplexer 16.

The audio stream and the system information, output from the demultiplexer 26 and input to the multiplexer 16, and the video stream, output by the AV encoder 15, are multiplexed, based on the input system information, and output to the multiplexed stream analysis unit 18 and to the source packetizer 19 through switch 17, as a multiplexed stream. The ensuing processing of recording an AV stream on a recording medium is the same as that of encoding and recording analog input audio and video signals, as described above, and hence is not explained here for simplicity.

The recording and/or reproducing apparatus 1 of the present embodiment records a file of the AV stream on the recording medium 100, while also recording the application database information which accounts for the file. The input information to the controller 23 is the feature information for the moving picture from the analysis unit 14, the feature information of the AV stream from the multiplexed stream analysis unit 18 and the user command information input at a terminal 24.

The feature information of the moving picture, supplied from the analysis unit 14, is generated by the analysis unit 14 when the AV encoder 15 encodes video signals. The analysis unit 14 analyzes the contents of the input video and audio signals to generate the information pertinent to the pictures characteristic of the input moving picture signals (clip mark). This information is the information indicating a picture of characteristic clip mark points, such as program start points, scene change points, CM commercial start and end points, title or telop in input video signals, and also includes a thumbnail of the picture and the information pertinent to stereo/monaural switching points and muted portions of audio signals.

The above picture indicating information is fed through controller 23 to the multiplexer 16. When multiplexing a encoded picture specified as clip mark by the controller 23, the multiplexer 16 returns the information for specifying the encoded picture on the AV stream to the controller 23. Specifically, this information is the PTS (presentation time stamp) of a picture or the address information on the AV stream of an encoded version of the picture. The controller 23 stores the sort of feature pictures and the information for specifying the encoded picture on the AV stream in association with each other.

The feature information of the AV stream from the multiplexed stream analysis unit 18 is the information pertinent to the encoding information of the AV stream to be recorded, and is recorded by an analysis unit 18. For example, the feature information includes the time stamp and address information of the I-picture in the AV stream, discontinuous point information of system time clocks, encoding parameters of the AV stream and change point information of the encoding parameters in the AV stream. When transparently recording the transport stream, input from the terminal 13, the multiplexed stream analysis unit 18 detects the picture of the aforementioned clip mark, from the input transport stream, and generates the information for specifying a picture designated by the clip mark and its type.

The user designation information from the terminal 24 is the information specifying the playback domain, designated by the user, character letters for explaining the contents of the playback domain, or the information such as bookmarks or resuming points set by the user for his or her favorite scene.

Based on the aforementioned input information, the controller 23 creates a database of the AV stream (Clip), a database of a group (PlayList) of playback domains (PlayItem) of the AV stream, management information of the recorded contents of the recording medium 100 (info.dvr) and the information on thumbnail pictures. Similarly to the AV stream, the application database information, constructed from the above information, is processed in the ECC unit 20 and the modulation unit 21 and input to the write unit 22, which then records a database file on the recording medium 100.

The above-described application database information will be explained subsequently in detail.

When the AV stream file recorded on the recording medium 100 (files of picture data and speech data) and the application database information, thus recorded on the recording medium 100, are reproduced by a reproducing unit 3, the controller 23 first commands a readout unit 28 to read out the application database information from the recording medium 100. The readout unit 28 reads out the application database information from the recording medium 100, which then reads out the application database information from the recording medium 100 to send the application database information through demodulation and error correction processing by a demodulating unit 29 and an ECC decoder 30 to the controller 23.

Based on the application database information, the controller 23 outputs a list of PlayList recorded on the recording medium 100 to a user interface of the terminal 24. The user selects the PlayList, desired to be reproduced, from the list of PlayLists. The information pertinent to PlayList, specified to be reproduced, is input to the controller 23. The controller 23 commands the readout unit 28 to read out the AV stream file necessary in reproducing the PlayList. In accordance with the command, the readout unit 28 reads out the corresponding AV stream from the recording medium 100 to output the read-out AV stream to the demodulating unit 29. The AV stream, thus input to the demodulating unit 29, is demodulated by preset processing and output through the processing by the ECC decoder 30 to a source depacketizer 31.

The source depacketizer 31 converts the AV stream of the application format, read out from the recording medium 100 and processed in a preset fashion, into a stream processable by the demultiplexer 26. The demultiplexer 26 outputs the system information (S), such as the video stream (V), audio stream (A) or the AV synchronization, forming the playback domain (PlayItem) of the AV stream specified by the controller 23, to the audio decoder 27, which AV decoder 27 decodes the video stream and the audio stream to output the playback video signal and the playback audio signal to associated terminals 32, 33, respectively.

If fed from the terminal 24, as a user interface, with the information instructing random access playback or special playback, the controller 23 determines the readout position of the AV stream from the recording medium 100, based on the contents of the database (Clip) of the AV stream, to command the readout unit 28 to read out the AV stream. If the PlayList as selected by the user is to be reproduced as from a preset time point, the controller 23 commands the readout unit 28 to read out data from an I-picture having a time stamp closest to the specified time point.

When the user has selected a certain clip mark from indexing points or scene change points for the program stored in the ClipMark in the Clip Information, as when the user selects a certain picture from a list of thumbnail pictures, as demonstrated on a user interface, of the indexing points or scene change points stored in the ClipMark, the controller 23 determines the AV stream readout position from the recording medium 100 to command the readout unit 28 to read out the AV stream. That is, the controller 23 commands the readout unit 28 to read out data from an I-picture having an address closest to the address on the AV stream which has stored the picture selected by the user. The readout unit 28 reads out data from the specified address. The read-out data is processed by the demodulating unit 29, ECC decoder 30 and by the source packetizer 19 so as to be supplied to the demultiplexer 26 and decoded by the audio decoder 27 to reproduce AV data indicated by an address of the mark point picture.

If the user has commanded fast forward playback, the controller 23 commands the readout unit 28 to sequentially read out I-picture data in the AV stream in succession based on the database (Clip) of the AV stream.

The readout unit 28 reads out data of the AV stream from a specified random access point. The so read-out data is reproduced through processing by various components on the downstream side.

The case in which the user edits the AV stream recorded on the recording medium 100 is now explained. If desired to specify a playback domain for the AV stream recorded on the recording medium 100, for example, if desired to create a playback route of reproducing a portion sung by a singer A from a song program A, and subsequently reproducing a portion sung by the same singer A from another song program B, the information pertinent to a beginning point (IN-point) and an end point (OUT-point) of the playback domain is input to the controller 23 from the terminal as a user interface. The controller 23 creates a database of the group (PlayList) of playback domains (PlayItem) of the AV streams.

When the user desires to erase a portion of the AV stream recorded on the recording medium 100, the information pertinent to the IN-point and the OUT-point of the erasure domain is input to the controller 23, which then modifies the database of the PlayList so as to refer to only the needed AV streams. The controller 23 also commands the write unit 22 to erase an unneeded stream portion of the AV stream.

The case in which the user desires to specify playback domains of an AV stream recorded on the recording medium to create a new playback route, and to interconnect the respective playback domains in a seamless fashion, is now explained. In such case, the controller 23 creates a database of a group (PlayList) of the playback domains (PlayItem) of the AV stream and undertakes to partially re-encode and re-multiplex the video stream in the vicinity of junction points of the playback domains.

The picture information at the IN-point and that at the OUT-point of a playback domain are input from a terminal 24 to a controller 23. The controller 23 commands the readout unit 28 to read out data needed to reproduce the pictures at the IN-point and at the OUT-point. The readout unit 28 reads out data from the recording medium 100. The data so read out is output through the demodulating unit 29, ECC decoder 30 and the source packetizer 19 to the demultiplexer 26.

The controller 23 analyzes data input to the demultiplexer 26 to determine the re-encoding method for the video stream (change of picture_coding_type and assignment of the quantity of encoding bits for re-encoding) and the re-multiplexing system to send the system to the AV encoder 15 and to the multiplexer 16.

The demultiplexer 26 then separates the input stream into the video stream (V), audio stream (A) and the system information (S). The video stream may be classed into data input to the audio decoder 27 and data input to the multiplexer 16. The former is data needed for re-encoding, and is decoded by the audio decoder 27, with the decoded picture being then re-encoded by the AV encoder 15 and thereby caused to become a video stream. The latter data is data copied from an original stream without re-encoding. The audio stream and the system information are directly input to the multiplexer 16.

The multiplexer 16 multiplexes an input stream, based on the information input from the controller 23, to output a multiplexed stream, which is processed by the ECC unit 20 and the modulation unit 21 so as to be sent to the write unit 22. The write unit 22 records an AV stream on the recording medium 100 based on the control signals supplied from the controller 23.

Figure 2:
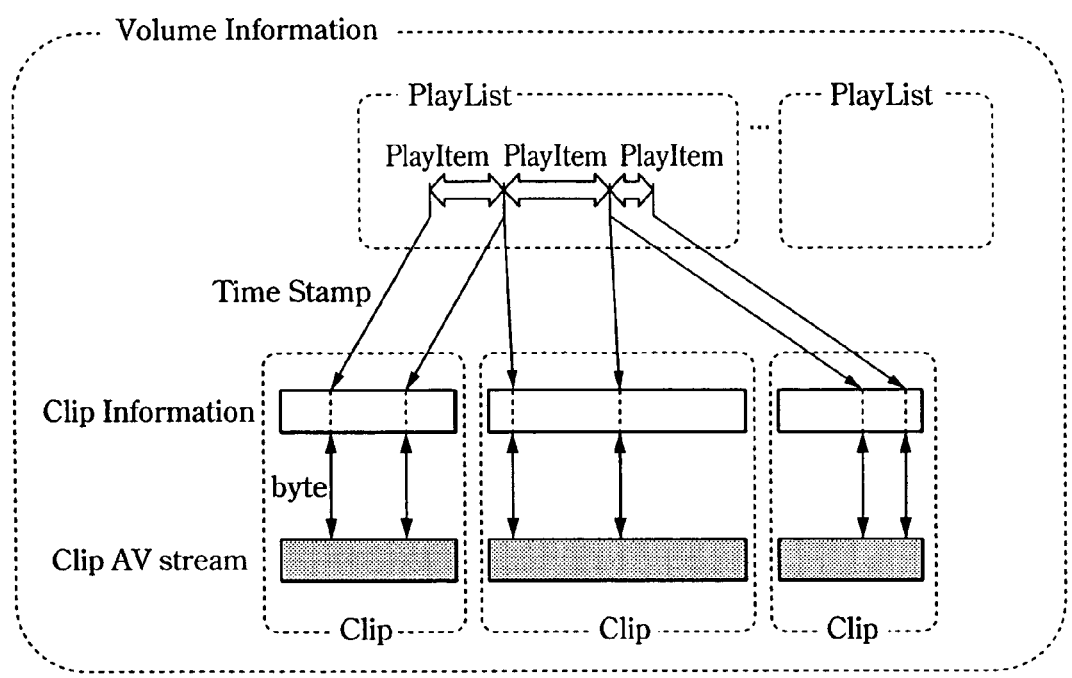
FIG. 2 illustrates the data format of data recorded on a recording medium by a recording and/or reproducing apparatus 1.

The application database information and the operation based on this information, such as playback and editing, are hereinafter explained. FIG. 2 shows the structure of an application format having two layers, that is PlayList and Clip, for AV stream management. The Volume Information manages all Clips and PlayLists in the disc. Here, one AV stream and the ancillary information thereof, paired together, is deemed to be an object, and is termed Clip. The AV stream file is termed a Clip AV stream file, with the ancillary information being termed the Clip Information file.

One Clip AV stream file stores data corresponding to an MPEG-2 transport stream arranged in a structure prescribed by the application format. By and large, a file is treated as a byte string. The contents of the Clip AV stream file are expanded on the time axis, with entry points in the Clip (I-picture) being mainly specified on the time basis. When a time stamp of an access point to a preset Clip is given, the Clip Information file is useful in finding the address information at which to start data readout in the Clip AV stream file.

Figure 3:
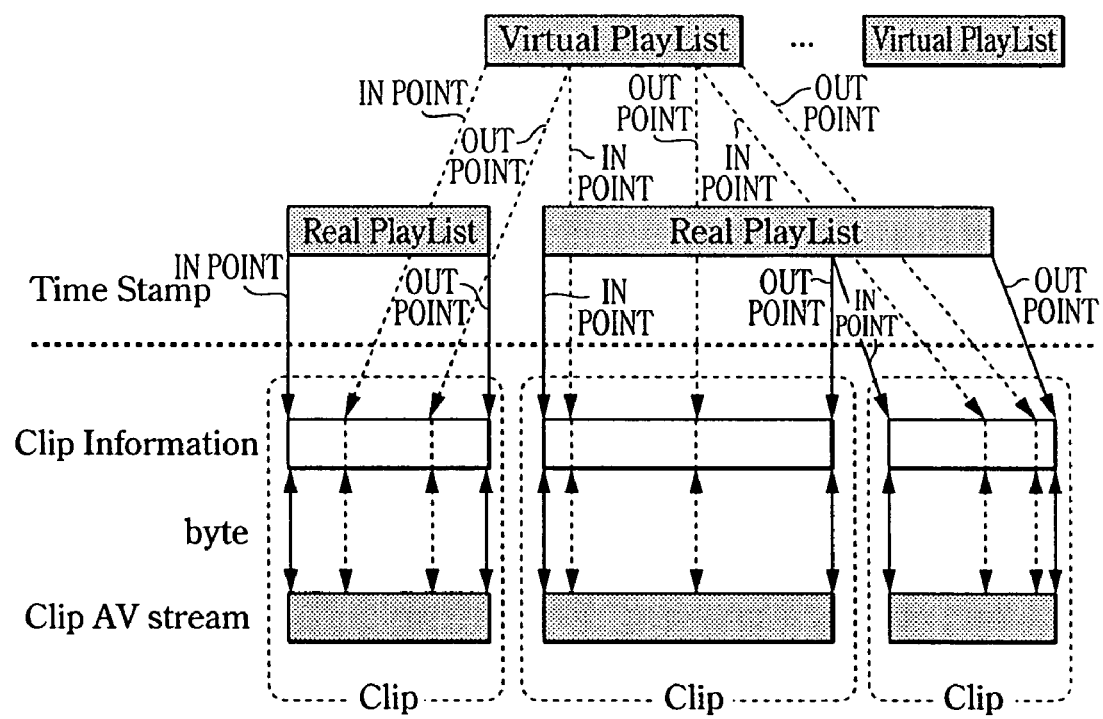
FIG. 3 illustrates Real PlayList and Virtual PlayList.

Referring to FIG. 3, PlayList is now explained, which is provided for a user to select a playback domain desired to be viewed from the Clip and to edit the playback domain readily. One PlayList is a set of playback domains in the Clip. One playback domain in a preset Clip is termed PlayItem and is represented by a pair of an IN-point and an OUT-point on the time axis. So, the PlayList is formed by a set of plural PlayItems.

The PlayList is classified into two types, one of which is Real PlayList and the other of which is Virtual PlayList. The Real PlayList co-owns stream portions of the Clip it is referencing. That is, the Real PlayList takes up in the disc the data capacity corresponding to a stream portion of the Clip it is referencing and, when Real PlayList is erased, the data of the stream portion of the Clip it is referencing is also erased.

The Virtual PlayList is not co-owning Clip data. Therefore, if the Virtual PlayList is changed or erased, the contents of the Clip are in no way changed.

Figure 4A:
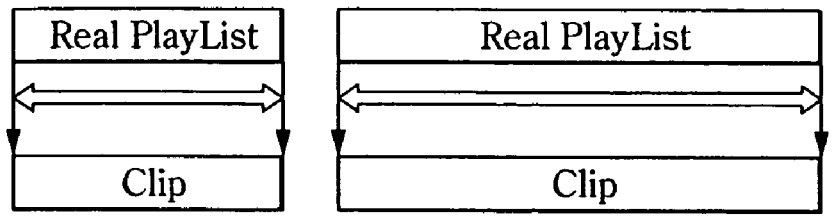
FIGS. 4A, 4B and 4C illustrate the creation of the Real PlayList.

The editing of the Real Playlist is explained. FIG. 4A shows creation of Real PlayList and, if the AV stream is recorded as a new Clip, the Real PlayList which references the entire Clip is a newly created operation.

Figure 4B:
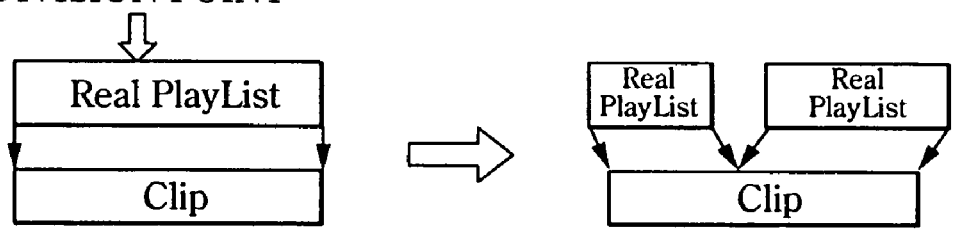

FIG. 4B shows the division of the real PlayList, that is the operation of dividing the Real PlayList at a desired point to split the Real PlayList in two Real PlayLists. This division operation is performed when two programs are managed in one clip managed by a sole PlayList and when the user intends to re-register or re-record the programs as separate individual programs. This operation does not lead to alteration of the Clip contents, that is to division of the Clip itself.

Figure 4C:
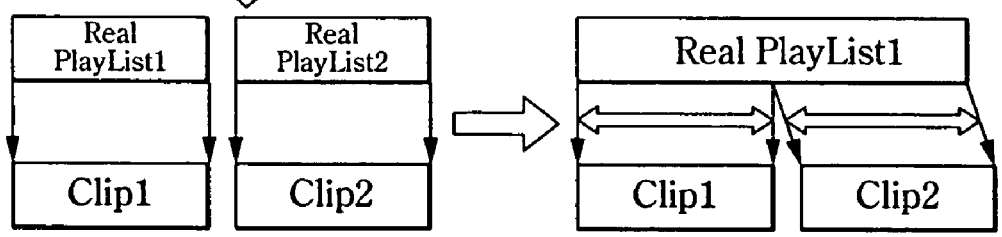

FIG. 4C shows the combining operation of the Real PlayList which is the operation of combining two Real PlayLists into one new Real PlayList. This combining operation is performed such as when the user desires to re-register two programs as a sole program. This operation does not lead to alteration of the Clip contents, that is to combining the clip itself into one.

Figure 5A:
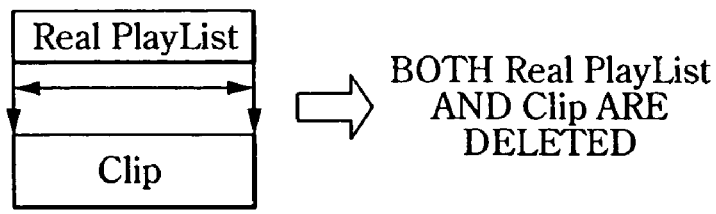
FIGS. 5A, 5B and 5C illustrate deletion of the Real PlayList.

FIG. 5A shows deletion of the entire Real PlayList. If the operation of erasing the entire preset Real PlayList, the associated stream portion of the Clip referenced by the deleted Real PlayList is also deleted.

Figure 5B:
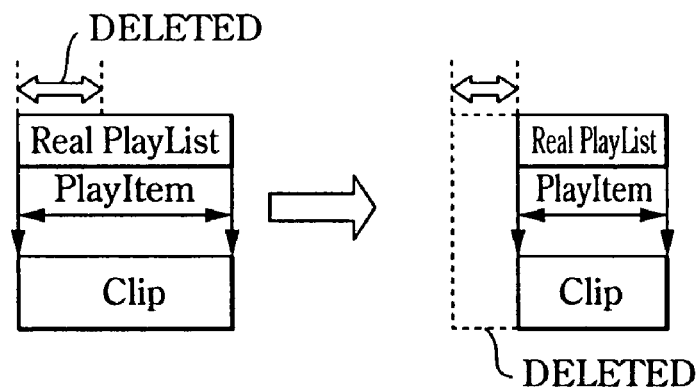

FIG. 5B shows partial deletion of the Real PlayList. If a desired portion of the Real PlayList is deleted, the associated PlayItem is altered to reference only the needed Clip stream portion. The corresponding stream portion of the Clip is deleted.

Figure 5C:
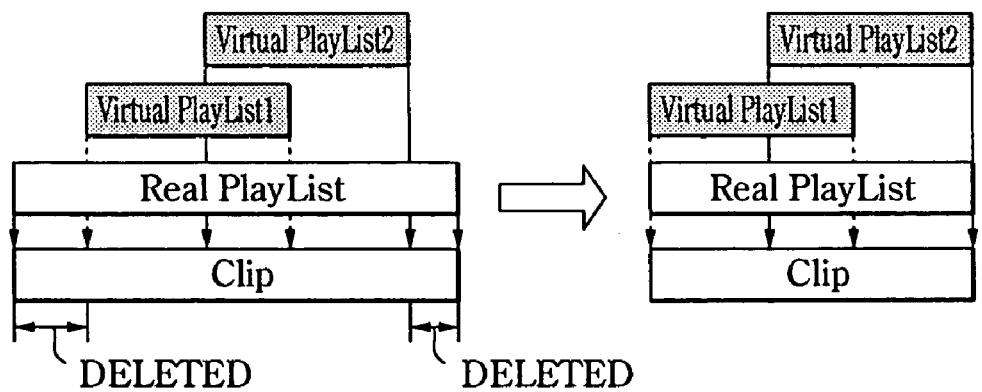

FIG. 5C shows the minimizing of the Real PlayList. It is an operation of causing the PlayItem associated with the Real PlayList to reference only the stream portion of the Clip needed for Virtual PlayList. The corresponding stream portion of the Clip not needed for the Virtual PlayList is deleted.

If the Real PlayList is changed by the above-described operation such that the stream portion of the Clip referenced by the Real PlayList is deleted, there is a possibility that the Virtual PlayList employing the deleted Clip is present such that problems may be produced in the Virtual PlayList due to the deleted Clip.

In order to prevent this from occurring, such a message which runs: "If there exists the Virtual PlayList referencing the stream portion of the Clip the Real PlayList is referencing, and the Real PlayList is deleted, the Virtual PlayList itself is deleted—is it all right?" is displayed for the user in response to the user's operation of deletion by way of confirmation or alarming, after which the processing for deletion is executed or cancelled subject to user's commands. Alternatively, the minimizing operation for the Real PlayList is performed in place of deleting the Virtual PlayList.

Figure 6A:
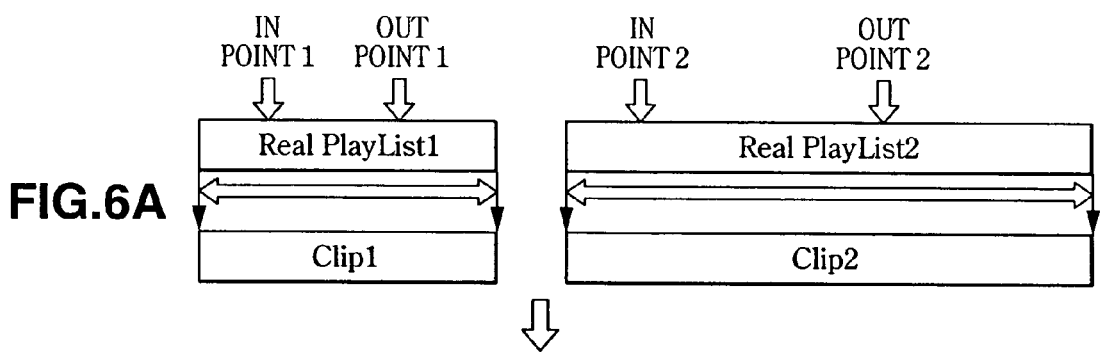
FIGS. 6A and 6B illustrate assemble editing.
Figure 6B:
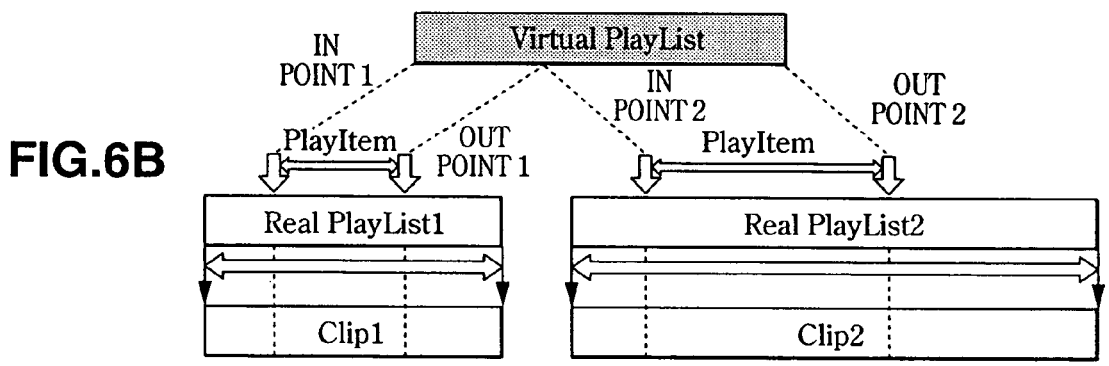

The operation for the Virtual PlayList is now explained. If an operation is performed for the Virtual PlayList, the contents of the Clip are not changed. FIGS. 6A and 6B show the assembling and editing (IN-OUT editing). It is an operation of creating PlayItem of the playback domain the user has desired to view to create Virtual PlayList. The seamless connection between PlayItems is supported by the application format, as later explained.

If there exist two Real PlayLists 1, 2 and clips 1, 2 associated with the respective Real PlayLists, the user specifies a preset domain in the Real PlayList 1 (domain from IN1 to OUT1: PlayItem 1) as the playback domain, and also specifies, as the domain to be reproduced next, a preset domain in the Real PlayList 2 (domain from IN2 to OUT2: PlayItem 2) as the playback domain, as shown in FIG. 6A, a sole Virtual PlayList made up of PlayItem 1 and the PlayItem2 is prepared, as shown in FIG. 6B.

The re-editing of the Virtual PlayList is now explained. The re-editing may be enumerated by alteration of IN- or OUT points in the Virtual PlayList, insertion or appendage of new PlayItems to the Virtual PlayList and deletion of PlayItems in the Virtual PlayList. The Virtual PlayList itself may also be deleted.

Figure 7:
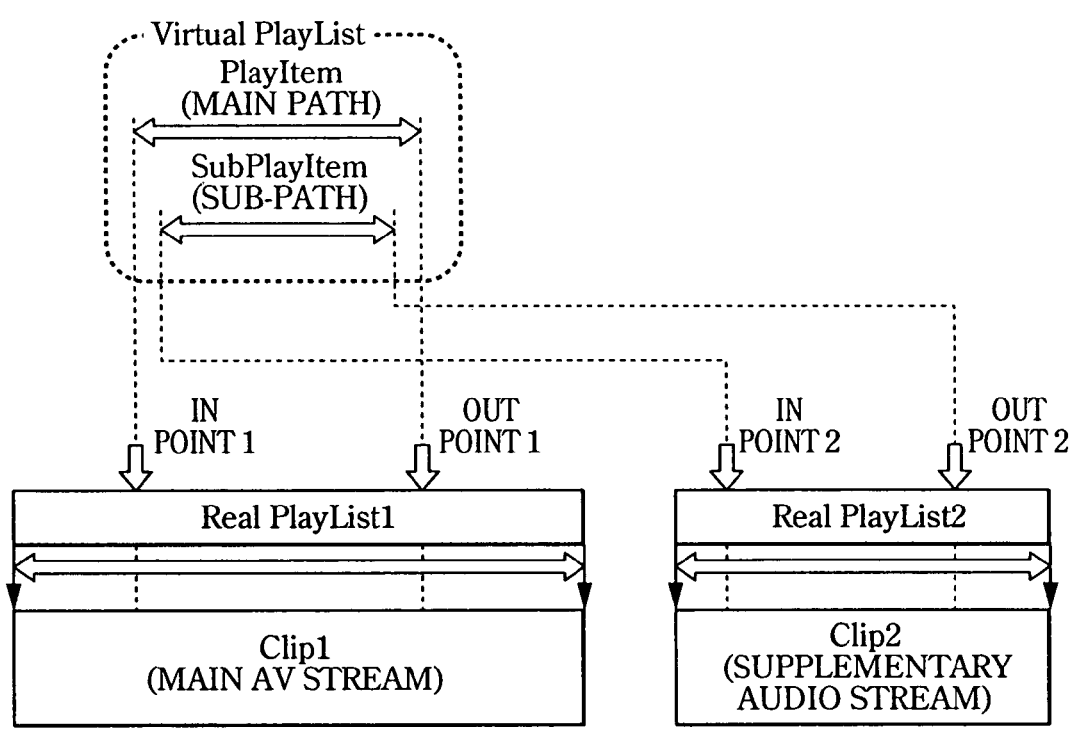
FIG. 7 illustrates provision of a sub path in the Virtual PlayList.

FIG. 7 shows the audio dubbing (post recording) to the Virtual PlayList. It is an operation of registering the audio post recording to the Virtual PlayList as a sub path. This audio post recording is supported by the application software. An additional audio stream is added as a sub path to the AV stream of the main path of the Virtual PlayList.

Figure 8:
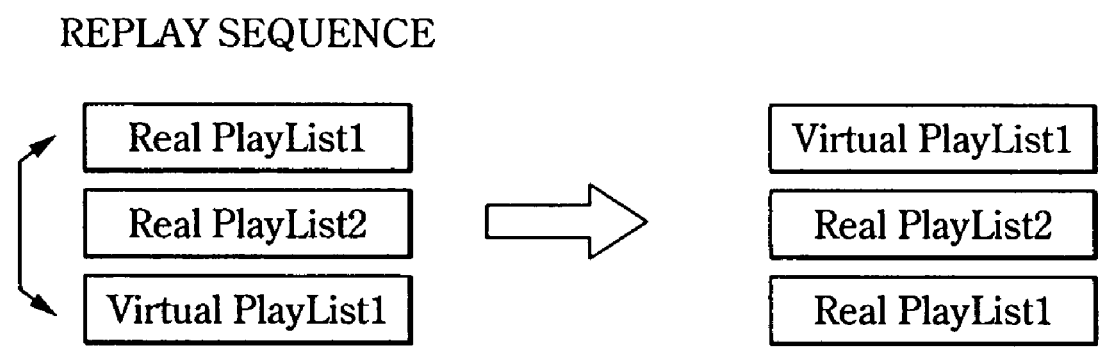
FIG. 8 illustrates the changing of the playback sequence of the PlayList.

Common to the Real PlayList and the Virtual PlayList is an operation of changing (moving) the playback sequence of the PlayList shown in FIG. 8. This operation is an alteration of the playback sequence of the PlayList in the disc (volume) and is supported by TableOfPlayList as defined in the application format, as will be explained subsequently with reference to e.g., FIG. 20. This operation does not lead to alteration of the Clip contents.

Figure 9:
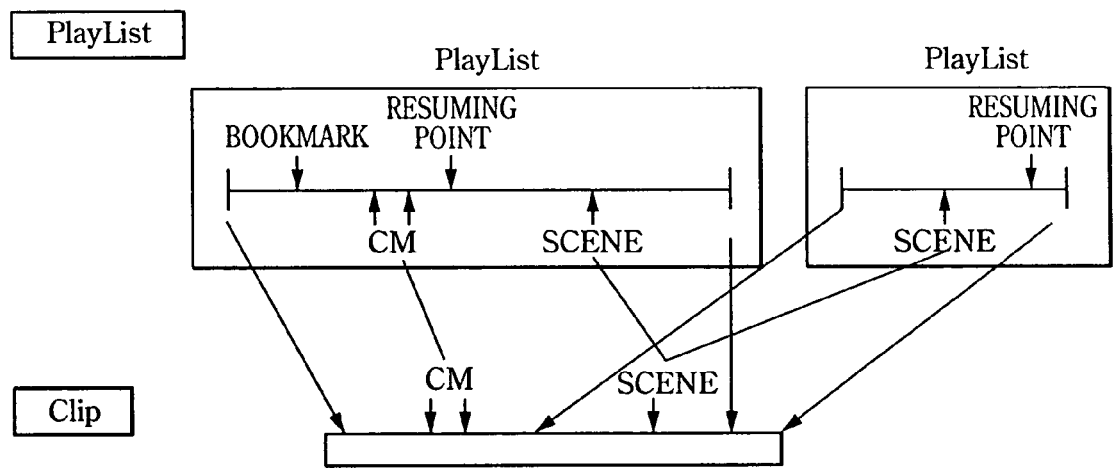
FIG. 9 illustrates a mark on the PlayList and a mark on the Clip.

The mark (Mark) is now explained. The mark is provided for specifying a highlight or characteristic time in the Clip and in the PlayList, as shown in FIG. 9. The mark added to the Clip is termed the ClipMark. The ClipMark is e.g., a program indexing point or a scene change point for specifying a characteristic scene ascribable to contents in the AV stream. The ClipMark is generated by e.g., the analysis unit 14 of FIG. 1. When the PlayList is reproduced, the mark of the Clip referenced by the PlayList may be referenced and used.

The mark appended to the PlayList is termed the PlayListMark (play list mark). The PlayListMark is e.g., a bookmark point or a resuming point as set by the user. The setting of the mark to the Clip and to the PlayList is by adding a time stamp indicating the mark time point to the mark list. On the other hand, mark deletion is removing the time stamp of the mark from the mark list. Consequently, the AV stream is in no way changed by mark setting or by mark deletion.

As another format of the ClipMark, a picture referenced by the ClipMark may be specified on the address basis in the AV stream. Mark setting on the Clip is by adding the address basis information indicating the picture of the mark point to the mark list. On the other hand, mark deletion is removing the address basis information indicating the mark point picture from the mark list. Consequently, the AV stream is in no way changed by mark setting or by mark deletion.

A thumbnail is now explained. The thumbnail is a still picture added to the Volume, PlayList and Clip. There are two sorts of the thumbnail, one of them being a thumbnail as a representative picture indicating the contents. This is mainly used in a main picture in order for the user to select what the or she desired to view on acting on a cursor, not shown. Another sort of the thumbnail is a picture indicating a scene pointed by the mark.

The Volume and the respective PlayLists need to own representative pictures. The representative pictures of the Volume are presupposed to be used for initially demonstrating a still picture representing the disc contents when the disc is set in position in the recording and/or reproducing apparatus 1. It is noted that the disc means the recording medium 100 which is presupposed to be a of disc shape. The representative picture of the PlayList is presupposed to be used as a still picture for representing PlayList contents.

Figure 10:
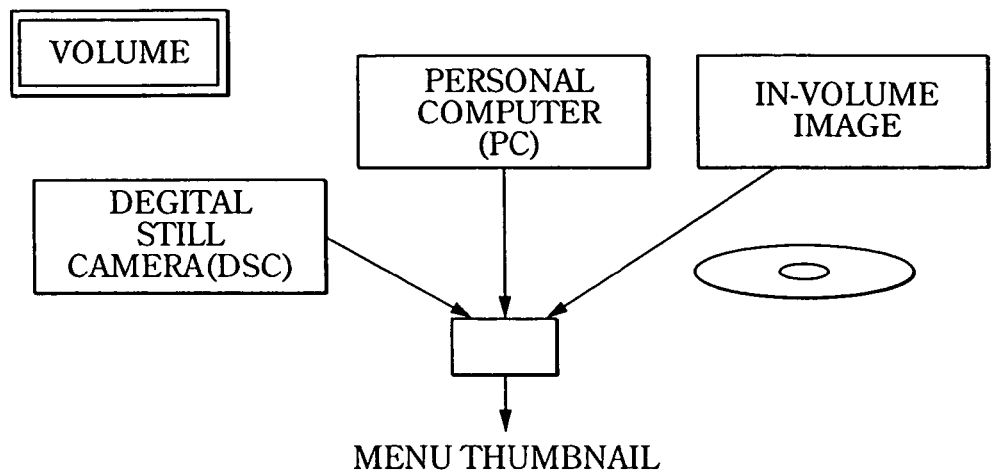
FIG. 10 illustrates a menu thumbnail.

As the representative picture of the PlayList, it may be contemplated to use the initial picture of the PlayList as the thumbnail (representative picture). However, the leading picture at the playback time of 0 is not necessarily an optimum picture representing the contents. So, the user is allowed to set an optional picture as a thumbnail of the PlayList. Two sorts of the thumbnails, that is the thumbnail as a representative picture indicating the Volume and the thumbnail as a representative picture indicating PlayList, are termed menu thumbnails. Since the menu thumbnails are demonstrated frequently, these thumbnails need to be read out at an elevated speed from the disc. Thus, it is efficient to store the totality of the menu thumbnails in a sole file. It is unnecessary for the menu thumbnails to be pictures extracted from the moving pictures in the volume, but may be a picture captured from a personal computer or a digital still camera, as shown in FIG. 10.

On the other hand, the Clip and the PlayList need be marked with plural marks, whilst the pictures of the mark points need to be readily viewed in order to grasp the contents of the mark positions. The picture indicating such mark point is termed a mark thumbnail. Therefore, the picture which is the original of the mark thumbnail is mainly an extracted mark point picture rather than a picture captured from outside.

Figure 11:
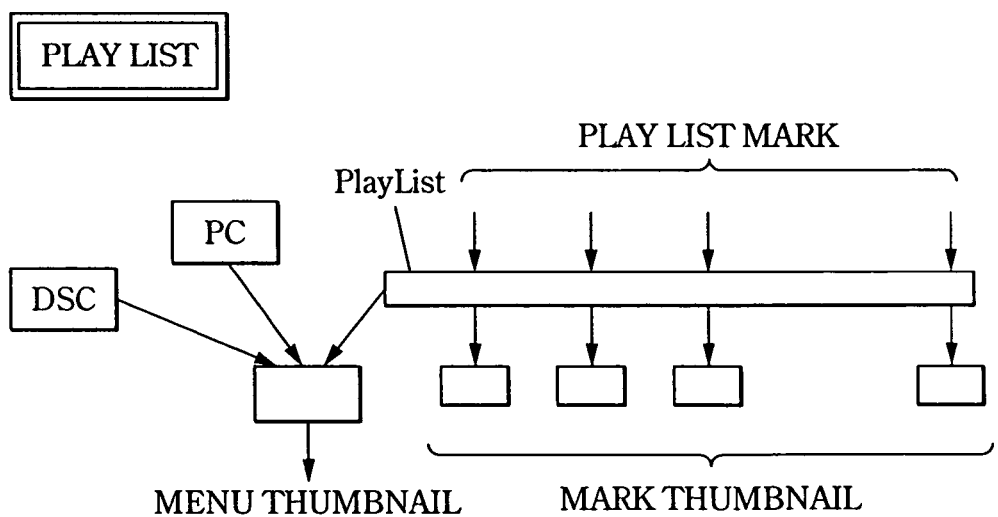
FIG. 11 illustrates mark added to the PlayList.
Figure 12:
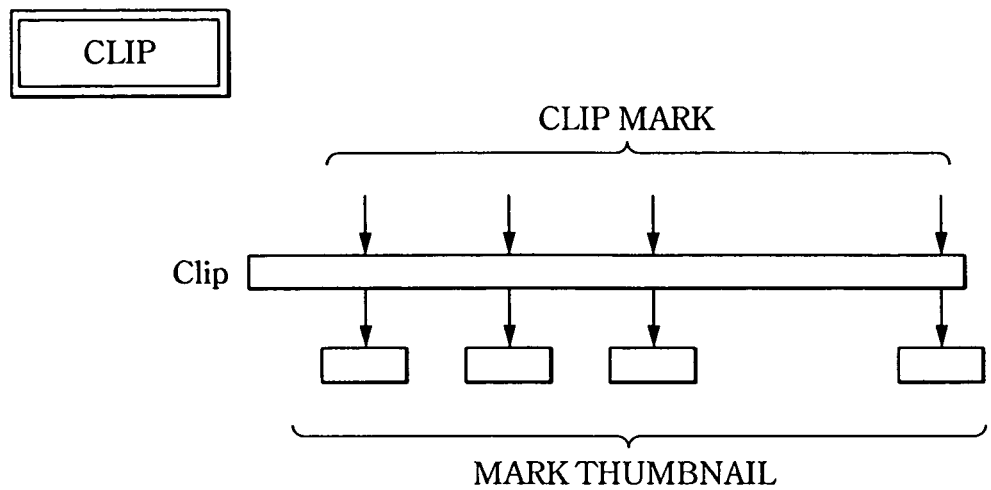
FIG. 12 illustrates a mark added to the Clip.

FIG. 11 shows the relation between the mark affixed to the PlayList and the mark thumbnail, whilst FIG. 12 shows the relation between the mark affixed to the Clip and the mark thumbnail. In distinction from the menu thumbnail, the mark thumbnail is used in e.g., a sub-menu for representing details of the PlayList, while it is not requested to be read out in a short access time. So, whenever a thumbnail is required, the recording and/or reproducing apparatus 1 opens a file and reads out a portion of the file, while there is no problem presented even if file opening and reading out a portion of the file by the recording and/or reproducing apparatus 1 takes some time.

For decreasing the number of files present in a volume, it is preferred for the totality of the mark thumbnails to be stored in one file. While the PlayList may own one menu thumbnail and plural mark thumbnails, the user is not required to select the Clip directly (usually, the Clip is selected through PlayList), and hence there is no necessity of providing menu thumbnails.

Figure 13:
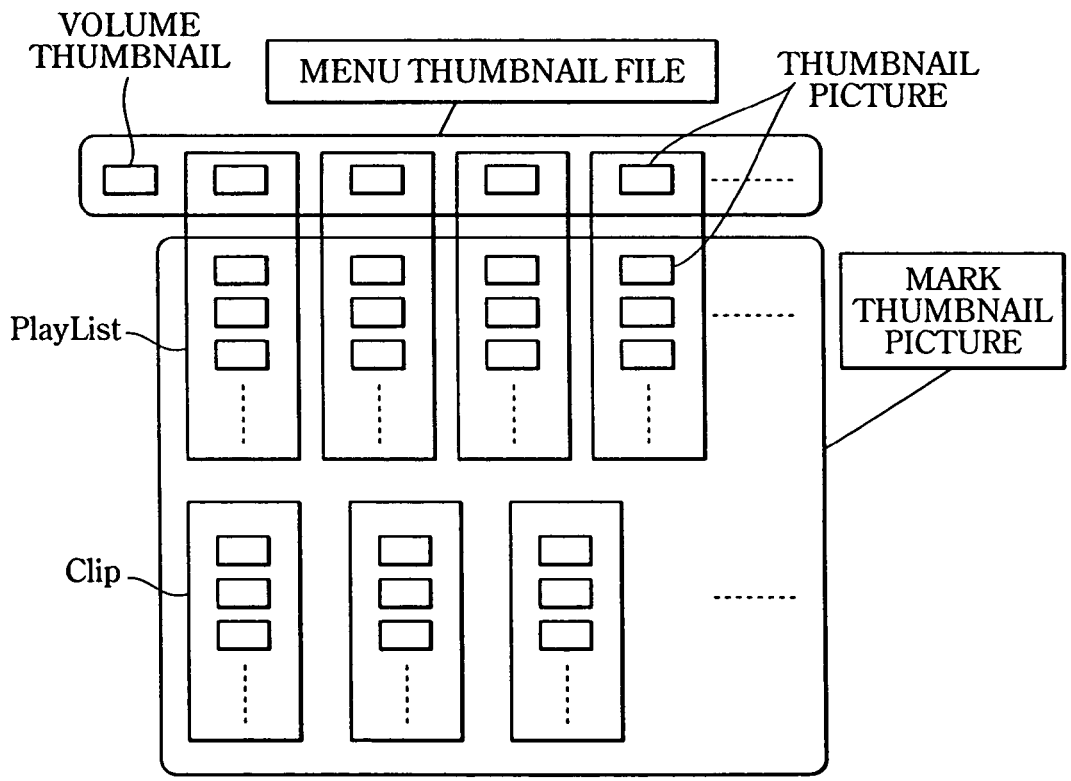
FIG. 13 illustrates the relation between the PlayList, Clip and the thumbnail file.

FIG. 13 shows the relation between the menu thumbnails, mark thumbnails, PlayList and Clips. In the menu thumbnail file are filed menu thumbnails provided from one PlayList to another. In the menu thumbnail file is contained a volume thumbnail representing the contents of data recorded on the disc. In the menu thumbnail file are filed thumbnails created from one PlayList to another and from one Clip to another.

The CPI (Characteristic Point Information) is hereinafter explained. The CPI is data contained in the Clip information file and is used mainly for finding a data address in the Clip AV stream file at which to start the data readout when a time stamp of the access point to the Clip is afforded. In the present embodiment two sorts of the CPI are used, one of them being EP_map and the other being TU_map.

The EP_map is a list of entry point (EP) data extracted from the elementary stream and the transport stream. This has the address information used to find the site of entry points in the AV stream at which to start the decoding. One EP data is made up of a presentation time stamp (PTS) and a data address in the AV stream of the accessing unit associated with the PTS, with the data address being paired to the PTS.

The EP_map is used mainly for two purposes. First, it is used for finding a data address in the AV stream in the accessing unit referenced by the PTS in the PlayList. Second, the EP_map is used for fast forward playback or fast reverse playback. If, in recording the input AV stream by the recording and/or reproducing apparatus 1, the syntax of the stream can be analyzed, the EP_map is created and recorded on the disc.

The TU_map has a list of time unit (TU) data which is derived from the arrival time point of the transport packet input through a digital interface. This affords the relation between the arrival-time-based time and the data address in the AV stream. When the recording and/or reproducing apparatus 1 records an input AV stream, and the syntax of the stream cannot be analyzed, a TU_map is created and recorded on the disc.

The STCInfo stores the discontinuous point information in the AV stream file which stores the MPEG-2 transport stream.

When the AV stream has discontinuous points of STC, the same PTS values may appear in the AV stream file. Thus, if a time point in the AV stream is specified on the PTS basis, the PTS pf the access point is insufficient to specify the point. Moreover, an index of the continuous STC domain containing the PTS is required. In this format, the continuous STC domain and its index are termed an STC-sequence and STC-sequence-id, respectively. The STC-sequence information is defined by the STCInfo of the Clip Information file.

The STC-sequence-id is used in an AV stream file and is optional in the AV stream file having the TU_map.

The programs are each a collection of elementary streams and co-own a sole system time base for synchronized reproduction of these streams.

It is useful for a reproducing apparatus (recording and/or reproducing apparatus 1 of FIG. 1) to know the contents of an AV stream prior to its decoding. These contents include e.g., values of the PID of a transport packet transmitting an audio or video elementary stream or the type of the video or audio components, such as HDTV video or MPEG-2 AAC audio stream. This information is useful for creating a menu screen foy illustrating to the user the contents of the PlayList referencing the AV stream. It is similarly useful for setting the initial state of the AV decoder and the demultiplexer of the respective apparatus.

For this reason, the Clip Information file owns ProgramInfo for illustrating the program contents.

It may be an occurrence that program contents be changed in the AV stream file in which the MPEG-2 transport stream is stored. For example, the PID of the transport packet transmitting the video elementary stream may be changed, or the component type of the video stream may be changed from SDTV to HDTV.

The ProgramInfo stores the information on change points of program contents in the AV stream file. The domain of the AV stream file in which the program contents remain constant is termed program-sequence.

This program-sequence is used in an AV stream file having EP_map and is optional in an AV stream file having TU_map.

The present embodiment defines the self-encoding stream format (SESF). The SESF is used for encoding analog input signals and for decoding digital input signals for subsequently encoding the decoded signal into an MPEG-2 transport stream.

The SESF defines an elementary stream pertinent to the MPEG-2 transport stream and the AV stream. When the recording and/or reproducing apparatus 1 encodes and records input signals in the SESF, an EP_map is created and recorded on the disc.

A digital broadcast stream uses one of the following systems for recording on the recording medium 100: First, the digital broadcast stream is transcoded into an SESF stream. In this case, the recorded stream must conform to SESF and EP_map must be prepared and recorded on the disc.

Alternatively, an elementary stream forming a digital broadcast stream is transcoded to a new elementary stream and re-multiplexed to a new transport stream conforming to the stream format prescribed by the organization for standardizing the digital broadcast stream. In this case, an EP_map must be created and recorded on the disc.

For example, it is assumed that the input stream is an MPEG-2 transport stream conforming to the ISDB (standard appellation of digital BS of Japan), with the transport stream containing the HDTV video stream and the MPEG AAC audio stream. The HDTV video stream is transcoded to an SDTV video stream, which SDTV video stream and the original AAC audio stream are re-multiplexed to TS. The SDTV stream and the transport stream both need to conform to the ISDB format.

Another system of recording the digital broadcast stream on the recording medium 100 is to make transparent recording of the input transport stream, that is to record the input transport stream unchanged, in which case the EP_map is formulated and recorded on the disc.

Alternatively, the input transport stream is recorded transparently, that is an input transport stream is recorded unchanged, in which case TU_map is created and recorded on the disc.

Figure 14:
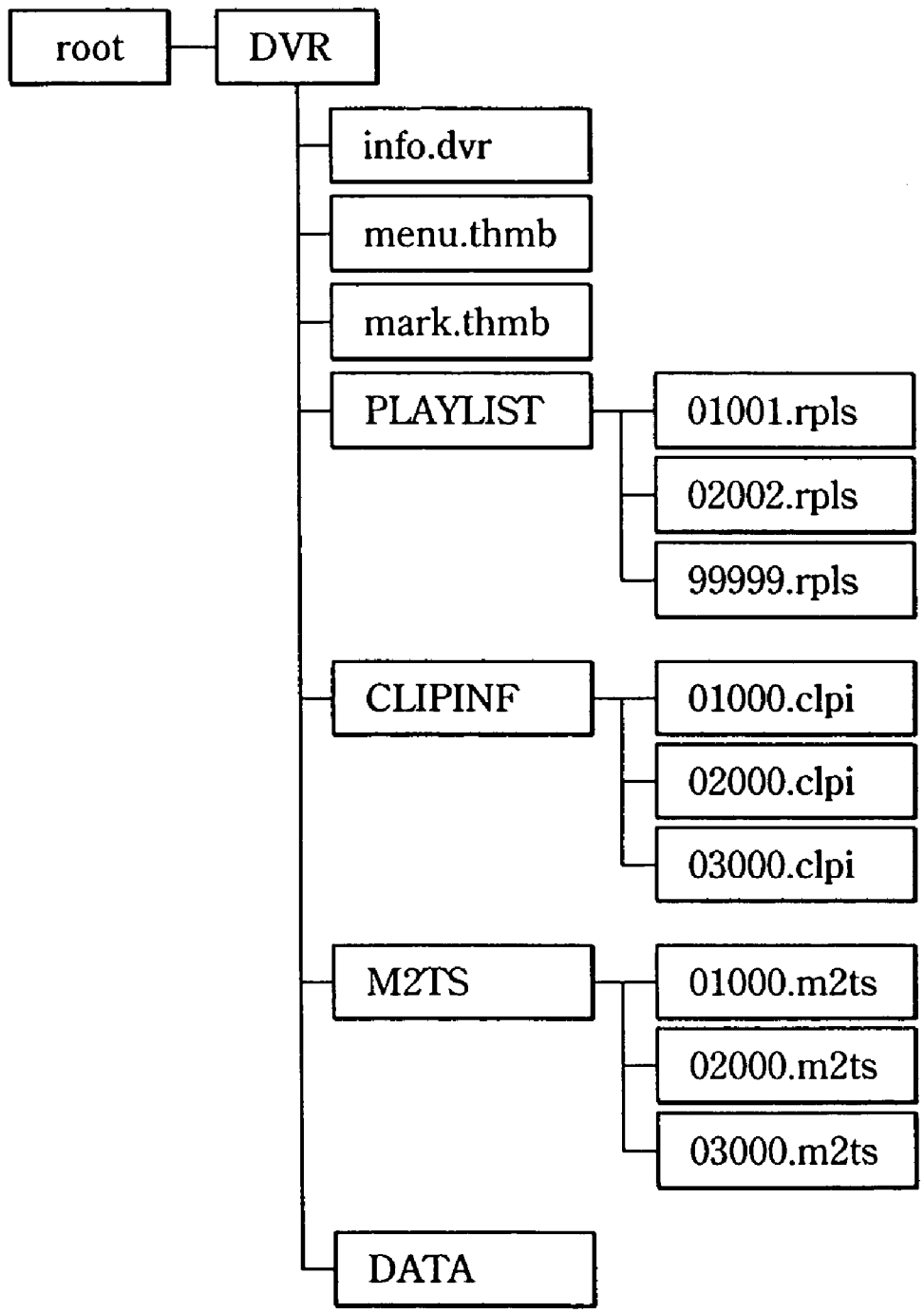
FIG. 14 illustrates a directory structure.

The directory and the file are hereinafter explained. The recording and/or reproducing apparatus 1 is hereinafter described as DVR (digital video recording). FIG. 14 shows a typical directory structure on the disc. The directories of the disc of the DVR may be enumerated by a root directory including "DVR" directory, and the "DVR" directory, including "PLAYLIST" directory, "CLIPINF" directory, "M2TS" directory and "DATA" directory, as shown in FIG. 14. Although directories other than these may be created below the root directory, these are discounted in the application format of the present embodiment.

Below the "DATA" directory, there are stored all files and directories prescribed by the DVR application format. The "DVR" directory includes four directories. Below the "PLAYLIST" directory are placed Real PlayList and Virtual PlayList database files. The latter directory may exist in a state devoid of PlayList.

Below "CLIPINF" is placed a Clip database. This directory, too, may exist in a state devoid of AV stream files. In the "DATA" directory, there are stored files of data broadcast, such as digital TV broadcast.

The "DVR" directory stores the following files: That is, an "info.dvr" is created below the DVR directory to store the comprehensive information of an application layer. Below the DVR directory, there must be a sole info.dvr. The filename is assumed to be fixed to info.dvr. The "menu.thmb" stores the information pertinent to the menu thumbnails. Below the DVR directory, there must be 0 or 1 mark thumbnail. The filename is assumed to be fixed to "menu.thmb". If there is no menu thumbnail, this file may not exist.

The "mark.thmb" file stores the information pertinent to the mark thumbnail picture. Below the DVR directory, there must be 0 or 1 mark thumbnail. The filename is assumed to be fixed to "menu.thmb". If there is no menu thumbnail, this file may not exist.

The "PLAYLIST" directory stores two sorts of the PlayList files which are Real PlayList and Virtual PlayList. An "xxxxx.rpls" file stores the information pertinent to one Real PlayList. One file is created for each Real PlayList. The filename is "xxxxx.rpls", where "xxxxx" denotes five numerical figures from 0 to 9. A file extender must be "rpls".

The "yyyyy.vpls" stores the information pertinent to one Virtual PlayList. One file with a filename "yyyyy,vpls" is created from one Virtual PlayList to another, where "yyyyy" denotes five numerical figures from 0 to 9. A file extender must be "vpls".

The "CLIPINF" directory stores one file in association with each AV stream file. The "zzzzz.clpi" is a Clip Information file corresponding to one AV stream file (Clip AV stream file or Bridge-Clip stream file). The filename is "zzzzz.clpi", where "zzzzz" denotes five numerical figures from 0 to 9. A file extender must be "clpi".

The "M2TS" directory stores an AV stream file. The "zzzzz.m2ts" file is an AV stream file handled by the DVR system. This is a Clip AV stream file or a Bridge-Clip AV stream file. The filename is "zzzzz.m2ts", where "zzzzz" denotes five numerical figures from 0 to 9. A file extender must be "m2ts".

The "DATA" directory stores data transmitted from data broadcasting. This data may, for example, be XML or MPEG files.

The syntax and the semantics of each directory (file) are now explained. FIG. 15 shows the syntax of the "info.dvr" file. The "info.dvr" file is made up of three objects, that is DVRVolume( ), TableOfPlayLists( ) and MakersPrivate Data( ).

The syntax of info.dvr shown in FIG. 15 is explained. The TableOfPlayLists_Start_address indicates the leading address of the TableOfPlayLists( ) in terms of the relative number of bytes from the leading byte of the "info.dvr" file. The relative number of bytes is counted beginning from 0.

The MakersPrivateData_Start_address indicates the leading address of the MakersPrivateData( ), in terms of the relative number of bytes as from the leading byte of the "info.dvr" file. The relative number of bytes is counted from 0. The padding_word is inserted in association with the syntax of "info.dvr". N1 and N2 are optional positive integers. Each padding word may assume an optional value.

The DVRVolume( ) stores the information stating the contents of the volume (disc). FIG. 16 shows the syntax of the DVRVolume. The syntax of the DVRVolume( ), shown in FIG. 16, is now explained. The version_number indicates four character letters indicting the version numbers of the DVRVolume( ). The version_number is encoded to "0045" in association with ISO646.

Length is denoted by 32-bit unsigned integers indicating the number of bytes from directly after the length field to the trailing end of DVRVolume( ).

The ResumeVolume( ) memorizes the filename of the Real PlayList or the Virtual PlayList reproduced last in the Volume. However, the playback position when the user has interrupted playback of the Real PlayList or the Virtual PlayList is stored in the resume-mark defined in the PlayListMark( ) (see FIGS. 42 and 43).

FIG. 17 shows the syntax of the ResumeVolume( ). The syntax of the ResumeVolume( ) shown in FIG. 17 is explained. The valid_flag indicates that the resume_Play List_ name field is valid or invalid when this 1-bit flag is set to 1 or 0, respectively.

The 10-byte field of resume_PlayList_name indicates the filename of the Real PlayList or the Virtual PlayList to be resumed.

The UIAppInfoVolume in the syntax of the DVRVolume( ), shown in FIG. 16, stores parameters of the user interface application concerning the Volume. FIG. 18 shows the syntax of the UIAppInfoVolume, the semantics of which are now explained. The 8-bit field of character_set indicates the encoding method for character letters encoded in the Volume_ name field. The encoding method corresponds to the values shown in FIG. 19.

The 8-bit field of the name_length indicates the byte length of the Volume name indicated in the Volume_name field. The Volume_name field indicates the appellation of the Volume. The number of bytes of the number of the name_length counted from left of the field is the number of valid characters and indicates the volume appellation. The values next following these valid character letters may be any values.

The Volume_protect_flag is a flag indicating whether or not the contents in the Volume can be shown to the user without limitations. If this flag is set to 1, the contents of the Volume are allowed to be presented (reproduced) to the user only in case the user has succeeded in correctly inputting the PIN number (password). If this flag is set to 0, the contents of the Volume are allowed to be presented to the user even in case the PIN number is not input by the user.

If, when the user has inserted a disc into a player, this flag has been set to 0, or the flag is set to 1 but the user has succeeded in correctly inputting the PIN number, the recording and/or reproducing apparatus 1 demonstrates a list of the PlayList in the disc. The limitations on reproduction of the respective PlayLists are irrelevant to the Volume_protect_flag and are indicated by playback_control_flag defined in the UIAppInfoVolume.

The PIN is made up of four numerical figures of from 0 to 9, each of which is coded in accordance with ISO/IEC 646. The ref_thumbnail_index field indicates the information of a thumbnail picture added to the Volume. If the ref_thumbnail_index field is of a value other than 0xFFFF, a thumbnail picture is added to the Volume. The thumbnail picture is stored in a menu.thumb file. The picture is referenced using the value of the ref_thumbnail_index in the menu.thumb file. If the ref_thumbnail_index field is 0xFFFF, it indicates that a thumbnail picture has been added to the Volume.

The TableOfPlayList( ) in the info.dvr syntax shown in FIG. 15 is explained. The TableOfPlayList( ) stores the filename of the PlayList (Real PlayList and Virtual PlayList). All PlayList files recorded in the Volume are contained in the TableOfPlayList( ), which TableOfPlayList( ) indicates the playback sequence of the default of the PlayList in the Volume.

FIG. 20 shows the syntax of the TableOfPlayList( ), which is now explained. The version_number of the TableOfPlayList( ) indicates four character letters indicating the version numbers of the TableOfPlayLists. The version_number must be encoded to "0045" in accordance with ISO 646.

Length is a unsigned 32-bit integer indicating the number of bytes of the TableOfPlayList( ) from directly after the length field to the trailing end of the TableOfPlayList( ). The 16-bit field of the number_of_PlayLists indicates the number of loops of the for-loop inclusive of the PlayList_file_name. This numerical figure must be equal to the number of Play Lists recorded in the Volume. The 10-byte numerical figure of the PlayList_file_name indicates the filename of the Play Lists.

FIG. 21 shows another configuration of the syntax of the TableOfplayList( ). The syntax shown in FIG. 21 is comprised of the syntax shown in FIG. 20 in which is contained the UIAppInfoPlayList. By such structure including the UIAppInfoPlayList, it becomes possible to create a menu picture simply on reading out the TableOfPlayLists. The following explanation is premised on the use of the syntax shown in FIG. 20.

The MakersPrivateData in the info.dvr shown in FIG. 15 is explained. The MakersPrivateData is provided to permit the maker of the recording and/or reproducing apparatus 1 to insert private data of the maker in the MakersPrivateData( ) for special applications of different companies. The private data of each maker has standardized maker_ID for identifying the maker who has defined it. The MakersPrivateData( ) may contain one or more maker_ID.

If a preset maker intends to insert private data, and the private data of a different maker is already contained in the MakersPrivateData( ), the new private data is added to the MakersPrivateData( ) without erasing the pre-existing old private data. Thus, in the present embodiment, private data of plural makers can be contained in one MakersPrivateData( ).

FIG. 22 shows the syntax of the MakersPrivateData. The syntax of the MakersPrivateData shown in FIG. 22 is explained. The version_number of the TableOfPlayList( ) indicates four character letters indicating the version numbers of the TableOfPlayLists. The version_number must be encoded to "0045" in accordance with ISO 646. Length is a unsigned 32-bit integer indicating the number of bytes of the TableOfPlayList( ) from directly after the length field to the trailing end of the MakersPrivateData( ).

The mpd_blocks_start_address indicates the leading end address of the first mpd_block( ) in terms of the relative number of bytes from the leading byte of the MakersPrivateData( ). The number_of_maker_entries is the 16-bit codeless integer affording the number of entries of the maker private data included in the MakersPrivateData( ). There must not be present two or more maker private data having the same maker_ID values in the MakersPrivateData( ).

The mpd_blocks_size is a 16-bit unsigned integer affording one mpd_block size in terms of 1024 bytes as a unit. For example, if mpd_block_size=1, it indicates that the size of one mpd_block is 1024 bytes. The number_of mpd_blocks is a 16-bit unsigned integer affording the number of mpd_blocks contained in the MakersPrivateData( ). The maker_ID is the 16-bit unsigned integer indicating the model number code of the DVR system which has created the maker private data. The value encoded to the maker_ID is specified by the licensor.

The maker_model_code is a 16-bit unsigned integer indicating the model number code of the DVR system which has created the maker private data. The value encoded to the maker_model_code is set by the maker who has received the license of the format. The start_mpd_block_number is a 16-bit unsigned integer indicating the number of the mpd_block number at which begins the maker private data. The leading end of the maker private data must be aligned with the leading end of the mpd_block. The start_mpd_block_number corresponds to a variable j in the for-loop of the mpd_block.

The mpd_length is a 32-bit unsigned integer indicating the size of the maker private data. The mpd_block is an area in which is stored maker private data. All of the mpd_blocks in the MakersPrivateData( ) must be of the same size.

The real PlayList file and the Virtual PlayList file, in other words, xxxxx.rpls and yyyyy.vpls, are explained. FIG. 23 shows the syntax of xxxxx.rpls (Real PlayList) and yyyyy.vpls (Virtual PlayList), which are of the same syntax structure. Each of the xxxxx.rpls and yyyyy.vpls is made up of three objects, that is PlayList( ), PlayListMark( ) and Makers PrivateData( ).

The PlayListMark_Start_address indicates the leading address of the PlayListMark( ), in terms of the relative number of bytes from the leading end of the PlayList file as a unit. The relative number of bytes is counted from zero.

The MakersPrivateData_Start_address indicates the leading address of the MakersPrivateData( ), in terms of the relative number of bytes from the leading end of the PlayList file as a unit. The relative number of bytes is counted from zero.

The padding_word (padding word) is inserted in accordance with the syntax of the PlayList file, with N1 and N2 being optional positive integers. Each padding word may assume an optional value.

PlayList will be further explained in the following although it has been explained briefly. A playback domain in all Clips except Bridge-Clip must be referred by all PlayLists in the disc. Also, two or more Real PlayLists must not overlap the playback domains shown by their PlayItems in the same Clip.

Figure 24A:
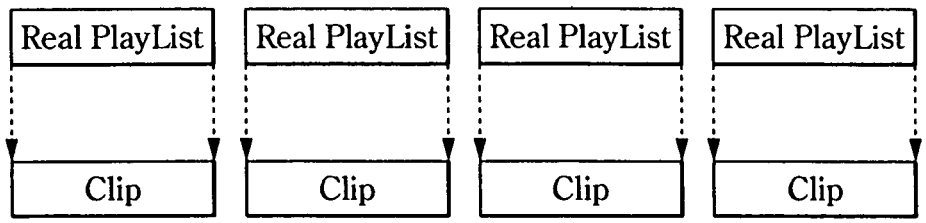
FIGS. 24A to 24C illustrate the PlayList.
Figure 24B:
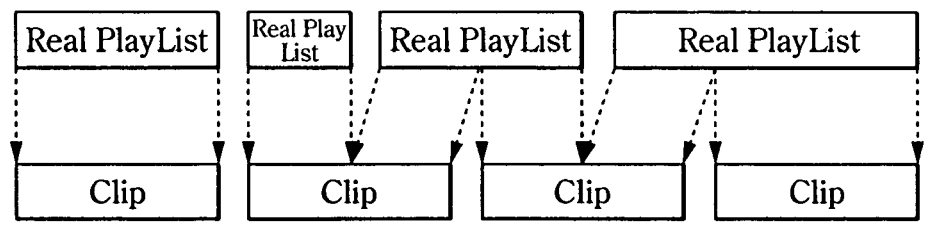
Figure 24C:
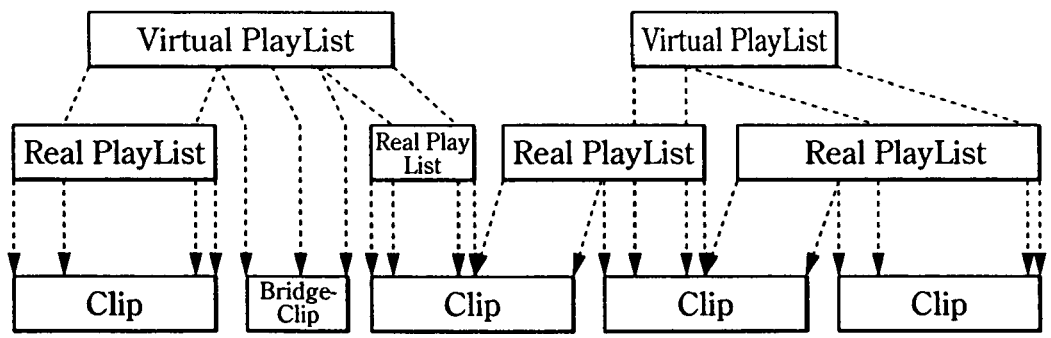

Reference is made to FIGS. 24A, 24B and 24C. For all Clips, there exist corresponding Real PlayLists, as shown in FIG. 24A. This rule is observed even after the editing operation has come to a close, as shown in FIG. 24B. Therefore, all Clips must be viewed by referencing one of Real PlayLists.

Referring to FIG. 24C, the playback domain of the Virtual PlayList must be contained in the playback domain and in the Bridge-Clip playback domain. There must not be present in the disc Bridge-Clip not referenced by any Virtual PlayList.

The Real PlayList, containing the list of the PlayItem, must not contain SubPlayItem. The Virtual PlayList contains the PlayItem list and, if the CPI_type contained in the PlayList( )

is the EP_map type and the PlayList_type is 0 (PlayList containing video and audio), the Virtual PlayList may contain one SubPlayItem. In the PlayList( ) in the present embodiment, the SubPlayItem is used only for audio post recording. The number of the SubPlayItems owned by one Virtual PlayList must be 0 or 1.

The PlayList is hereinafter explained. FIG. 25 shows the PlayList syntax which is now explained. The version_number indicates four character letters indicting the version numbers of the PlayList( ). The version_number is encoded to "0045" in association with ISO 646. Length is a 32-bit unsigned integer indicating the total number of byte of the PlayList( ) as from directly after the length field to the trailing end of the PlayList( ). The PlayList_type, one example of which is shown in FIG. 26, is an 8-bit field indicating the PlayList type.

The CPI_type is one-bit flag indicating the value of the CPI_type of the Clip referenced by the PlayItem( ) and by the SubPlayItem( ). The CPI_types defined in the CPIs of all Clips referenced by one PlayList must be of the same values. The number_of_PlayItems is a 16-bit field indicating the number of PlayItems present in the PlayList.

The PlayItem_id corresponding to the preset PlayItem( ) is defined by the sequence in which the PlayItem( ) appears in the for-loop containing the PlayItem( ). The PlayItem_id begins with 0. The number_of_SubPlayItems is a 16-bit field indicating the number of SubPlayItem in the PlayList. This value is 0 or 1. An additional audio stream path (audio stream path) is a sort of a sub path.

The UIAppInfoPlayList of the PlayList syntax shown in FIG. 25 is explained. The UIAppInfoPlayList stores parameters of the user interface application concerning the PlayList. FIG. 27 shows the syntax of the UIAppInfoPlayList, which is now explained. The character_set is an 8-bit field indicating the method for encoding character letters encoded in the PlayList_name field. The encoding method corresponds to the values conforming to the table shown in FIG. 19.

The name_length is an 8-bit field indicating the byte length of the PlayList name indicated in the PlayList_name field. The PlayList_name field shows the appellation of the Play List. The number of bytes of the number of the name_length counted from left of the field is the number of valid characters and indicates the PlayList appellation. The values next following these valid character letters may be any values.

The record_time_and_date is a 56-bit field storing the date and time on which the PlayList was recorded. This field is 14 numerical figures for year/month/day/hour/minute/second encoded in binary coded decimal (BCD). For example, 2001/12/23:01:02:03 is encoded to "0x20011223010203".

The duration is a 24-bit field indicating the total replay time of the PlayList in terms of hour/minute/second as a unit. This field is six numerical figures encoded in binary coded decimal (BCD). For example, 01:45:30 is encoded to "0x014530".

The valid_period is a 32-bit field indicating the valid time periods of the PlayList. This field is 8 numerical figures encoded in 4-bit binary coded decimal (BCD). The valid_period is used in the recording and/or reproducing apparatus 1 e.g., when the PlayList, for which the valid period has lapsed, is to be automatically erased. For example, 2001/05/07 is encoded to "0x20010507".

The maker_ID is a 16-bit unsigned integer indicating the maker of the DVR player (recording and/or reproducing apparatus 1) which has been the last to update its PlayList. The value encoded to maker_ID is assigned to the licensor of the DVR format. The maker_code is a 16-bit unsigned integer indicating the model number of the DVR player which has been the last to update the PlayList. The value encoded to the maker_code is determined by the maker who has received the license of the DVR format.

If the flag of the playback_control_flag is set to 1, its PlayList is reproduced only when the user successfully entered the PIN number. If this flag is set to 0, the user may view the PlayList without the necessity of inputting the PIN number.

If the write_protect_flag is set to 1, the contents of the PlayList are not erased nor changed except the write_protect_flag. If this flag is set to 0, the user is free to erase or change the PlayList. If this flag is set to 1, the recording and/or reproducing apparatus 1 demonstrates a message requesting re-confirmation by the user before the user proceeds to erase, edit or overwrite the PlayList.

The Real PlayList, in which the write_protect_flag is set to 0, may exist, the Virtual PlayList, referencing the Clip of the Real PlayList may exist, and the write_protect_flag of the Virtual PlayList may be set to 1. If the user is desirous to erase the Real PlayList, the recording and/or reproducing apparatus 1 issues an alarm to the user as to the presence of the aforementioned Virtual PlayList or "minimizes" the Real PlayList before erasing the Real PlayList.

If is_played_flag is set to 1, as shown in FIG. 28B, it indicates that the PlayList was reproduced at least once since it was recorded, whereas, if it is set to 0, it indicates that the PlayList was not reproduced even once since it was recorded.

Archive is a two-bit field indicating whether the PlayList is an original or a copy, as shown in FIG. 28C. The field of ref_thumbnail_index indicates the information of a thumbnail picture representative of the PlayList. If the ref_thumbnail_index field is of a value other than 0xFFFF, a thumbnail picture representative of the PlayList is added in the PlayList, with the PlayList being stored in the menu.thmb file. The picture is referenced using the value of ref_thumbnail_index in the menu.thmb file. If the ref_thumbnail_index field is 0xFFFF, no thumbnail picture representative of the PlayList is added in the PlayList.

The PlayItem is hereinafter explained. One PlayItem( ) basically contains the following data: Clip_Information_file_name for specifying the filename of the Clip, IN-time and OUT-time, paired together to specify the playback domain of Clip, STC_sequence_id referenced by IN-time and OUT-time in case the CPI_type defined in PlayList( ) is EP_map type, and Connection_Condition indicating the connection condition of previous PlayItem and current PlayItem.

Figure 29:
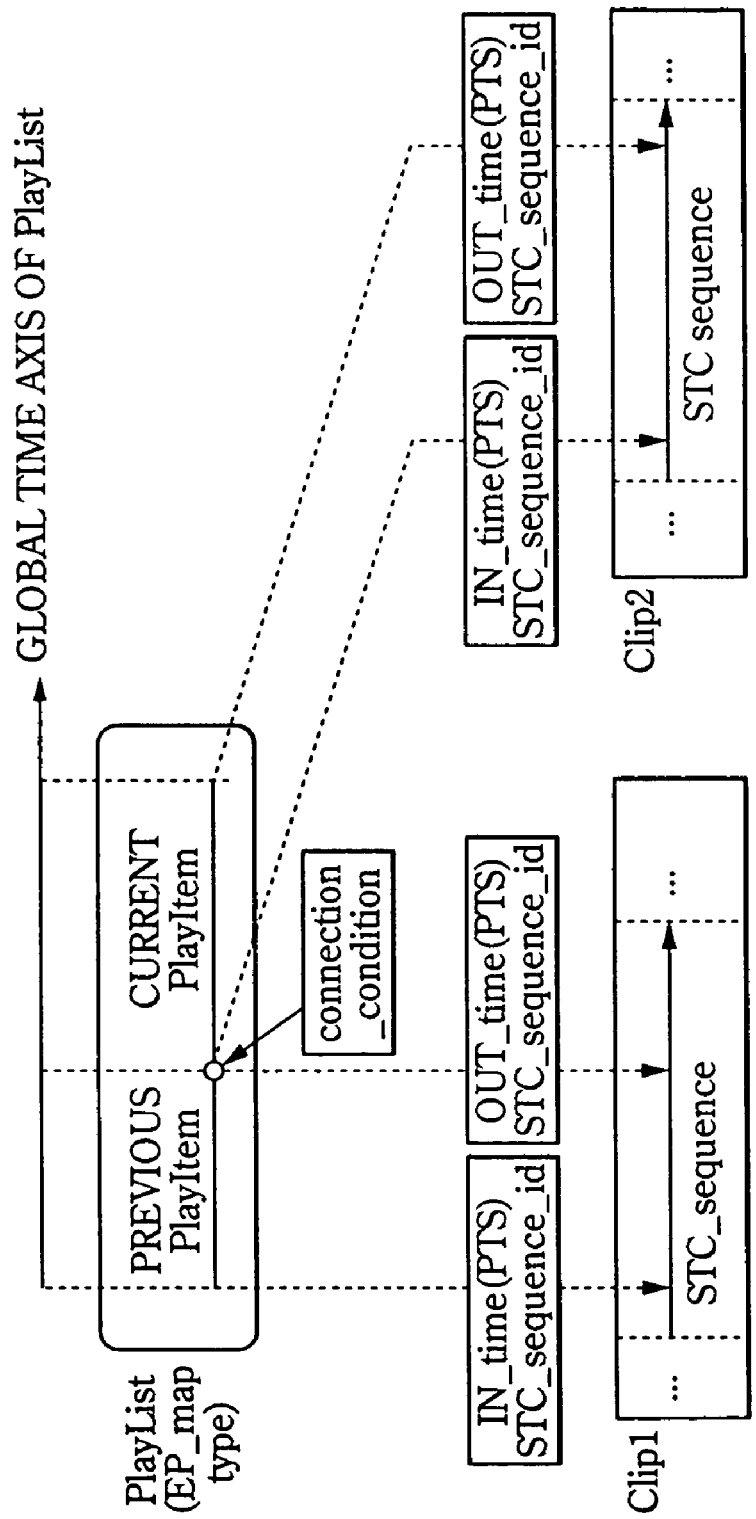
FIG. 29 illustrates a PlayItem.

If PlayList is made up of two or more PlayItems, these PlayItems are arrayed in a row, without temporal gap or overlap, on the global time axis of the PlayList. If CPI_type defined in the PlayList is EP_map type and the current PlayList does not have the BridgeSequence( ), the IN-time and OUT-time pair must indicate the same time on the STC continuous domain as that specified by the STC_sequence_id. Such instance is shown in FIG. 29.

Figure 30:
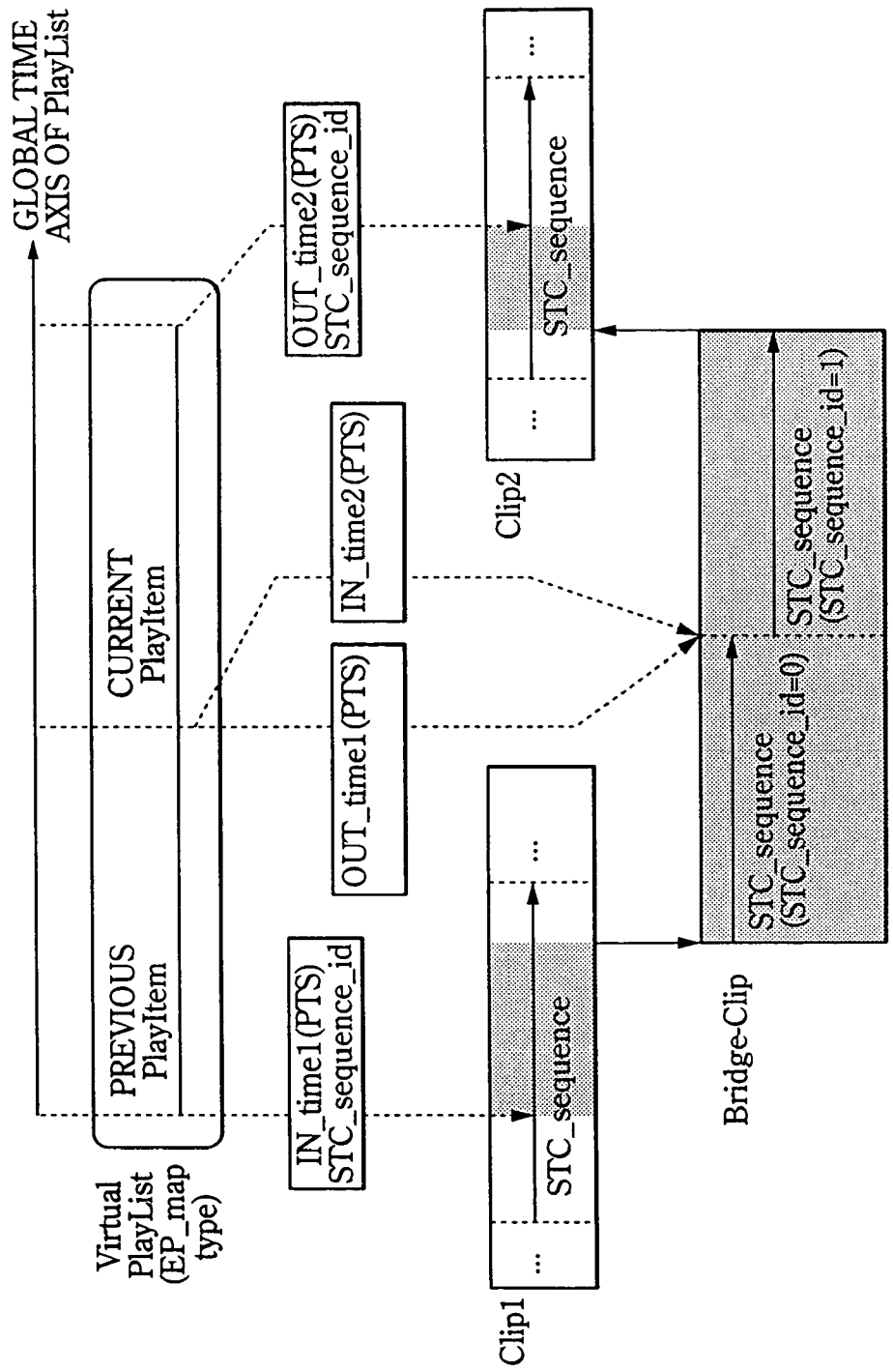
FIG. 30 illustrates a PlayItem.

FIG. 30 shows such a case in which the CPI_type defined by PlayList( ) and, if the current PlayItem has the Bridge Sequence( ), the rules as now explained are applied. The IN_time of the PlayItem previous to the current PlayItem, shown as IN_time1, indicates the time in Bridge-Clip specified in the BridgeSequenceInfo( ) of the current PlayItem. This OUT_time must obey the encoding limitations which will be explained subsequently.

The IN_time of the current PlayItem, shown as IN_time2, indicates the time in Bridge-Clip specified in the BridgeSequenceInfo( ) of the current PlayItem. This IN_time also must obey the encoding limitations as later explained. The OUT_time of PlayItem of the current PlayItem, shown as OUT_time2, indicates the time on the STC continuous domain specified by STC_sequence_id of the current PlayItem.

Figure 31:
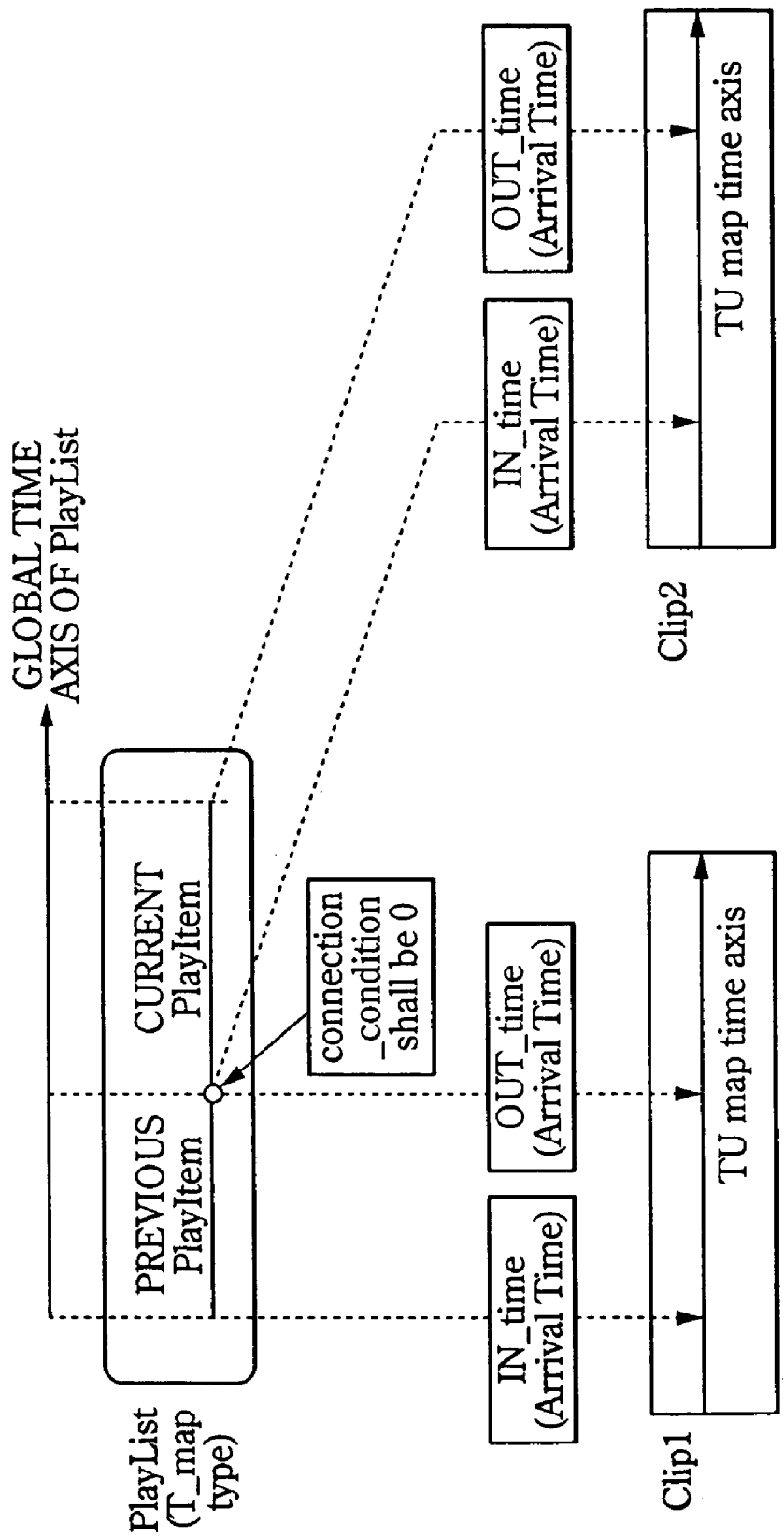
FIG. 31 illustrates a PlayItem.
Figure 36A:
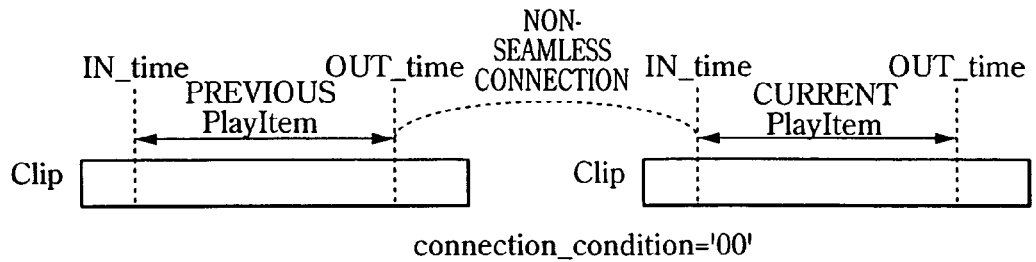
FIGS. 36A to 36D illustrate Connection_Condition.
Figure 36B:
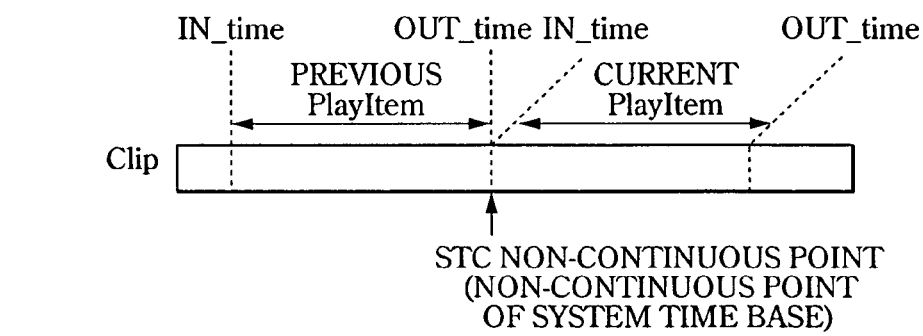
Figure 36C:
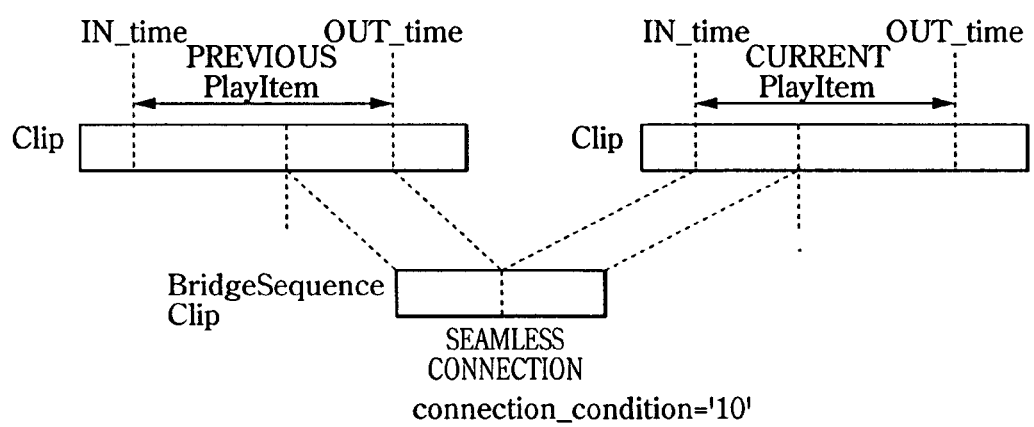
Figure 36D:
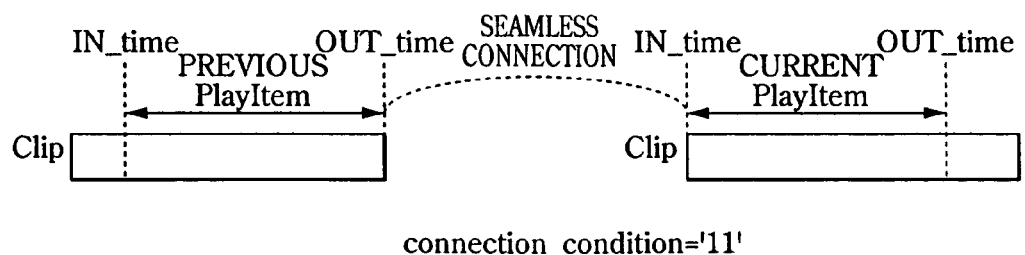

If the CPI_type of PlayList( ) is TU_map type, the IN_time and OUT_time of PlayItem, paired together, indicate the time on the same Clio AV stream, as shown in FIG. 31.

The PlayItem syntax is as shown in FIG. 32. As to the syntax of the PlayItem, shown in FIG. 32, the field of the Clip_information_file_name indicates the filename of the Clip Information. The Clip_stream_type defined by the ClipInfo( ) of this Clip Information file must indicate the Clip AV stream.

The STC_sequence_id is an 8-bit field and indicates the STC_sequence_id of the continuous STC domain referenced by the PlayItem. If the CPI_type specified in the PlayList( ) is TU_map type, this 8-bit field has no meaning and is set to 0. IN_time is a 32-bit field and used to store the playback start time of PlayItem. The semantics of IN_time differs with CPI_type defined in the PlayList( ), as shown in FIG. 33.

OUT_time is a 32-bit field and is used to store the playback end time of PlayItem. The semantics of OUT_time differs with CPI_type defined in the PlayList( ), as shown in FIG. 34.

Connection_condition is a 2-bit field indicating the connection condition between the previous PlayItem and the current PlayItem, as shown in FIG. 35. FIGS. 36A to 36D illustrate various states of Connection_condition shown in FIG. 35.

BridgeSequenceInfo is explained with reference to FIG. 37. This BridgeSequenceInfo is the ancillary information of the current PlayItem and includes the following information. That is, BridgeSequenceInfo includes Bridge_Clip_Information_file_name for specifying the Bridge_Clip AV file and a Bridge_Clip_Information_file_name specifying the corresponding Clip Information file (FIG. 45).

It is also an address of a source packet on the Clip AV stream referenced by the previous PlayItem. Next to this source packet is connected the first source packet of the Bridge-Clip AV stream. This address is termed the RSPN_exit_from_previous_Clip. It is also an address of the source packet on the Clip AV stream referenced by the current PlayItem. Ahead of this source packet is connected the last source packet of the Bridge_clip AV stream file. This address is termed RSPN_enter_to_current_Clip.

Figure 37:
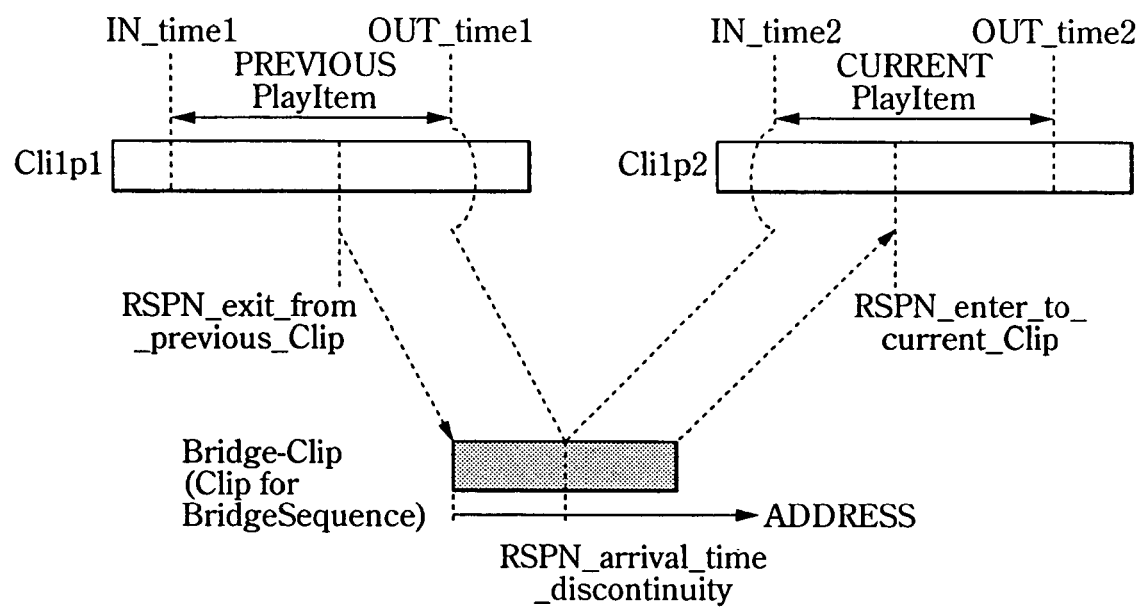
FIG. 37 illustrates BridgeSequenceInfo.

In FIG. 37, RSPN_arrival_time_discontinuity indicates an address of a source packet in the Bridge_Clip AV stream where there is a discontinuous point in the arrival time base. This address is defined in the ClipInfo( ) (FIG. 46).

FIG. 38 shows the syntax of the BridgeSequenceInfo. Turning to the syntax of BridgeSequenceInfo shown in FIG. 38, the field of Bridge_Clip_Information_file_name indicates the filename of the Clip Information file corresponding to the Bridge_Clip_Information_file. The Clip_stream_type defined in ClipInfo( ) of this Clip information file must indicate 'Bridge_Clip AV stream'.

The 32-bit field of the RSPN_exit_from_previous_Clip is a relative address of a source packet on the Clip AV stream referenced by the previous PlayItem. Next to this source packet is connected the first source packet of the Bridge_Clip AV stream file. The RSPN_exit_from_previous_Clip has a size based on the source packet number as a unit, and is counted with the value of the offset_SPN defined in the ClipInfo( ) from the first source packet of the Clip AV stream file referenced by the previous PlayItem.

The 32-bit field of RSPN_enter_to_curent_Clip is the relative address of the source packet on the Clip AV stream referenced by the current PlayItem. Ahead of this source packet is connected the last source packet of the Bridge_Clip_AV stream file. The RSPN_enter_to_curent_Clip has a size that is based on the source packet number as a unit. The RSPN_enter_to_curent_Clip is counted with the value of the offset_SPN, defined in the ClipInfo( ) from the first source packet of the Clip AV stream file referenced by the current PlayItem, as an initial value.

Figure 39:
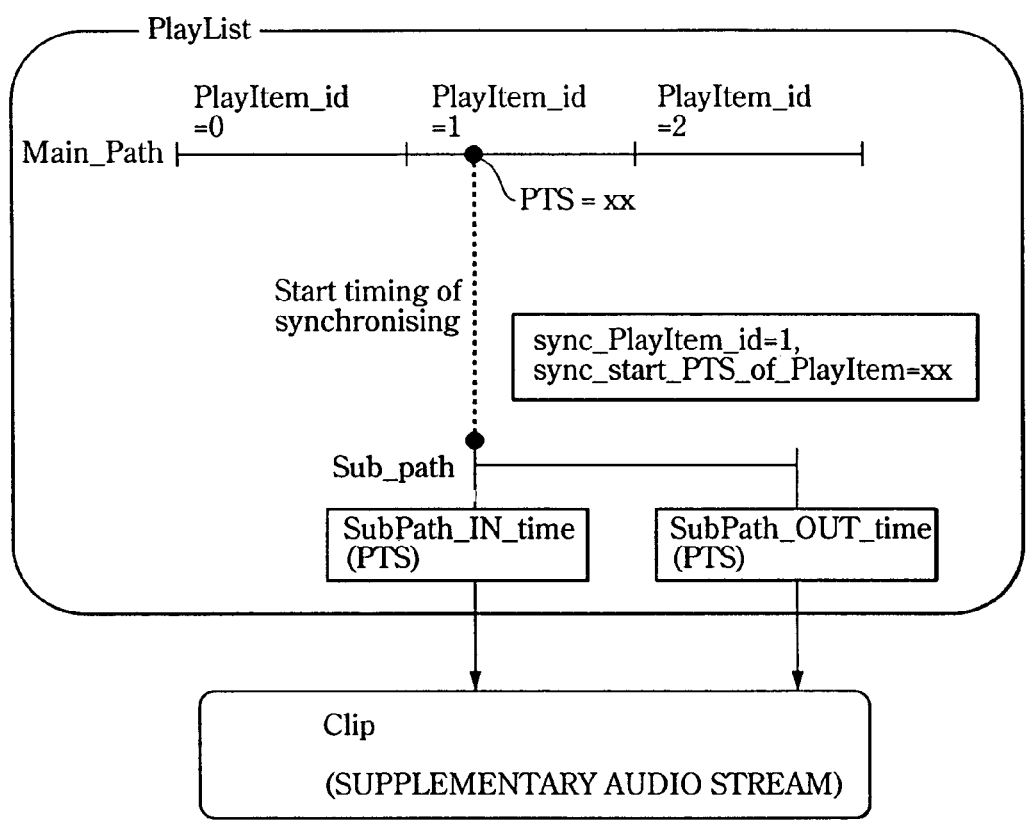
FIG. 39 illustrates SubPlayItem.

The SubPlayItem is explained with reference to FIG. 39. The use of SubPlayItem( ) is permitted only if the CPI_type of the PlayList( ) is the EP_map type. In the present embodiment, SubPlayItem is used only for audio post recording. The SubPlayItem( ) includes the following data. First, it includes Clip_Information_file_name for specifying the Clip referenced by the sub path in the PlayList.

It also includes SubPath_IN_time and SubPath_OUT_time for specifying the sub path playback domain in the Clip. Additionally, it includes sync_PlayItem_id and start_PTS_of_PlayItem for specifying the time of starting the sub path reproduction on the main path time axis. The Clip AV stream, referenced by the sub path, must not contain STC discontinuous points (discontinuous points of the system time base). The clocks of audio samples of the Clip used in the sub path are locked to the clocks of the audio samples of the main path.

FIG. 40 shows the syntax of the SubPlayItem. Turning to the syntax of the SubPlayItem, shown in FIG. 40, the field of the Clip_Information_file_name indicates the filename of the Clip Information file and is used by a sub path in the PlayList. The Clip_stream_type defined in this ClipInfo( ) must indicate the Clip AV stream.

An 8-bit field of sync_PlayItem_id indicates the sub path type. Here, only '0x00' is set, as shown in FIG. 41, while other values are reserved for future use.

The 8-bit field of sync_PlayItem_id indicates the PlayItem_id of the PlayItem containing the time of playback start of the sub path on the time axis of the main path. The value of PlayItem_id corresponding to the preset PlayItem is defined in the PlayList( ) (FIG. 25).

A 32-bit field of sync_start_PTS_of_PlayItem denotes the time of playback start of the sub path on the time axis of the main path, and denotes the upper 32 bits of the PTS (presentation time stamp) on the PlayItem referenced by the sync_PlayItem_id. The upper 32 bit field of the SubPath_IN_time stores the playback start time of the sub path. SubPath_IN_time denotes upper 32 bits of the PTS of 33 bits corresponding to the first presentation unit in the sub path.

The upper 32 bit field of subPath_OUT_time stores the playback end time of the sub path. SubPath_OUT_time indicates upper 32 bits of the value of the Presentation_end_TS calculated by the following equation:

Presentation_end_$TS = PTS\_OUT + AU\_duration$ where PTS_out is the PTS of the 33 bit length corresponding to the last presentation unit of the SubPath and AU_duration is the 90 kHz based display period of the last presentation unit of the SubPath.

Next, PlayListMark( ) in the syntax of xxxxx.rpls and yyyyy.vpls shown in FIG. 23 is explained. The mark information pertinent to the PlayList is stored in this PlayListMark. FIG. 42 shows the syntax of PlayListMark. Turning to the syntax of the PlayListMark shown in FIG. 42, version_number is four character letters indicating the version number of this PlayListMark( ). The version_number must be encoded to "0045" in accordance with ISO 646.

Length is an unsigned 32-bit integer indicating the number of bytes of PlayListMark( ) from directly after the length field to the trailing end of the PlayListMark( ). The number_ of_PlayListMarks is a 16-bit unsigned integer indicating the number of marks stored in the PlayListMark. The number_of_PlayListMarks may be zero. The mark_type is an 8-bit field indicating the mark type and is encoded in the table shown in FIG. 43.

A 32-bit filed of mark_time_stamp stores a time stamp indicating the point specified by the mark. The semantics of the mark_time_stamp differ with CPI_type defined in the PlayList( ), as shown in FIG. 44. The PlayItem_id is an 8-bit field specifying the PlayItem where the mark is put. The values of PlayItem_id corresponding to a preset PlayItem is defined in the PlayList( ) (see FIG. 25).

An 8-bit field of character_set shows the encoding method of character letters encoded in the mark_name field. The encoding method corresponds to values shown in FIG. 19. The 8-bit field of name_length indicates the byte length of the mark name shown in the mark_name field. The mark_name field denotes the mark name indicated in the mark_name field. The number of bytes corresponding to the number of name_lengths from left of this field is the effective character letters and denotes the mark name. In the mark_name field, the value next following these effective character letters may be arbitrary.

The field of the ref_thumbnail_index denotes the information of the thumbnail picture added to the mark. If the field of the ref_thumbnail_index is not 0xFFFF, a thumbnail picture is added to its mark, with the thumbnail picture being stored in the mark.thmb file. This picture is referenced in the mark.thmb file, using the value of ref_thumbnail_index, as explained subsequently. If the ref_thumbnail_index field is 0xFFFF, it indicates that no thumbnail picture is added to the mark.

The Clip Information file is now explained. The zzzzz.clpi (Clip Information file) is made up of six objects, as shown in FIG. 45. These are ClipInfo( ), STC_Info( ), Program( ) CPI( ), ClipMark( ) and MakersPrivateData( ). For the AV stream (Clip AV stream or Bridge-Clip AV stream) and the corresponding Clip Information file, the same string of numerals "zzzzz" is used.

Turning to the syntax of zzzzz.clpi (Clip Information file) shown in FIG. 45 is explained. The ClipInfo_Start_address indicates the leading end address of ClipInfo( ) with the relative number of bytes from the leading end byte of the zzzzz.clpi file as a unit. The relative number of bytes is counted from zero.

The STC_Info_Start_address indicates the leading end address of STC_Info with the relative number of bytes from the leading end byte of the zzzzz.clpi file as a unit. The ProgramInfo_Start_address indicates the leading end address of ProgramInfo( ) with the relative number of bytes from the leading end byte of the zzzzz.clpi file as a unit. The relative number of bytes is counted from 0. The CPI_Start_address indicates the leading end address of CPI( ) with the relative number of bytes from the leading end byte of the zzzzz.clpi file as a unit. The relative number of bytes is counted from zero.

The ClipMark_Start_address indicates the leading end address of ClipMark( ) with the relative number of bytes from the leading end byte of the zzzzz.clpi file as a unit. The relative number of bytes is counted from zero. The_MakersPrivateData Start_address indicates the leading end address of MakersPrivateData( ) with the relative number of bytes from the leading end byte of the zzzzz.clpi file as a unit. The relative number of bytes is counted from zero. The padding_word is inserted in accordance with the syntax of the zzzzz.clpi file. N1, N2, N3, N4 and N5 must be zero or optional positive integers. The respective padding words may also assume optional values.

The ClipInfo is now explained. FIG. 46 shows the syntax of ClipInfo. FIG. 46 shows the syntax of ClipInfo. In the ClipInfo( ) is stored the attribute information of corresponding AV stream files (Clip AV stream or Bridge-Clip AV stream file).

Turning to the syntax of the ClipInfo shown in FIG. 46, version_number is the four character letters indicating the version number of this ClipInfo( ). The version_number must be encoded to "0045" in accordance with the ISO 646. Length is a 32-bit unsigned integer indicating the number of bytes of ClipInfo( ) from directly at back of the length field to the trailing end of the ClipInfo( ). An 8-bit field of Clip_stream_type indicates the type of the AV stream corresponding to the Clip Information file, as shown in FIG. 47. The stream types of the respective AV streams will be explained subsequently.

The 32-bit field of offset_SPN gives an offset value of the source packet number of the first source packet number of the first source packet of the AV stream (Clip AV stream or the Bridge-Clip AV stream). When the AV stream file is first recorded on the disc, this offset_SPN must be zero.

Figure 48:
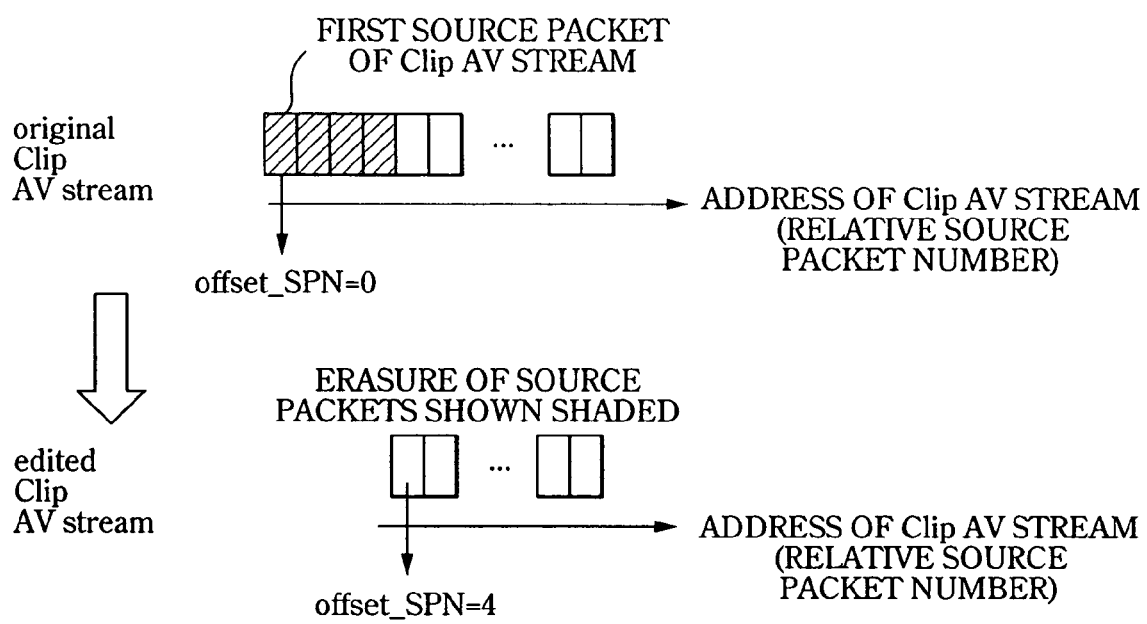
FIG. 48 illustrates offset_SPN.
Figure 49:
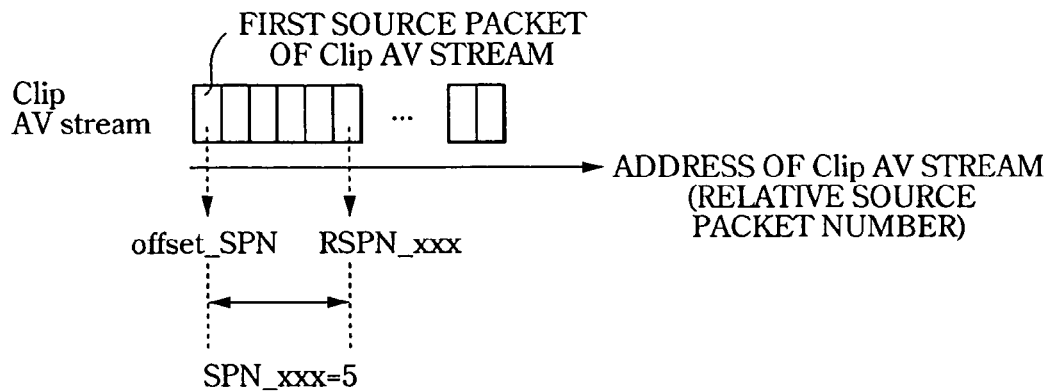
FIG. 49 illustrates offset_SPN.

Referring to FIG. 48, when the beginning portion of the AV stream file is erased by editing, offset_SPN may assume a value other than 0. In the present embodiment, the relative source packet number (relative address) referencing the offset_SPN is frequently described in the form of RSPNxxx, where xxx is modified such that RSPN_xxx is RAPN_EP_start. The relative source packet number is sized with the source packet number as a unit and is counted from the first source packet number of the AV stream file with the value of the offset_SPN as the initial value.

The number of source packets from the first source packet of the AV stream file to the source packet referenced by the relative source packet number (SPN_xxx) is calculated by the following equation:

$$SPN\_xxx = RSPN\_xxx - \text{offset\_SPN}.$$

FIG. 48 shows an instance in which offset_SPN is 4.

TS_recording_rate is a 24-bit unsigned integer, which affords an input/output bit rate required for the AV stream to the DVR drive (write unit 22) or from the DVR drive (readout unit 28). The record_time_and_date is a 56-bit field for storing the date and time of recording of the AV stream corresponding to the Clip and is an encoded representation of year/month/day/hour/minute in 4-bit binary coded decimal (BCD) for 14 numerical figures. For example, 2001/2/23:01:02:03 is encoded to "0x20011223010203".

The duration is a 24-bit field indicating the total playback time of the Clip by hour/minute/second based on arrival time clocks. This field is six numerical figures encoded in 4-bit binary coded decimal (BCD). For example, 01:45:30 is encoded to "0x014530".

A flag time_controlled_flag indicates the recording mode of an AV stream file. If this time-_controlled_flag is 1, it indicates that the recording mode is such a mode in which the file size is proportionate to the time elapsed since recording, such that the condition shown by the following equation:

$$Ts\_\text{average\_rate} * 192/188 * (t - \text{start\_time}) - \alpha <= \text{size\_clip}(t)$$

$$<= TS\_\text{average\_rate} * 192/188 * (t - \text{start\_time}) + \alpha$$

where TS_average_rate is an average bit rate of the transport stream of the AV stream file expressed by bytes/second.

In the above equation, t denotes the time in seconds, while start_time is the time point when the first source packet of the AV stream file was recorded. The size_clip(t) is 10*192 bytes and α is a constant dependent on TS_average_rate.

If time_controlled_flag is set to 0, it indicates that the recording mode is not controlling so that the time lapse of recording is proportionate to the file size of the AV stream. For example, the input transport stream is recorded in a transparent fashion.

If time_controlled_flag is set to 1, the 24-bit field of TS_average_rate indicates the value of TS_average_rate used in the above equation. If time_controlled_flag is set to 0, this field has no meaning and must be set to 0. For example, the variable bit rate transport stream is encoded by the following sequence: First, the transport rate is set to the value of TS_recording_rate. The video stream is encoded with a variable bit rate. The transport packet is intermittently encoded by not employing null packets.

The 32-bit field of RSPN_arrival_time_discontinuity is a relative address of a site where arrival timebase discontinuities are produced on the Bridge-Clip AV stream file. The RSPN_arrival_time_discontinuity is sized with the source packet number as a unit and is counted with the value of offset_SPN defined in the ClipInfo( ) as from the first source packet of the Bridge-Clip AV stream file. An absolute address in the Bridge-Clip AV stream file is calculated based on the aforementioned equation:

$$SPN\_xxx = RSPN\_xxx - offset\_SPN.$$

The 144-bit field of reserver_for_system_use is reserved for a system. If is_format_identifier_valid flag is 1, it indicates that the field of format_identifier is effective. If is_format_identifier_valid flag is 1, it indicates that the format_identifier field is valid. If is_original_network_ID_valid flag is 1, it indicates that the field of is_transport_stream_ID-valid is valid. If the flag is_transport_stream_ID-valid is 1, it indicates that the transport_stream_ID field is valid. If is_servece_ID_valid flag is 1, it indicates that the servece_ID field is valid.

If is_country_code_valid flag is 1, it indicates that the field country_code is valid. The 32-bit field of format_identifier indicates the value of format_identifier owned by a registration descriptor (defined in ISO/IEC13818-1) in the transport stream. The 16-bit field of original_network_ID indicates the value of the original_network_ID defined in the transport stream.

The 16-bit field in servece_ID denotes the value of servece_ID defined in the transport stream. The 24-bit field of country_code shows a country code defined by ISO3166. Each character code is encoded by ISO8859-1. For example, Japan is represented as "JPN" and is encoded to "0x4A 0x50 0x4E". The stream_format_name is 15 character codes of ISO-646 showing the name of a format organization affording stream definitions of transport streams. An invalid byte in this field has a value of '0xFF'.

Format_identifier, original_network_ID, transport_stream_ID, servece_ID, country_code and stream_format_name indicate service providers of transport streams. This allows to recognize encoding limitations on audio or video streams and stream definitions of private data streams other than audio video streams or SI (service information). These information can be used to check if the decoder is able to decode the stream. If such decoding is possible, the information may be used to initialize the decoder system before starting the decoding.

Figure 50A:
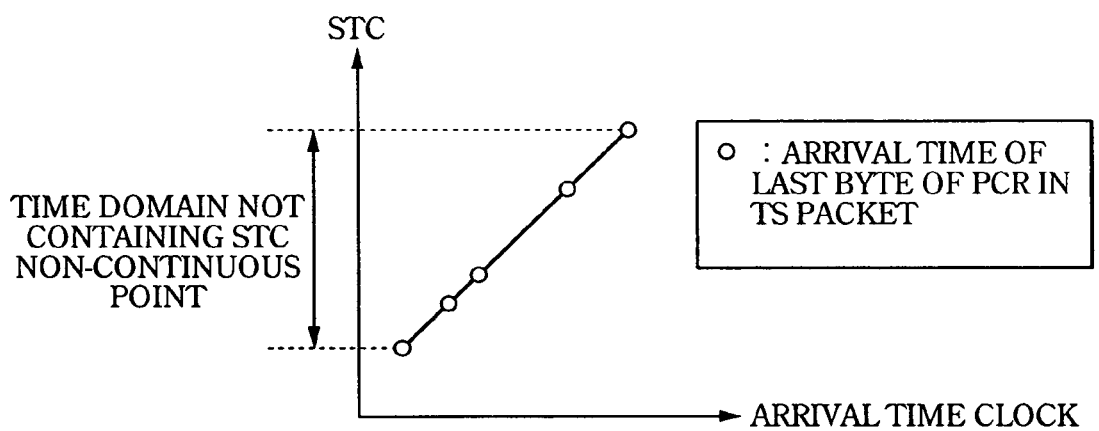
FIGS. 50A, 50B illustrate the STC domain.
Figure 50B:
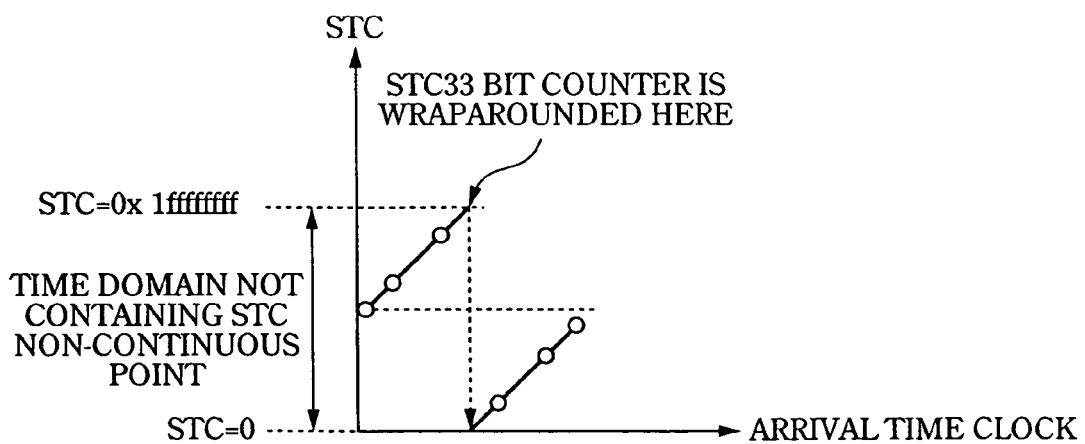

STC_Info is now explained. The time domain in the MPEG-2 transport stream not containing STC discontinuous points(discontinuous points of the system time base) is termed the STC_sequence. In the Clip, STC_sequence is specified by the value of STC_sequence_id. FIGS. 50A and 50B illustrate a continuous STC domain. The same STC values never appear in the same STC_sequence, although the maximum tine length of Clip is limited, as explained subsequently. Therefore, the same PTS values also never appear in the same STC_sequence. If the AV stream contains N STC discontinuous points, where N>0, the Clip system time base is split into (N+1) STC_sequences.

STC_Info stores the address of the site where STC discontinuities (system timebase discontinuities) are produced. As explained with reference to FIG. 51, the RSPN_STC_start indicates the address and begins at a time point of arrival of the source packet referenced by the (k+1)st RSPN_STC_start and ends at a time point of arrival of the last source packet.

FIG. 52 shows the syntax of the STC_Info. Turning to the syntax of STC_Info shown in FIG. 52, version_number is four character letters indicating the version number of STC_Info( ). The version_number must be encoded to "0045" in accordance with ISO 646.

Length is a 32-bit unsigned integer indicating the number of bytes of STC_Info( ) from directly after this length field to the end of STC_Info. If CPI_type of CPI( ) indicates TU_map type, 0 may be set in this length field. If CPI_type of CPI( ) indicates EP_map type, the num_of_STC_sequence mut be of a value not less than 1.

An 8-bit unsigned integer of num_of_STC_sequence indicates the number of sequences in the Clip. This value indicates the number of the for-loops next following the field. The STC_sequence_id corresponding to the preset STC_sequence is defined by the order in which appears the RSPN_STC_start corresponding to the STC_sequence in the for-loop containing the RSPN_STC_start. The STC_sequence_id commences at 0.

The 32-bit field of RSPN_STC_start indicates an address at which the STC_sequence commences on the AV stream file. RSPN_STC_start denotes an address where system time base discontinuities are produced in the AV stream file. The RSPN_STC_start may also be a relative address of the source packet having the first PCR of the new system time base in the AV stream. The RSPN_STC_start is of a size based on the source packet number and is counted from the first source packet of the AV stream file with the offset_SPN value defined in ClipInfo( ) as an initial value. In this AV stream file, the absolute address is calculated by the above-mentioned equation, that is $$SPN\_xxx = RSPN\_xxx - offset\_SPN.$$

Figure 53:
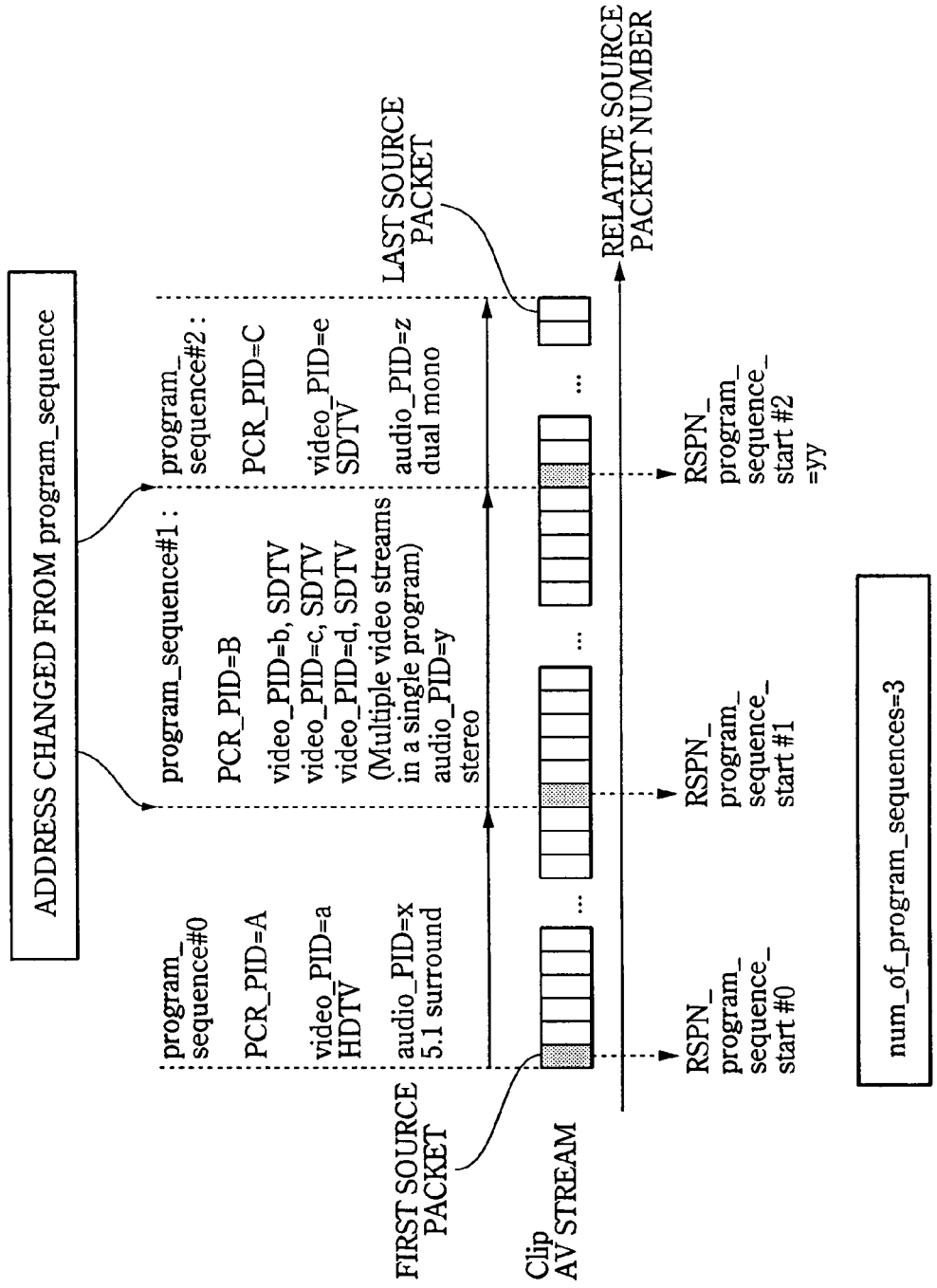
FIG. 53 illustrates ProgramInfo.

ProgramInfo in the syntax of zzzz.clip shown in FIG. 45 is now explained with reference to FIG. 53. The time domain having the following features in the Clip is termed program_sequence. These feature are that the value of PCR_PID is not changed, the number of audio elementary streams is also not changed, the PID values in the respective video streams are not changed, the encoding information which is defined by VideoCodingInfo thereof is not changed, the number of audio elementary streams is also not changed, the PID values of the respective audio streams are not changed, and that the encoding information, which is defined by AudioCodingInfo thereof, is not changed.

Program_sequence has only one system time base at the same time point. Program_sequence has a sole PMT at the same time point. ProgramInfo( ) stores the address of the site where the program_sequence commences. RSPN_program_sequence-start indicates the address.

FIG. 54 illustrates the syntax of ProgramInfo. Turning to the ProgramInfo shown in FIG. 54, version_number is four character letters indicating the version number of ProgramInfo( ). The version_number must be encoded to "0045" in accordance with ISO 646.

Length is a 32-bit unsigned integer indicating the number of bytes of ProgramInfo( ) from directly at back of this length field to the end of program(info( ). If CPI_type of CPI( ) indicates the TU_map type, this length field may be set to 0. If the CPI_type of CPI( ) indicates EP_map type, the number_of_programs must be of a value not less than 1.

An 8-bit unsigned integer of number_of_program_sequences denotes the number of program_sequences in the Clip. This value indicates the number of for-loops next following this field. If program_sequence in the Clip is not changed, 1 must be set in the number of program_sequences. A 32-bit field of RSPN_program_sequence_start is a relative address where the program sequence commences on the AV stream.

RSPN_program_sequence_start is sized with the source packet number as a unit and is counted with the value of offset_SPN defined in the ClipInfo( ) as from the first source packet of the AV stream file. An absolute address in the AV stream file is calculated by:

$$SPN\_xxx = RSPN\_xxx - offset\_SPN.$$

The values of RSPN_program_sequence_start in the for-loop syntax must appear in the rising order.

A 16-bit field of PCR_PID denotes the PID of the transport packet containing an effective PCR field effective for the program_sequence. An 8-bit field of number_of_audios indicates the number of for-loops containing audio_stream_PID and AudioCodingInfo( ). A 16-bit field of video_stream_PID indicates the PID of the transport packet containing a video stream effective for its program_sequence. VideoCodingInfo( ), next following this field, must explain the contents of the video stream referenced by its video_stream_PID.

A 16-bit field of audio_stream_PID indicates the PID of a transport packet containing the audio stream effective for its program_sequence. The AudioCodingInfo( ), next following this field, must explain the contents of the video stream referenced by its audio_stream_PID.

The order in which the values of video_stream_PID in the for-loop of the syntax must be equal to the sequence of PID encoding of the video stream in the PMT effective for the program_sequence. Additionally, the order in which the values of audio_stream_PID appears in the for-loop of the syntax must be equal to the sequence of PID encoding of the audio stream in the PMT effective for the program_sequence.

FIG. 55 shows the syntax of VideoCodingInfo in the syntax of the ProgramInfo shown in FIG. 54. Turning to the syntax of the VideoCoding Info shown in FIG. 55, an 8-bit field of video_format indicates the video format corresponding to video_stream_PID in ProgramInfo( ), as shown in FIG. 56.

Referring to FIG. 57, an 8-bit field of frame-rate indicates the video frame rate corresponding to the video_stream_PID in ProgramInfo( ). An 8-bit field of display_aspect_ratio indicates a video display aspect ratio corresponding to video_stream_PID in ProgramInfo( ).

FIG. 59 shows the syntax of AudioCodingInfo in the syntax of ProgramInfo shown in FIG. 54. Turning to the syntax of the AudioCoding Info shown in FIG. 59, an 8-bit field of audio_format indicates the audio encoding method corresponding to audio_stream_PID in ProgramInfo( ), as shown in FIG. 60.

An 8-bit field of audio_component_type indicates an audio component type corresponding to audio_stream_PID in ProgramInfo( ) as shown in FIG. 61, whilst an 8-bit field of sampling_frequency indicates an audio sampling frequency corresponding to audio_stream_PID in ProgramInfo( ) as shown in FIG. 62.

Figure 63:
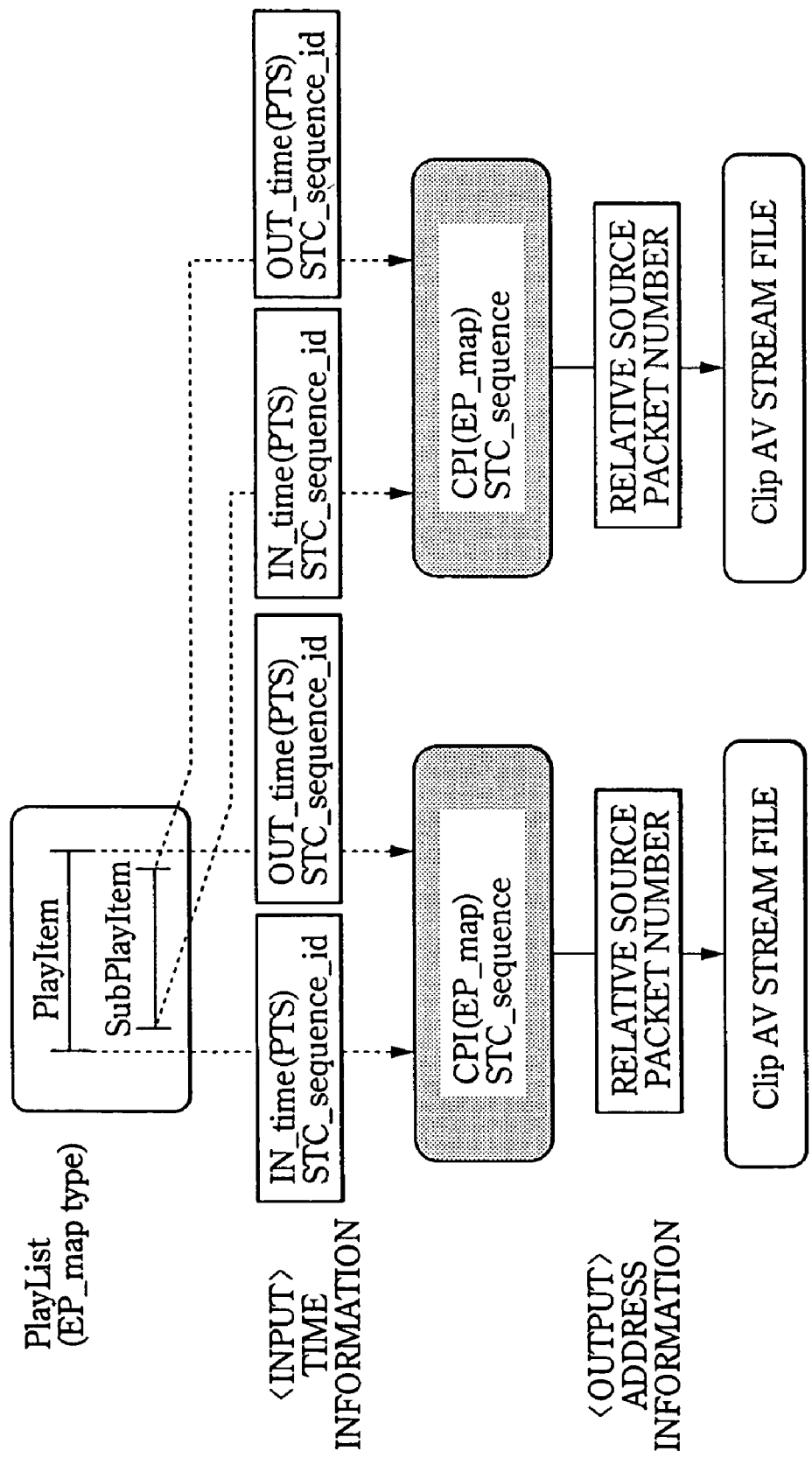
FIG. 63 illustrates CPI.
Figure 64:
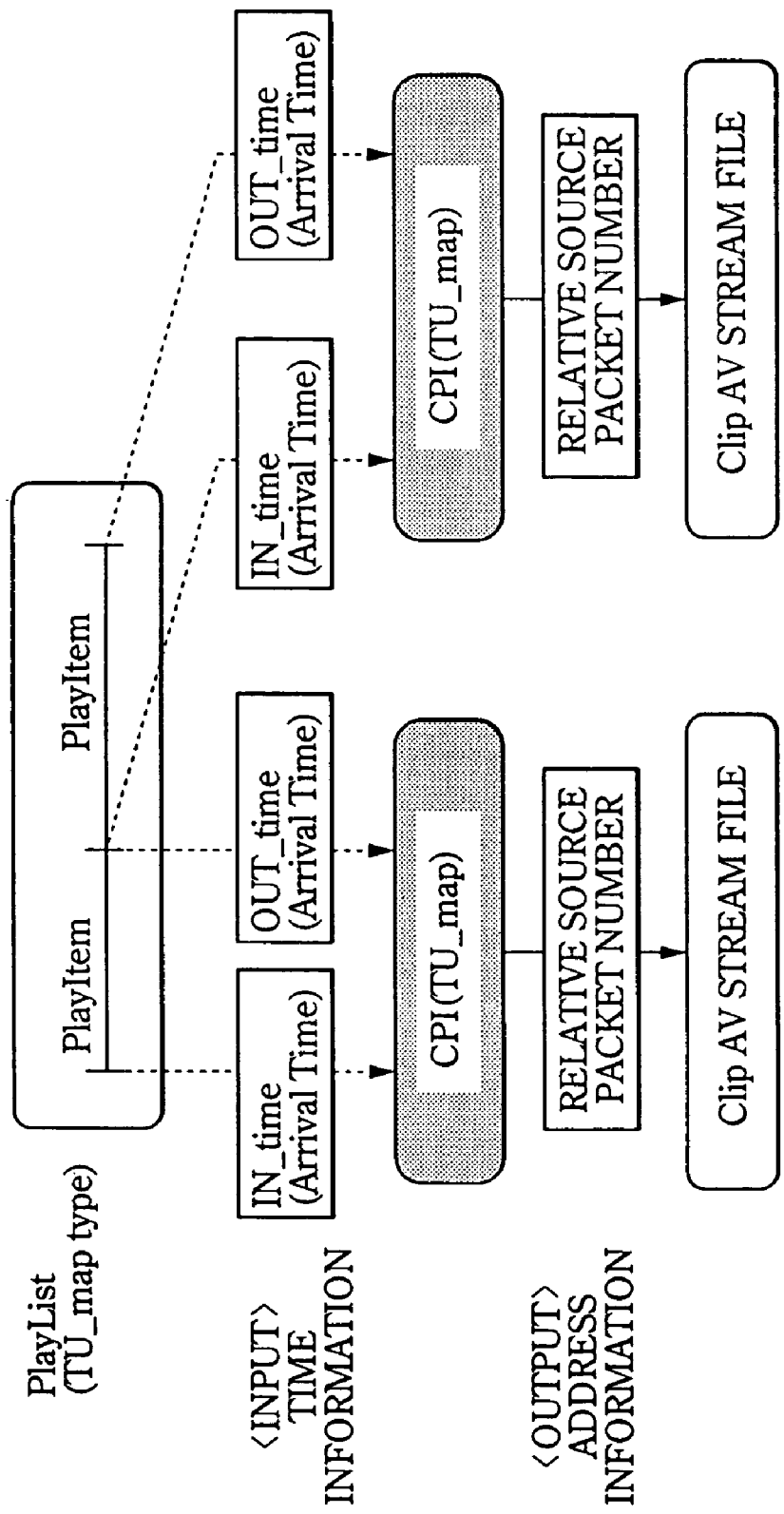
FIG. 64 illustrates CPI.

The CPI (Characteristics Point Information) in the syntax of zzzzz.clip shown in FIG. 45 is explained. The CPI is used for correlating the time information in the AV stream with the address in its file. The CPI is of two types, namely EP_map and TU_map. In FIG. 63, if CPI_type in CPI( ) is EP_map, its CPI( ) contains EP_map. In FIG. 64, if CPI_type in CPI( ) is TU_map, its CPI( ) contains TU_map. One AV stream has one EP_map or one TU_map. If the AV stream is an SESF transport stream, the corresponding Clip must own an EP_map.

FIG. 65 show the syntax of CPI. Turning to the syntax of CPI shown in FIG. 65, the version_number is four character letters indicating the version number of this CPI( ). The version_number must be encoded to "0045" in accordance with ISO 646. Length is a 32-bit unsigned integer indicating the number of bytes as from directly after this length field to the trailing end of the CPI( ). The CPI_type is a 1-bit flag and indicates the CPI type of Clip, as shown in FIG. 66.

The EP_map in the CPI syntax shown in FIG. 65 is explained. There are two types of the EP_map, that is EP_map for a video stream and an EP_map for an audio stream. The EP_map_type in the EP_map differentiates between these EP_map types. If the Clip contains one or more video streams, the EP_map for the video stream must be used. If the Clip does not contain a video stream but contains one or more audio streams, the EP_map for the audio stream must be used.

The EP_map for a video stream is explained with reference to FIG. 67. The EP_map for the video stream has data stream_PID, PTS_EP_start and RSPN_EP_start. The stream PID shows the PID of the transport packet transmitting a video stream. The PTS_EP_start indicates the PTS of an access unit beginning from the sequence header of the video stream. The RSPN_RP_start indicates the address of a source packet including the first byte of the access unit referenced by the PTS_EP_start in the AV stream.

A sub table, termed EP_map_for_one_stream_PID( ) is created from one video stream transmitted by the transport packet having the same PID to another. If plural video streams exist in the Clip, the EP_map may contain plural EP_map_for_one_stream_PID( ).

The EP_map for audio stream has data stream_PID, PTS_EP_start and RSPN_EP_start. The stream_PID shows a PID of a transport packet transmitting an audio stream. The PTS_EP_start shows the PTS of an accessing unit in the audio stream. The RSPN_EP-start indicates an address of a source packet containing a first byte of the access unit referenced by PTS_EP_start of the AV stream.

The sub table termed EP_map_for_one_stream_PID( ) is created from one audio stream transmitted by the transport packet having the same PID to another. If there exist plural audio streams in the Clip, EP_map may contain plural EP_map-_for_one_stream_PID( ).

Figure 68:
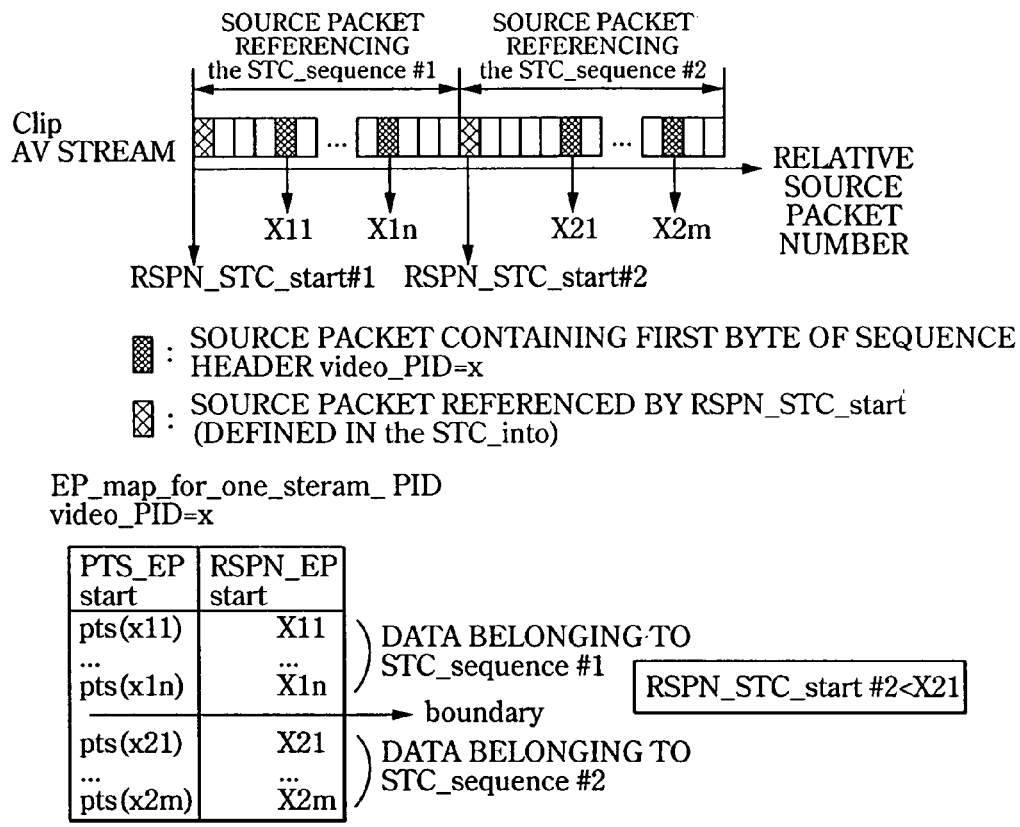
FIG. 68 illustrates EP_map.
Figure 69:
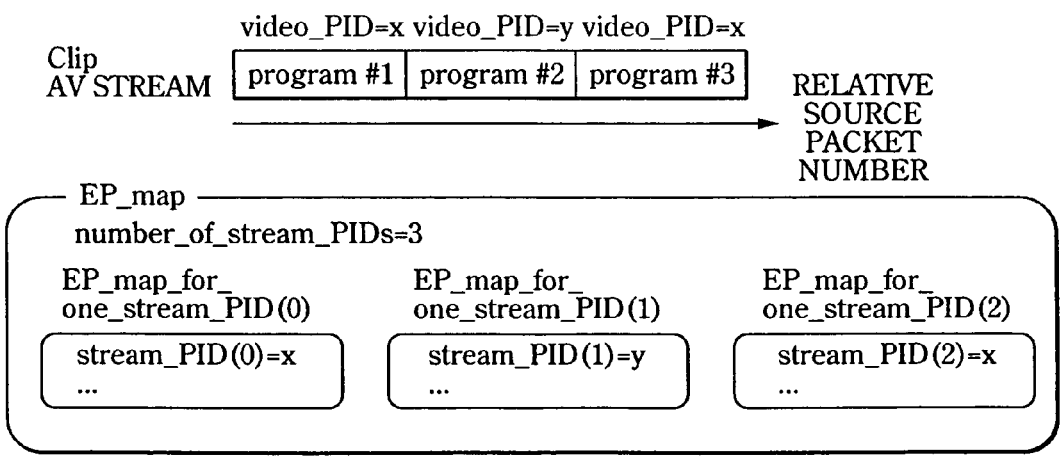
FIG. 69 illustrates EP_map.

Turning to the relation between EP_map and STC_Info, one EP_map_for_one_stream_PID( ) is created in one table irrespective of discontinuous points in the STC. Comparison of the value of the RSPN_EP_start to the value of RSPN_STC_start defined in STC_Info( ) reveals the boundary of data of EP_map belonging to respective STC_sequences (see FIG. 68). The EP_map must have one EP_map_for_one_stream_PID for a continuous stream range transmitted by the same PID. In the case shown in FIG. 69, program#1 and program#3 have the same video PID, however, the data range is not continuous, so that EP_map_for_one_stream_PID must be provided for each program.

FIG. 70 shows the EP_map syntax. By way of explanation of the EP_map syntax shown in FIG. 70, the EP_type is a 4-bit field and shows the EP_map entry point type, as shown in FIG. 71. The EP_type shows the semantics of the data field next following this field. If Clip includes one or more video stream, the EP_type must be set to 0 ('video'). Alternatively, if the Clip contains no video stream but contains one or more audio stream, then EP_type must be set to 1 ('audio').

The 16-bit field of number_of_stream_PIDs indicates the number of times of loops of the for-loop having number_of_stream_PIDs in the EP_map( ) as a variable. The 16-bit field of stream_PID(k) indicates the PID of the transport packet transmitting the number k elementary stream (video or audio stream) referenced by EP_map_for_one_stream_PID (num_EP_entries(k)). If EP_type is 0 ('video'), its elementary stream must be a video stream. If EP_type is equal to 1 ('audio'), its elementary stream must be the audio stream.

The 16-bit field of num_EP_entries(k) indicates the num_EP_entries(k) referenced by EP_map_entries(k)). The EP_map_for_one_stream_PID_Start_address(k): This 32-bit field indicates the relative address position at which the EP_map_for_one_stream_PID(num_EP_entries(k)) begins in the EP_map( ). This value is indicated by the size as from the first byte of the EP_map( ).

Padding_word must be inserted in accordance with the EP_map( ) syntax. X and Y must be optional positive integers. The respective padding words may assume any optional values.

FIG. 72 shows the syntax of EP_map_for_one_stream_PID. By way of explanation of the syntax of the EP_map_for_one_stream_PID shown in FIG. 72, the semantics of the 32-bit field of PTS_EP_start differs with the EP_type defined by EP_type map( ). If EP_type is equal to 0 ('video'), this field has upper 32 bits of the 33-bit precision PTS of the access unit beginning with a sequence header of the video stream. If the EP_type is equal to 1 ('audio'), this field has upper 32 bits of PTS of 33 bit precision of the access unit of the audio stream.

The semantics of the 32-bit field of RSPN_EP_start differs with the EP_type defined in EP_map( ). If EP_type is equal to 0 ('video'), this field indicates the relative address of the source packet including the first byte of the sequence header of the access unit referenced by the PTS_EP_start in the AV stream. Alternatively, if EP_type is equal to 1 ('audio'), this field indicates the relative address of the source packet containing the first byte in the audio stream of the access unit referenced by the PTS_EP_start in the AV stream.

RSPN_EP_start is of a size which is based on the source packet number as a unit, and is counted from the first source packet of the AV stream file, with the value of the offset_SPN, defined in ClipInfo( ), as an initial value. The absolute address in the AV stream file is calculated by $$SPN\_xxx = RSPN\_xxx - \text{offset\_SPN}.$$

It is noted that the value of the RSPN_EP_start in the syntax must appear in the rising order.

Figure 73:
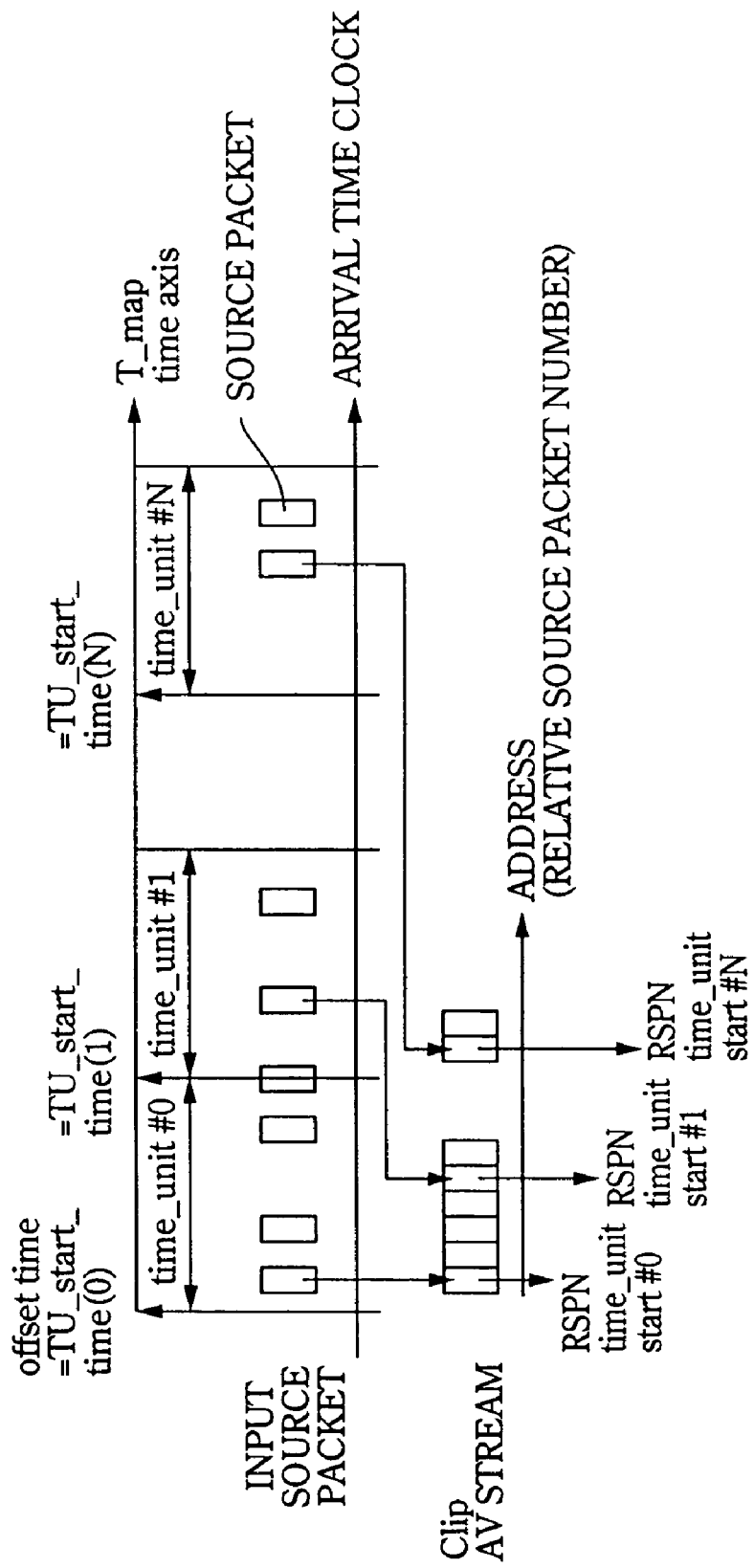
FIG. 73 illustrates TU_map.

The TU_map is now explained with reference to FIG. 73. TU_map forms a time axis based on the source packet arrival time clock (timepiece of the arrive time base). This time axis is termed TU_map_time_axis. The point of origin of TU_map_time_axis is indicated by offset_time in the TU_map( ). TU map_time_axis is divided in a preset unit as from offset_time, this unit being termed time_unit.

In each time_unit in the AV stream, addresses on the AV stream file of the source packet in the first complete form are stored in TU_map. These addresses are termed RSPN_time_unit_start. The time at which begins the k(k≧0)th time-_unit on the TU_map_time_axis is termed TU_start_time(k). This value is calculated based on the following equation:

$$TU\_start\_time(k) = \text{offset\_time} + k*\text{time\_unit\_size}.$$

It is noted that TU_start_time(k) has a precision of 45 kHz.

FIG. 74 shows the syntax of TU_map. By way of explanation of the TU_map syntax shown in FIG. 74, the 32-bit field of offset_time gives an offset time relative to TU_map_time_axis. This value indicates the offset time relative to the first time_unit in the Clip. The offset_time is of a size based on 45 kHz clock derived from the 27 MHz precision arrival time clocks as unit. If the AV stream is to be recorded as new Clip, offset_time must be set to 0.

The 32-bit field of time_unit_size affords the size of the time_unit, and is based on 45 kHz clocks, derived from the 27 MHz precision arrival time clocks, as unit. Preferably, time_unit_size is not longer than one second (time_unit_size≦45000). The 32 bit field of number_of_time_unit_entries indicates the number of entries stored in TU_map( ).

The 32-bit field of RSN_time_unit_start indicates the relative address of a site in the AV stream at which begins each time_unit. RSN_time_unit_start is of a size based on the source packet number as unit and is counted with the value of offset_SPN defined in ClipInfo( ) as from the first source packet of the AV stream file as an initial value. The absolute address in the AV stream file is calculated by $$SPN\_xxx = RSPN\_xxx - \text{offset\_SPN}.$$

It is noted that the value of RSN_time_unit_start in the for-loop of the syntax must appear in the rising order. If there is no source packet in the number (k+1) time_unit, the number (k+1) RSN_time_unit_start must be equal to the number k RSPN_time_unit_start.

By way of explanation of the ClipMark in the syntax of zzzzz.clip shown in FIG. 45, the ClipMark is the mark information pertinent to clip and is stored in the ClipMark. This mark is not set by a user, but is set by a recorder (recording and/or reproducing apparatus 1).

FIG. 75 shows the ClipMark syntax. By way of explanation of the ClipMark syntax shown in FIG. 75, the version_number is four character letters indicating the version number of this ClipMark. The version_number must be encoded in accordance with ISO 646 to "0045".

Length is a 32-bit unsigned integer indicating the number of bytes of the ClipMark( ) as from directly after the length field to the trailing end of ClipMark( ). The number_of_Clip_marks is a 16-bit unsigned integer indicating the number of marks stored in ClipMark and may be equal to 0. Mark_type is an 8-bit field indicating the mark type and is encoded in accordance with the table shown in FIG. 76.

Mark_time_stamp is a 32-bit field and stores the time stamp indicating a pointer having a specified mark. The semantics of mark_time_stamp differs with CPI_type in the PlayList( ), as shown in FIG. 77.

If CPI_type in CPI( ) indicates the EP_map type, this 8-bit field indicates the STC_sequence_id of the continuous STC domain where there is placed mark_time_stamp. If CPI_type in CPI( ) indicates TU_map type, this 8-bit field has no meaning but is set to 0. The 8-bit field of Character_set indicates the indicating method of character letters encoded in the mark_name field. The encoding method corresponds to the value shown in FIG. 19.

The 8-bit field of name_length indicates the byte length of the mark name shown in the mark_name field. This mark_name field indicates the mark name. The byte number corresponding to the number of the name_length from left of this field is the effective character number and denotes the mark name. In the mark_name field, the values next following these effective character letters may be arbitrary.

The field of ref_thumbnail_index indicates the information of the thumbnail picture appended to the mark. If the ref_thumbnail_index field is of a value different from 0xFFFF, a thumbnail picture is added to its mark, with the thumbnail picture being stored in the mark.thumb file. This picture is referenced using the value of ref_thumbnail_index in the mark.thumb file. If the ref_thumbnail_index field is of a value equal to 0xFFFF, a thumbnail picture is not appended to its mark.

FIG. 78 shows another syntax of ClipMark which takes the place of FIG. 75. FIG. 79 shows a typical table of mark_type which takes the place of FIG. 76 in such case. Reserved_for_maker_ID is a 16-bit field indicating the maker ID of the maker which, if mark_type indicates a value from 0xC0 to 0xFF, defines the mark_type. The maker ID is specified by a DVR format licensor. Mark_entry( ) is the information indicating the point specified to a mark point. The syntax will be explained subsequently in detail. Representative_picture_entry is the information indicating the point of the information representative to the mark shown by mark_entry( ). The syntax of representative_picture_entry will be explained subsequently in detail.

ClipMark is used in order to enable a user reproducing an AV stream to retrieve the contents visually. A DVR player uses a GUI (graphical user interface) to present the ClipMark information to the user. For visual display of the ClipMark information, a picture indicated by representative_picture_entry( ), rather than the picture indicated by mark_entry( ), is to be indicated.

Figures 80, 81, 82:
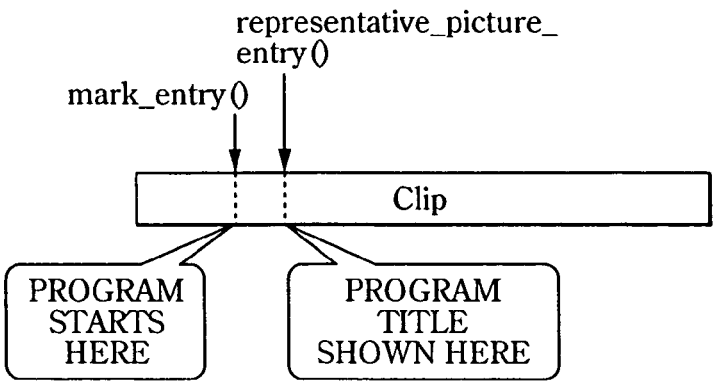
FIG. 80 shows examples of mark_entry( ) and representative_picture_entry( ).
FIG. 81 shows a syntax of mark_entry( ) and representative_picture_entry( ).
FIG. 82 shows another example of the syntax of mark_entry( ) and representative_picture_entry( ).

FIG. 80 shows examples of mark_entry( ) and representative_picture_entry. It is assumed that a program name (title) of a certain program is displayed after some time, such as several seconds, as from the start of such program. If ClipMark is to be created, mark_entry( ) may be put at a start point of the program, with the representative_picture_entry( ) then being put at a point of display of the program name (title) of the program.

If the picture of representative_picture_entry is displayed on the GUI and the user has specified the picture, the DVR player starts replay as from the point where mark_entry is put.

FIG. 81 shows the syntax of mark_entry( ) and representative_picture_entry( ).

Mark_time_stamp is a 32-bit field and stores a time stamp indicating a point specified by the mark and a time stamp indicating a point of a picture representing a mark specified by mark_entry( ).

FIG. 82 shows a typical syntax of mark_entry( ) and representative_picture_entry( ) in case of employing the address based information rather than employing the information of the time stamp base by the PTS.

In case of mark_entry( ), RSPN_ref_EP_start indicates the relative address of a source packet indicating the entry point of a stream for decoding a picture of a mark point in the AV stream. In case of representative_picture_entry( ), RSPN_ref_EP_start indicates the relative address of a source packet indicating the entry point of a stream for decoding a picture representative of a mark indicated by mark_entry( ). The value of RSPN_ref_EP_start must be stored in the EP_map as RSPN_ref_EP_start. Moreover, the value of PTS_EP_start corresponding to the RSPN_EP_start must be closest in the EP_map in the past as from the PTS of the mark point picture.

Offset_nm_pictures is a 32-bit field and indicates the number of pictures of offset from the picture referenced by RSPN_ref_EP_start to the picture indicated by the mark point in the display sequence. This number is counted from 0. In the case of the embodiment of FIG. 83, offset_nm_pictures is 6.

FIG. 84 shows another typical syntax of mark_entry( ) and representative_picture_entry( ) in case of employing the address based information for specifying ClipMark.

In case of mark_entry( ), RSPN_mark_point indicates the relative address of the source packet including the first byte of the access unit referenced by the mark in the AV stream. In case of representative_picture_entry( ), RSPN_mark_point indicates the relative address of the source packet including the first byte of the encoded picture representative of the mark indicated by the mark_entry( ).

RSPN_mark_point is of a size having the source packet number as a unit and is counted using the value of offset_SPN defined in the Clip Information file from the first source packet of the AV stream file.

Referring to FIG. 85, the relation between ClipMark and EP_map is explained. In the present embodiment, it is assumed that EP_map specifies I0, I1 and In as addresses of the entry point, and that the an I-picture continuing to the sequence header from these addresses is started. If ClipMark specifies M1 as an address of a certain mark, and if the picture beginning from this source packet is to be decodable, it suffices if data readout is initiated from I1 as an entry point ahead of and closest to the M1 address.

MakerPrivateData has already been explained with reference to FIG. 22 and hence is not explained here specifically.

Next, thumbnail_information is explained. A thumbnail picture is stored in a menu.thmb file or in a mark.thmb file. These files are of the same syntax structure and own a sole Thumbnail( ). The menu.thmb file stores a picture representing respective PlatyLists. The totality of menu thumbnails are stored in the sole menu.thmb file.

The mark.thmb file stores a mark thumbnail picture, that is a picture representing a mark point. The totality of mark thumbnails corresponding to the totality of PlayLists and Clips are stored in the sole mark.thmb file. Since the thumbnails are frequently added or deleted, the operation of addition and partial deletion must be executable readily and speedily. For this reason, Thmbnail( ) has a block structure. Picture data is divided into plural portions each of which is stored in one tn_block. One picture data is stored in consecutive tn_blocks. In the string of tn_blocks, there may exist a tn_block not in use. The byte length of a sole thumbnail picture is variable.

FIG. 86 shows the syntax of the menu.thmb file and the mark.thmb file, whilst FIG. 87 shows the syntax of the thumbnail syntax in the syntax of the menu.thmb file and the mark.thmb file. By way of explanation of the Thmbnail syntax shown in FIG. 87, the version_number is the four character letters indicating the version number of this Thumbnail( ). The version_number must be encoded to "0045" in accordance with ISO 646.

Length is a 32-bit unsigned integer indicating the number of bytes of makers_private_data as from directly after the length field to the trailing end of Thumbnail( ). Tn_block_start_address is a 32-bit unsigned integer indicating the leading byte address of the first tn_block, with the number of relative bytes as from the leading byte of Thumbnail( ) as unit. The number of relative bytes is counted from 0. Number_of_thumbnails is a 16-bit unsigned integer affording the number of entries of the thumbnail picture contained in the Thumbnail( ).

Tn_block_size is a 16-bit unsigned integer affording one tn_block size with 1024 bytes as unit. For example, if tn_block_size=1, it indicates that the size of one tn_block is 1024 bytes. Number_of_tn_blocks is a 16-bit unsigned integer representing the number of entries of tn_blocks in the Thumbnail( ). Thumbnail_index is a 16-bit unsigned integer representing the index number of a thumbnail picture represented by the thumbnail information corresponding to one for-loop beginning from this thumbnail_index field. The value of 0xFFFF must not be used as thumbnail_index. The thumbnail_index is referenced by ref_thumbnail_index in the UIAppInfVolume( ), UIAppInfoPlayList( ), PlayListMark( ) and ClipMark( ).

Thumbnail_picture_format is an 8-bit unsigned integer representing the picture format of a thumbnail picture and assumes a value shown in FIG. 88. In the table, DCF and PNG are allowed only in "menu_thumb". The mark thumbnail must assume a value "0x00" (MPEG-2 Video I-picture).

Picture_data_size is a 32-bit unsigned integer indicating the byte length of a thumbnail picture in terms of a byte as a unit. Start_tn_block_number is a 16-bit unsigned integer indicating the tn_block number of the tn_block where begins the thumbnail picture data. The leading end of the thumbnail picture data must be coincident with the leading end of tn_block. The tn_block number begins with 0 and is relevant to the value of a variable k in the for-loop in tn_block.

X_picture_length is a 16-bit unsigned integer representing the number of pixels in the horizontal direction of a frame picture of the thumbnail picture. Y_picture_length is a 16-bit unsigned integer representing the number of pixels in the vertical direction of a frame picture of the thumbnail picture. Tn_block is an area in which a thumbnail picture is stored. The totality of tn_blocks in Thumbnail( ) are of the same size (fixed length) and are defined in size by tn_block_size.

FIGS. 89A and 89B schematically show how thumbnail picture data are stored in tn_block. As shown in FIGS. 89A and 89B, the respective thumbnail picture data begin from the leading end of tn_block and, if the picture data are of a size exceeding tn_block, the next consecutive tn_block is used for storage. By so doing, picture data with a variable size may be managed as fixed length data such that editing such as deletion can be coped with by a simpler processing operation.

An AV stream file is now explained. The AV stream file is stored in "M2TS" directory (FIG. 14). There are two types of the AV stream files, one being a CLIP AV stream and the other being a Bridge-Clip AV stream. Both streams must be of a DVR MPEG-2 transport stream file structure as hereinafter defined.

Figure 90:
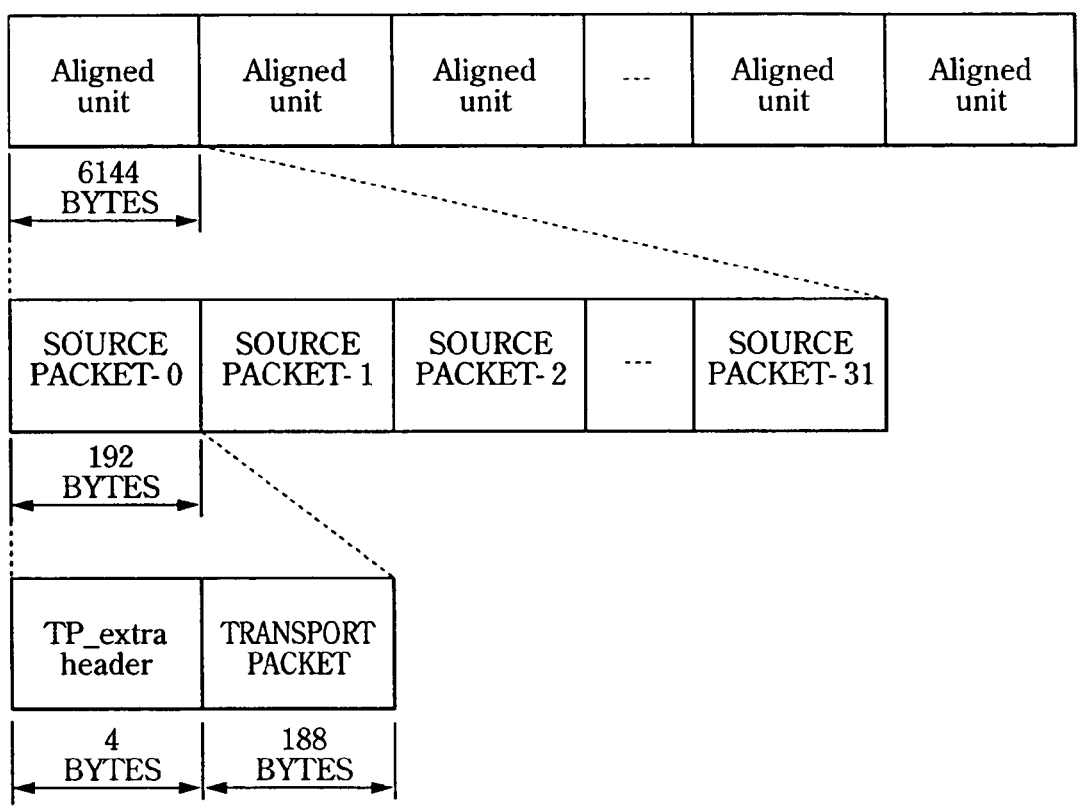
FIG. 90 illustrates the structure of a transport stream of DVMPEG2.

First, the DVR MPEG-2 transport stream is explained. The structure of DVR MPEG-2 transport stream is as shown in FIG. 90. The AV stream file has the structure of a DVR MPEG-2 transport stream constructed by an integer number of Aligned units. The Aligned unit has a size of 6144 bytes (=2048×3 bytes). The Aligned unit begins at the first byte of the source packet having a length of 192 bytes. One source packet is made up of TP_extra_header and a transport packet. The TP_extra_header is 4 bytes long, with the transport packet being 188 bytes long.

One Aligned unit is made up of 32 source packets. The last Aligned unit in the DVR MPEG-2 transport stream is also made up of 32 source packets. So, the DVR MPEG-2 transport stream ends at a boundary of the Aligned unit. If the number of the transport packets of the input transport stream recorded on the disc is not a multiple of 32, the source packet having a null packet (transport packet of PID=0x1FFF) must be used as the last Aligned unit. The file system is not allowed to add redundant information to the DVR MPEG-2 transport stream.

Figure 91:
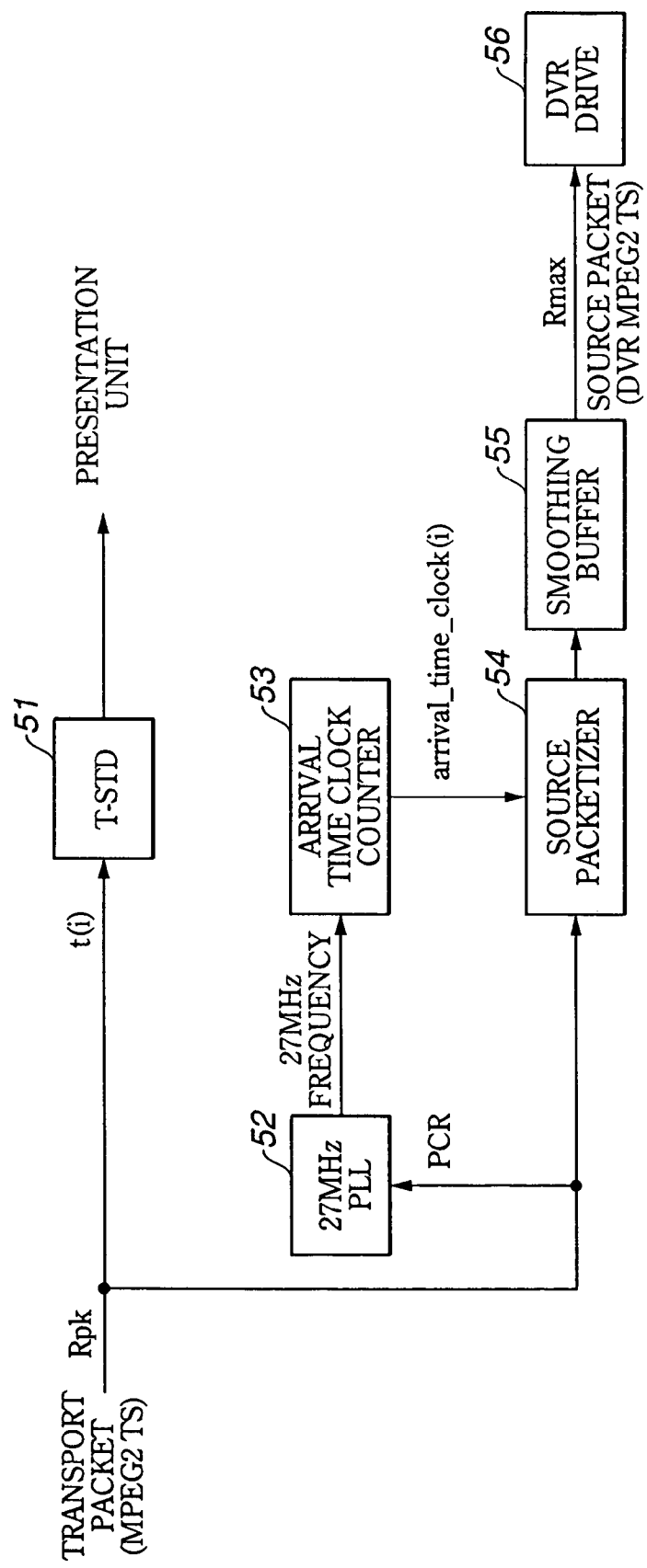
FIG. 91 shows a recorder model of the transport stream of DVMPEG2.

FIG. 91 shows a recorder model of the DVR MPEG-2 transport stream. The recorder shown in FIG. 91 is a conceptual model for prescribing a recording model. The DVR MPEG-2 transport stream follows this model.

The input timing of the MPEG-2 transport stream is explained. The input MPEG-2 transport stream is a full transport stream or a partial transport stream. The input MPEG-2 transport stream must obey the ISO/IEC13818-1 or ISO/IEC13818-9. The number i byte of the MPEG-2 transport stream is input at time t(i) simultaneously to both a T-STD Transport stream system target decoder as provided in ISO/IEC 13818-1) 51 and a source packetizer 54. Rpk is an instantaneous maximum value of the input rate of the transport packet.

A 27 MHz PLL 52 generates a frequency of 27 MHz clocks. The frequency of 27 MHz clocks is locked at a value of PCR (program clock reference) of the MPEG-2 transport stream. An arrival time lock counter 53 is a binary counter counting pulses of the frequency of 27 MHz. The arrival_time_clock(i) is a count value of the arrival time clock counter 53 at time t(i).

The source packetizer 54 appends TP_extra_header to the totality of transport packets to create a source packet. Arrival_time_stamp indicates the time at which the first byte of the transport packet arrives at both the T-STD 51 and the source packetizer 54. Arrival_time_stamp(k) is a sample value of the arrival_time_clock(k), as indicating by the following equation:

$$\text{arrival\_time\_clock}(k) = \text{arrival\_time\_clock}(k) \% 2^{30}$$

where k indicates the first byte of the transport packet.

If the time interval of two consecutively input transport packets amounts to not less than $2^{30}/27000000$ sec (about 40 sec), the difference between the arrival_time_clock(k) of the two transport packets should be set to $2^{30}/27000000$ sec. The recorder is provided for such case.

A smoothing buffer 55 smooths the bitrate of the input transport stream. Th smoothing buffer 55 is not allowed to overflow. Rmax is an output bitrate of a source packet from the smoothing buffer 55 when the smoothing buffer 55 is not void. If the smoothing buffer 55 is void, an output bitrate of the smoothing buffer 55 is 0.

The parameters of a recorder model of the DVR MPEG-2 transport stream are hereinafter explained. The value of Rmax is given by TS_recording_rate defined in ClipInfo( ) associated with the AV stream file. This value may be calculated in accordance with the following equation:

$$R\text{max} = TS\_\text{recording\_rate} * 192/188$$

where the value of TS_recording_rate is of a size based in bytes/second as unit.

If the input transport stream is an SESF transport stream, Rpk must be equal to TS_recording_rate as defined in ClipInfo( ) associated with the AV stream file. If the input transport stream is not an SESF transport stream, the values defined in descriptors of the MPEG-2 transport stream, such as smoothing_buffer_descriptor, short_smoothing_bugger_descriptor or partial_transport_stream_descriptor, may be referenced as to the size of the smoothing buffer 55.

If the input transport stream is an SESF transport stream, the size of the smoothing buffer 55 (smoothing buffer size) is zero. If the input transport stream is not an SESF transport stream, the values defined in descriptors of the MPEG-2 transport stream, such as smoothing_buffer_descriptor, short_smoothing_bugger_descriptor or partial_transport_stream_descriptor, may be referenced as to the size of the smoothing buffer 55.

For a recorder and a reproducing unit, a buffer of a sufficient size needs to be used. The default buffer size is 1536 bytes.

Figure 92:
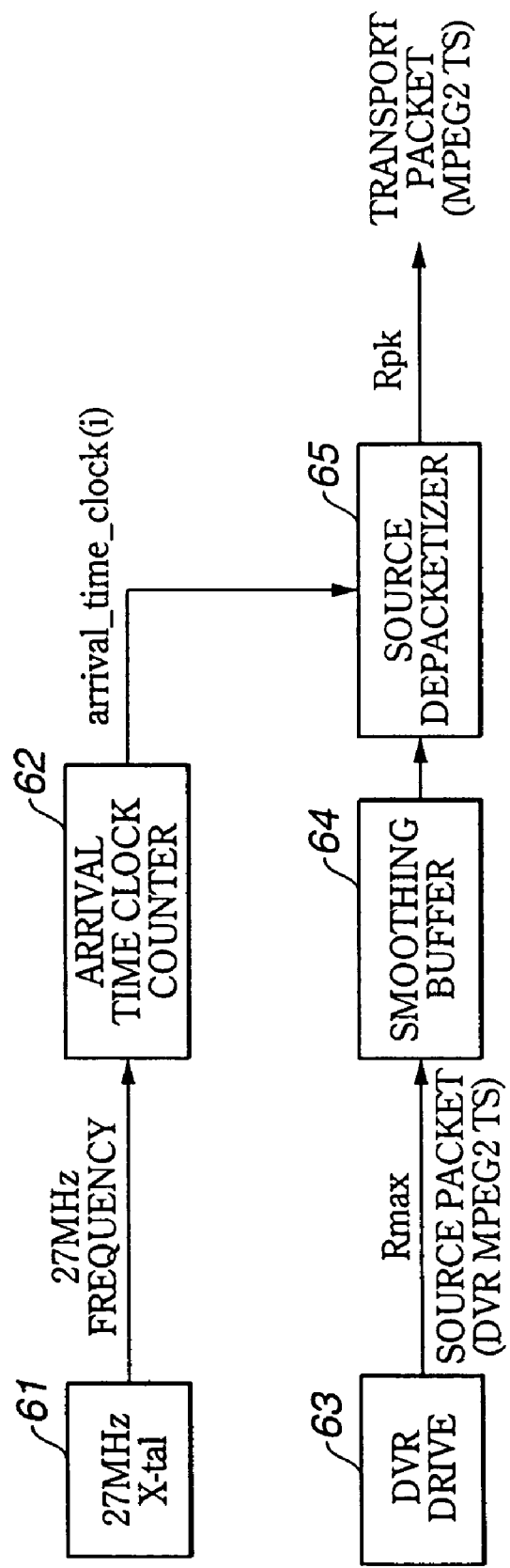
FIG. 92 shows a player model of the transport stream of DVMPEG2.

A player model of the DVR MPEG-2 transport stream is now explained. FIG. 92 shows a player model of the DVR MPEG-2 transport stream. This is a conceptual model for prescribing the replay process. The DVR MPEG-2 transport stream obeys this model.

A 27 MHz X-tal (crystal oscillator) 61 generates a 27 MHz frequency. The error range of the 27 MHz frequency must be ±30 ppm (27000000±810 Hz). An arrival time clock counter 62 is a binary counter counting pulses of 27 MHz. Arrival_time_clock(i) is a count value of the arrival time clock counter 62 at time t(i).

In the smoothing buffer 64, Rmax is an input bitrate of a source packet to the smoothing buffer 64 when the smoothing buffer 64 is not full. If the smoothing buffer 64 is full, the input bitrate to the smoothing buffer 64 is 0.

By way of explaining the output timing of the MPEG-2 transport stream, if arrival_time_stamp of the current source packet is equal to the value of the 30 LSB bits of arrival_time_clock(i), the transport packet of the source packet is extracted from the smoothing buffer 64. Ppk is an instantaneous maximum value of the transport packet rate. The smoothing buffer 64 is not allowed to overflow.

The parameters of the player model of the DVR MPEG-2 transport stream are the same as the parameters of the recorder model of the above-described DVR MPEG-2 transport stream.

FIG. 93 shows the syntax of the Source packets, while transport_packet( ) is an MPEG-2 transport packet as prescribed in ISO/IEC 13818-1. FIG. 94 shows a TP_extra_header in the syntax of the source packet shown in FIG. 93. By way of explaining the syntax of the TP_extra_header shown in FIG. 94, copy_permission_indicator is an integer representing copy limitations of the payload of the transport packet. The copy limitations may be set to copy free, no more copy, copy once or copy prohibited. FIG. 95 shows the relation between the values of copy_permission_indicator and the modes these values represent.

Copy_permission_indicator is appended to the totality of transport packets. If an input transport stream is to be recorded using the IEEE1394 digital interface, the value of copy_permission_indicator may be correlated with the value of EMI (encryption mode indicator) in the IEEE1394 isochronous packet header. If the input transport stream is recorded without using the IEEE1394 digital interface, the value of copy_permission_indicator may be correlated with the value of the CCI embedded in the transport packet. In self-encoding an analog signal input, the value of the copy_permission_indicator may be correlated with the value of CGMS-A of the analog signal.

It is noted that arrival_time_stamp is an integer value specified by arrival_time_stamp in the following equation:

$$arrival\_time\_stamp(k) = arrival\_time\_clock(k) \% 2^{30}.$$

In defining a Clip AV stream, the Clip AV stream must have the structure of the DVR MPEG-2 transport stream defined as described above. Arrival_time_clock(i) must increase continuously in a Clip AV stream. If a discontinuous point of the system time base (STC base) should exist in the Clip AV stream, the arrival_time_clock(i) of the Clip AV stream must increase continuously.

The maximum value of the difference of the arrival_time_clock(i) between the beginning and the end in the Clip AV stream must be 26 hours. This limitation guarantees that, if there is no discontinuous point of the system time base (STC base) in the MPEG-2 transport stream, no PTS (presentation time stamp) of the same value never appears in the Clip AV stream. The MPEG2 system standards provide that the wraparound time of PTS be $2^{33}/90000$ sec (approximately 26.5 hours).

In defining the Bridge-Clip AV stream, the Bridge-Clip AV stream must have a structure of a DVR MPEG-2 transport stream defined as described above. The Bridge-Clip AV stream must include one arrival time base discontinuous point. The transport stream ahead and at back of the arrival time base discontinuous point must obey the limitations on encoding as later explained and also must obey the DVR-STD as later explained.

The present embodiment provides for seamless support of the seamless connection of the video and audio between PlayItems in editing. This seamless connection between the PlayItems guarantees the "continuous data supply" to the player/recorder and "seamless decoding". The "continuous data supply" means the capability of a file system in assuring data supply to a decoder at a bitrate necessary for prohibiting buffer underflow. The "continuous data supply" assures data storage continuously in terms of a block of a sufficient size to assure real-time properties and data readout from the disc as a unit.

The "seamless decoding" means the capability of the player in demonstrating audio/video data recorded on the disc without producing pause or gap in the decoder replay output.

The AV stream referenced by the seamlessly connected PlayItem is explained. Whether or not the connection between the previous PlayItem and the current PlayItem is guaranteed to enable seamless display can be verified from the connection_condition field defined in the current PlayItem. There are a method for seamless connection between PlayItems employing Bridge-Clip and a method for seamless connection between PlayItems not employing Bridge-Clip.

Figure 96:
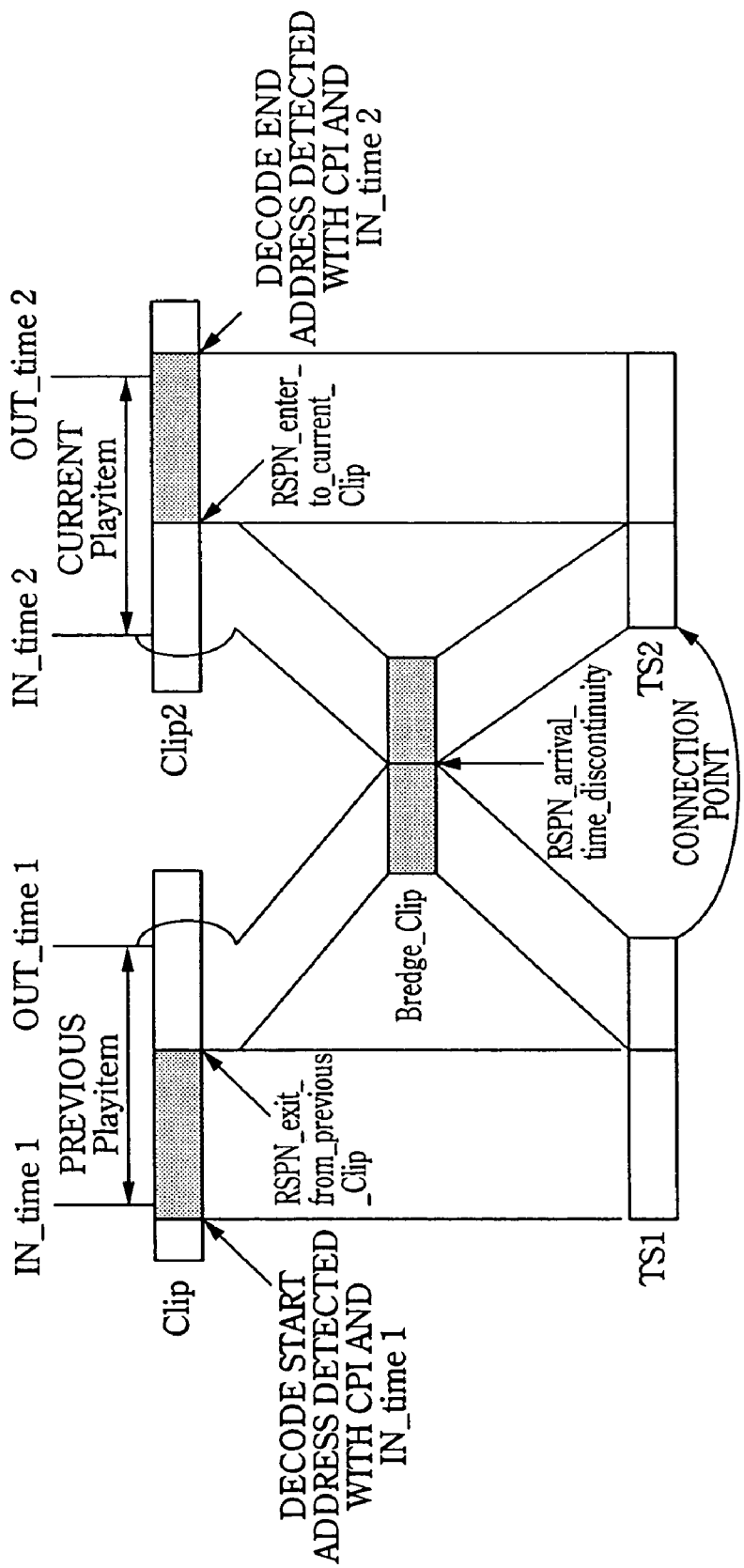
FIG. 96 illustrates seamless connection.

FIG. 96 shows the relation between the previous PlayItem and the current PlayItem. FIG. 96 shows TSI made up of a shaded stream data of Clip1 (Clip AV stream) and shaded stream data previous to RSPN_arrival_time_discontinuity of Bridge-Clip.

The shaded stream data of Clip1 of TSI is stream data from an address of a stream necessary for decoding a presentation unit associated with IN_time of the previous PlayItem (shown by IN_time in FIG. 96) to a source packet referenced by RSPN_exit_from_previous_Clip. The shaded stream data previous to RSPN_arrival_time_discontinuity contained in TSI is stream data from the first source packet of Bridge-clip to a source packet referenced by RSPN_arrival_time_discontinuity.

On the other hand, TS2 in FIG. 96 is made up of shaded stream data of Clip2 (Clip AV stream) and shaded stream data subsequent to PN_arrival_time_discontinuity of Bridge-Clip. The shaded stream data subsequent to RSPN_arrival_time_discontinuity of Bridge-Clip contained in TS2 is stream data from the source packet referenced by RSPN_enter_to_current_Clip to an address of a stream required fir decoding the presentation unit associated with OUT_time of the current PlayItem (shown in OUT_time2 in FIG. 96).

Figure 97:
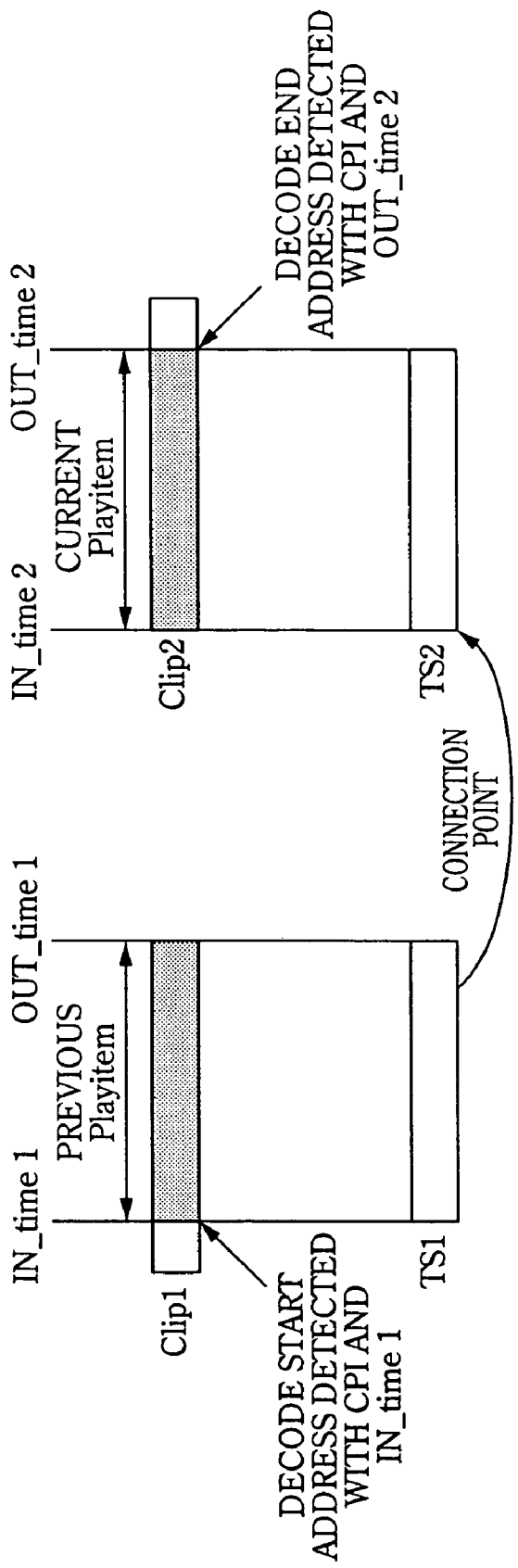
FIG. 97 illustrates seamless connection.

FIG. 97 shows the relation between the previous PlayItem and the current PlayItem in case of not employing Bridge-Clip. In this case, the stream data read out from the player is shown shaded. In FIG. 97, TS1 the shaded stream data of TS1 is data beginning from the address of a stream necessary for decoding the presentation unit associated with IN_time of previous PlayItem (shown with IN_time1 in FIG. 97) and extending up to the last source packet of Clip1. On the other hand, TS2 in FIG. 97 is comprised of shaded stream data of Clip2 (Clip AV stream).

The shaded stream data of Clip2 of TS2 is stream data beginning at a first source packet of Clip2 and ending at an address of a stream necessary for decoding the presentation unit associated with the OUT_time of the current PlayItem (shown OUT_time2 in FIG. 97).

In FIGS. 96 and 97, TS1 and T2 are continuous streams of source packets. Next, stream prescriptions of TS1 and TS2 and connection conditions therebetween are considered. As a limitation of the encoding structure of the transport stream, the number of video streams contained in TS1 and TS2 must be 1. The number of audio streams contained in TS1 and TS2 must be 2 or less. The numbers of audio streams contained in TS1 and TS2 must be equal to each other. It is noted that TS1 and/or TS2 may contain an elementary stream or a private stream other than those mentioned above.

Figure 98:
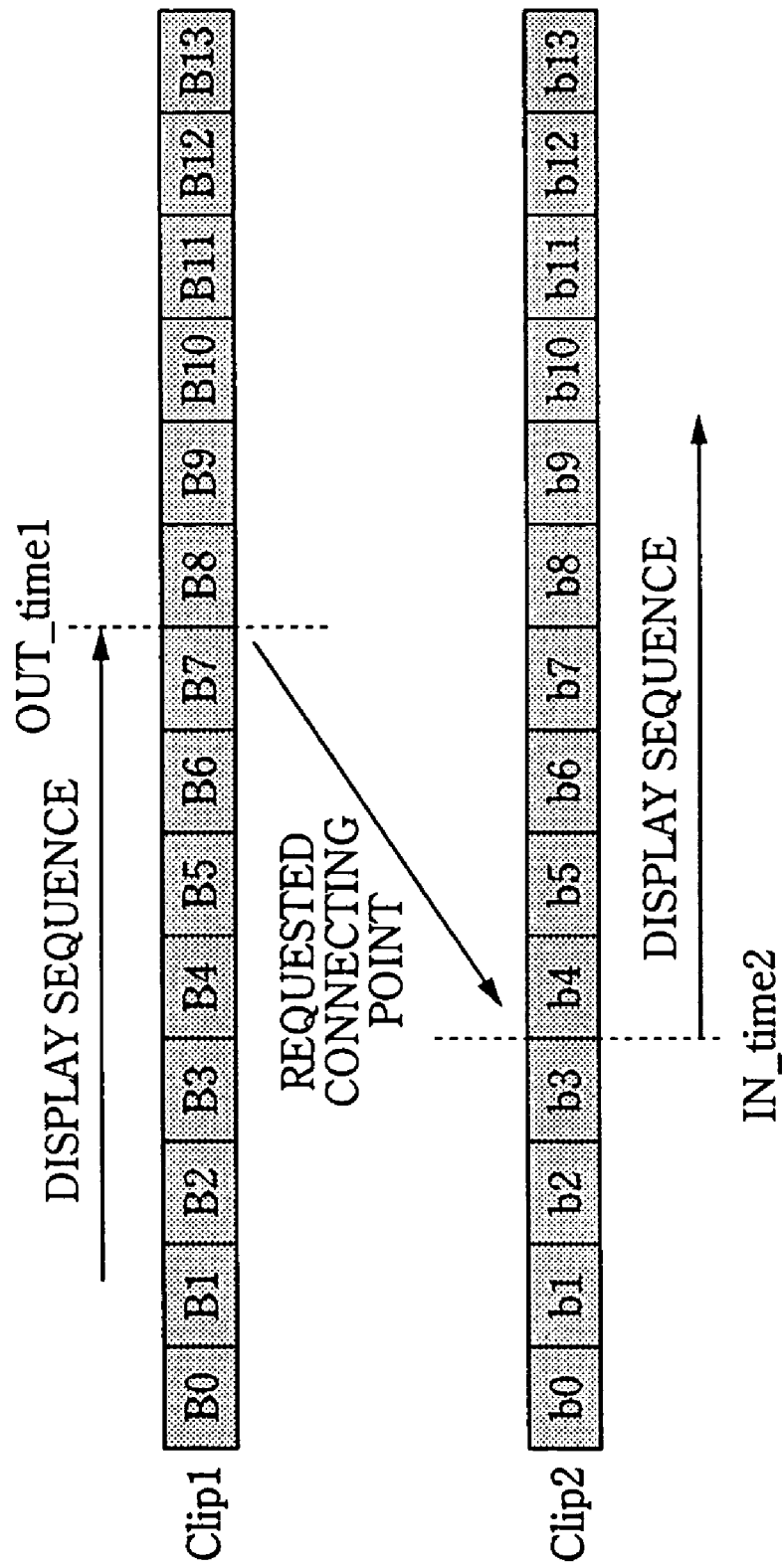
FIG. 98 illustrates seamless connection.

Limitations on a video bitstream are now explained. FIG. 98 shows an instance of seamless connection shown in the picture display sequence. In order that a video stream may be represented seamlessly, unneeded pictures represented at back of OUT_time (OUT_time of Clip1) and ahead of the IN_time2 (IN_time of Clip2) must be removed by a process of re-encoding a partial stream of the Clip near a junction point.

Figure 99:
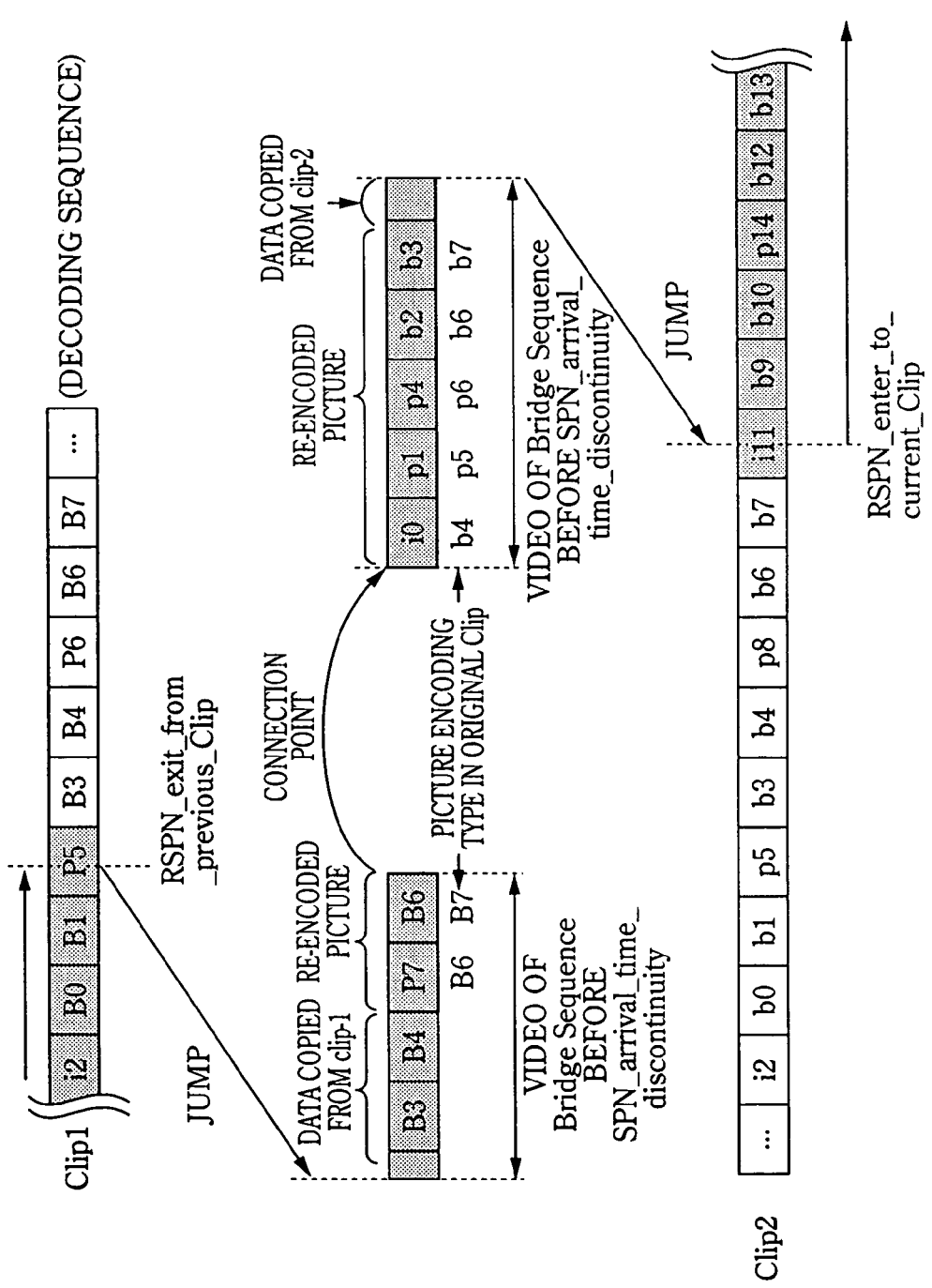
FIG. 99 illustrates seamless connection.

FIG. 99 shows an instance of realizing seamless connection using BridgeSequence in the case shown in FIG. 98. The video stream of Bridge-Clip previous to RSPN_arrival_time_discontinuity is made up of encoded video streams up to the picture associated with the OUT_time1 of Clip1 of FIG. 98. This video stream is connected to the video stream of the previous Clip1 and is re-encoded so as to prove one continuous elementary stream conforming to the MPEG2 standard.

In similar manner, the video stream of Bridge-Clip subsequent to RSPN_arrival_time_discontinuity is made up of an encoded video stream as from a picture corresponding to IN_time2 of Clip2 of FIG. 98. The video stream can start decoding correctly, is connected to the video stream of the next following Clip2 and is re-encoded so as to become one continuous elementary stream conforming to MPEG2 standard. For creating Bridge_Clip, several pictures in general need to be re-encoded, while other pictures can be copied from the original clip.

Figure 100:
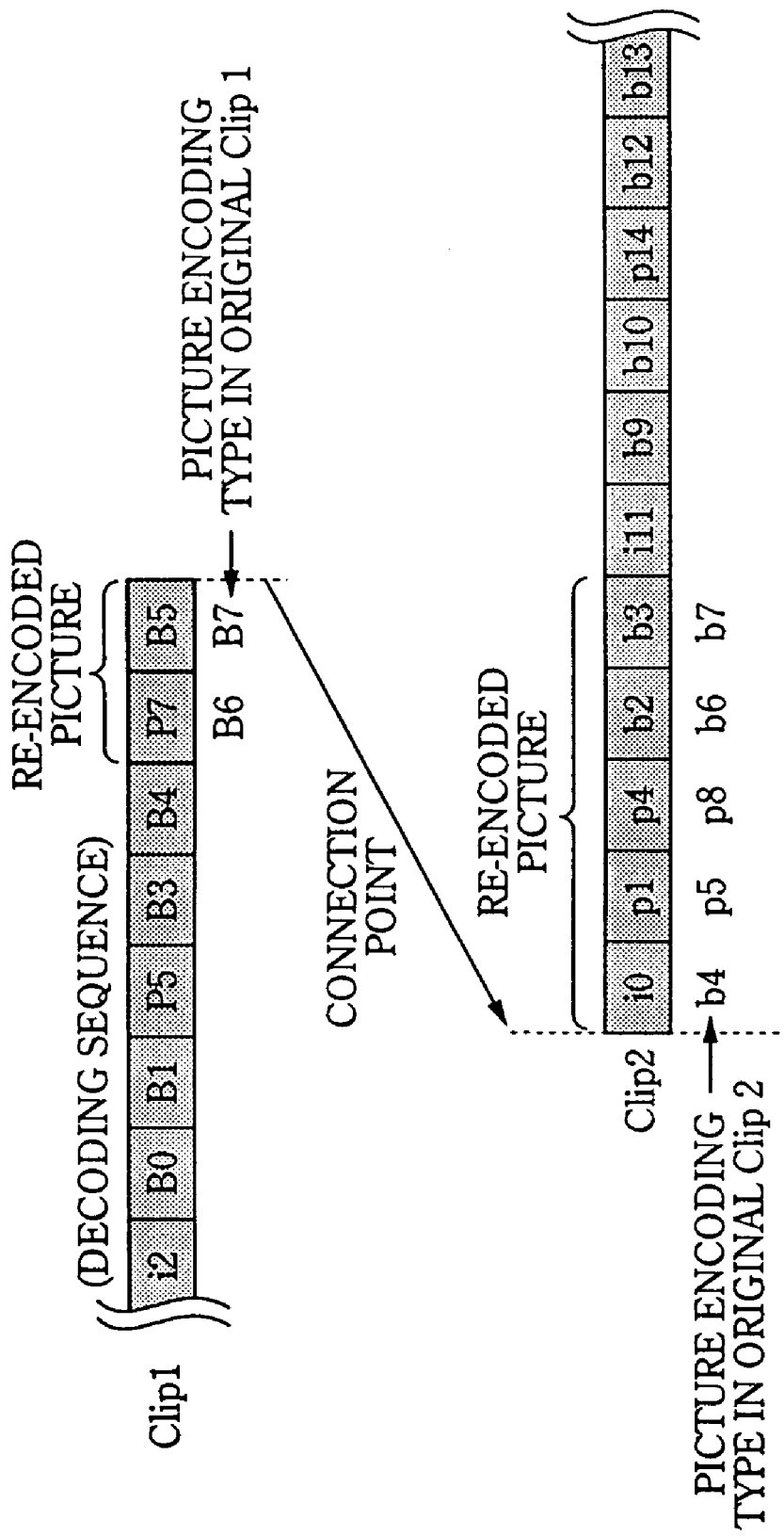
FIG. 100 illustrates seamless connection.

FIG. 100 shows a case of realizing seamless connection without using BridgeSequence in the case of the embodiment shown in FIG. 98. The video stream of Clip1 is made up of an encoded video stream up to a picture associated with OUT_time1 of FIG. 98, this being re-encoded so as to become one continuous elementary stream conforming to MPEG2 standard. Similarly, the video stream of Clip2 is comprised of an encoded video stream subsequent to the picture associated with the IN-time2 of Clip2 of FIG. 98, this being re-encoded so as to become one continuous elementary stream conforming to MPEG2 standard.

By way of explaining encoding limitation of the video stream, the frame rate of TS1 and TS2 video streams must be equal to each other. The TS1 video stream must end in sequence_end_code, while the TS2 video stream must start in sequence_header, GOP header and in an I-picture. The TS2 video stream must start in closed GOP.

The video presentation unit (frame or field) as defined in a bitstream must be continuous with a junction point in-between. At the junction point, the top/bottom field sequence must be continuous. In the case of encoding employing the 3-2 pulldown, it may be necessary to rewrite "top_field_first" and "repeat_first_field", while local re-encoding may also be made to prevent occurrence of a field gap.

By way of explaining encoding limitations on an audio bitstream, the audio sampling frequency of TS1 and that of TS2 must be equal to each other. The audio encoding method, such as MPEG1 layer 2, AC-3, SESF, LPCM and AAC of TS1 and TS2 must be equal to each other.

By way of explaining coding limitations on the MPEG-2 transport stream, the last audio frame of the TS1 audio stream must contain an audio sample having a display time equal to that at display end time of the display picture of TS1. The first audio frame of TS2 audio stream must contain an audio sample equal to that at display start time of the first display picture of TS2.

Figure 101:
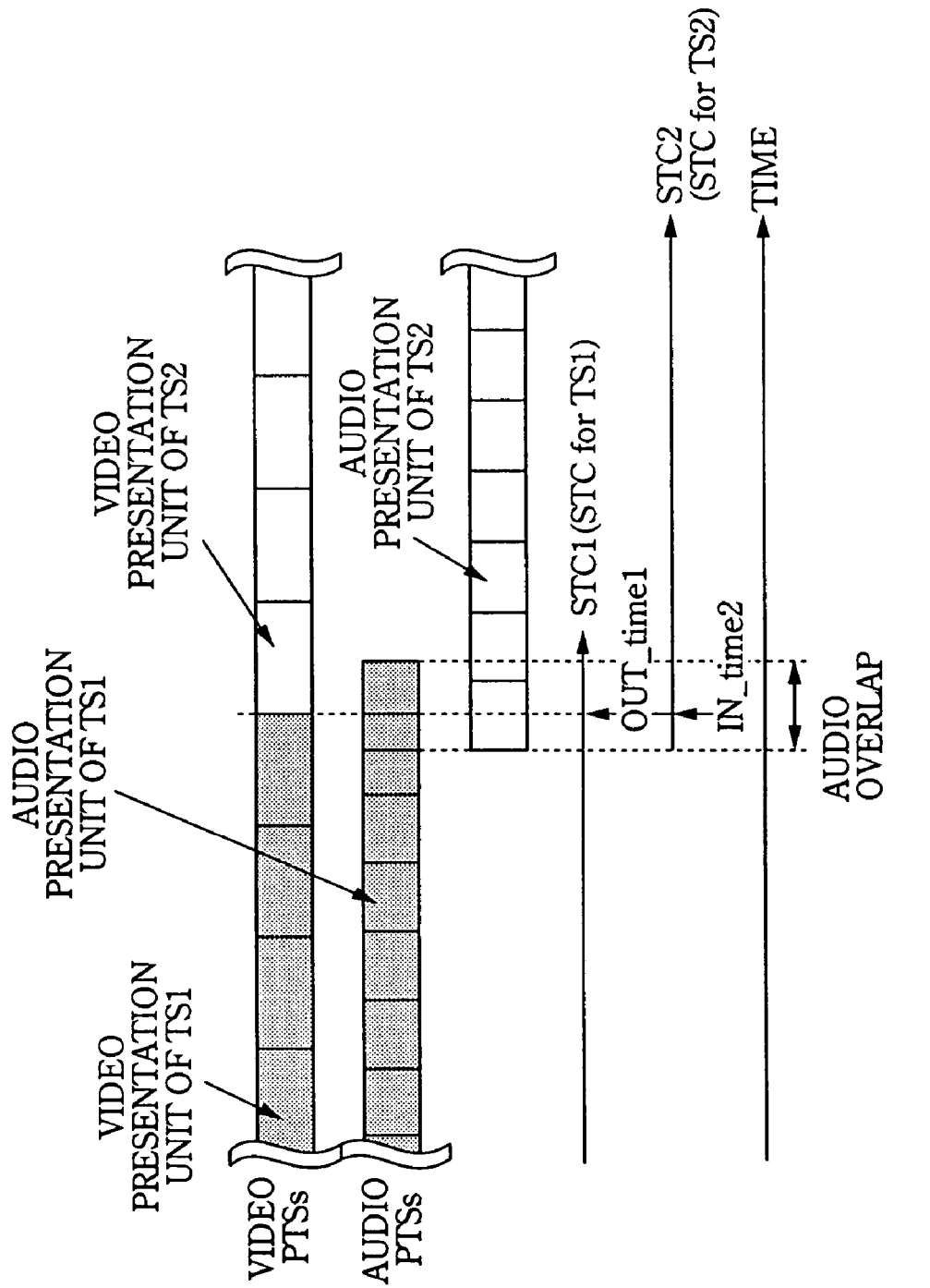
FIG. 101 illustrates audio overlap.

At a junction point, there must not be a gap in the sequence of the audio presentation unit. As shown in FIG. 101, there may be an overlap defined by the length of the audio presentation unit not larger than two audio frame domain. The first packet transmitting the TS2 elementary stream must be a video packet. The transport stream at the junction point must obey the DVR-STD which will be explained subsequently.

By way of explaining the limitations of Clip and Bridge-Clip, TS1 and TS2 must not contain discontinuous points of the arrival time base therein.

The following limitations are applied only to the case of using Bridge-Clip. The Bridge_Clip AV stream has only one arrival time base discontinuous point at a junction point between the last source packet of TS1 and the first source packet of TS2. The RSPN_arrival_time_discontinuity as defined in Clip Info( ) must indicate an address of the discontinuous point which in turn must indicate the address referencing the first source packet of TS2.

The source packet referenced by the RSPN_exit_from_previous_Clip as defined in BridgeSequenceInfo( ) may be any source packet in the Clip. It is unnecessary for this source packet to be a boundary of the Aligned unit. The source packet referenced by the RSPN_exit_from_current_Clip as defined in BridgeSequenceInfo( ) may be any source packet in the Clip. It is unnecessary for this source packet to be a boundary of the Aligned unit.

By way of explaining limitations on the PlayItem, the OUT_time of previous PlayItem (OUT_time 1 shown in FIGS. 96 and 97) mist indicate the display end time of the last presentation unit of TS1. The IN_time of the current PlayItem (IN_time2 shown in FIGS. 96 and 97) must indicate the display start time of the first video presentation unit of TS2.

Figure 102:
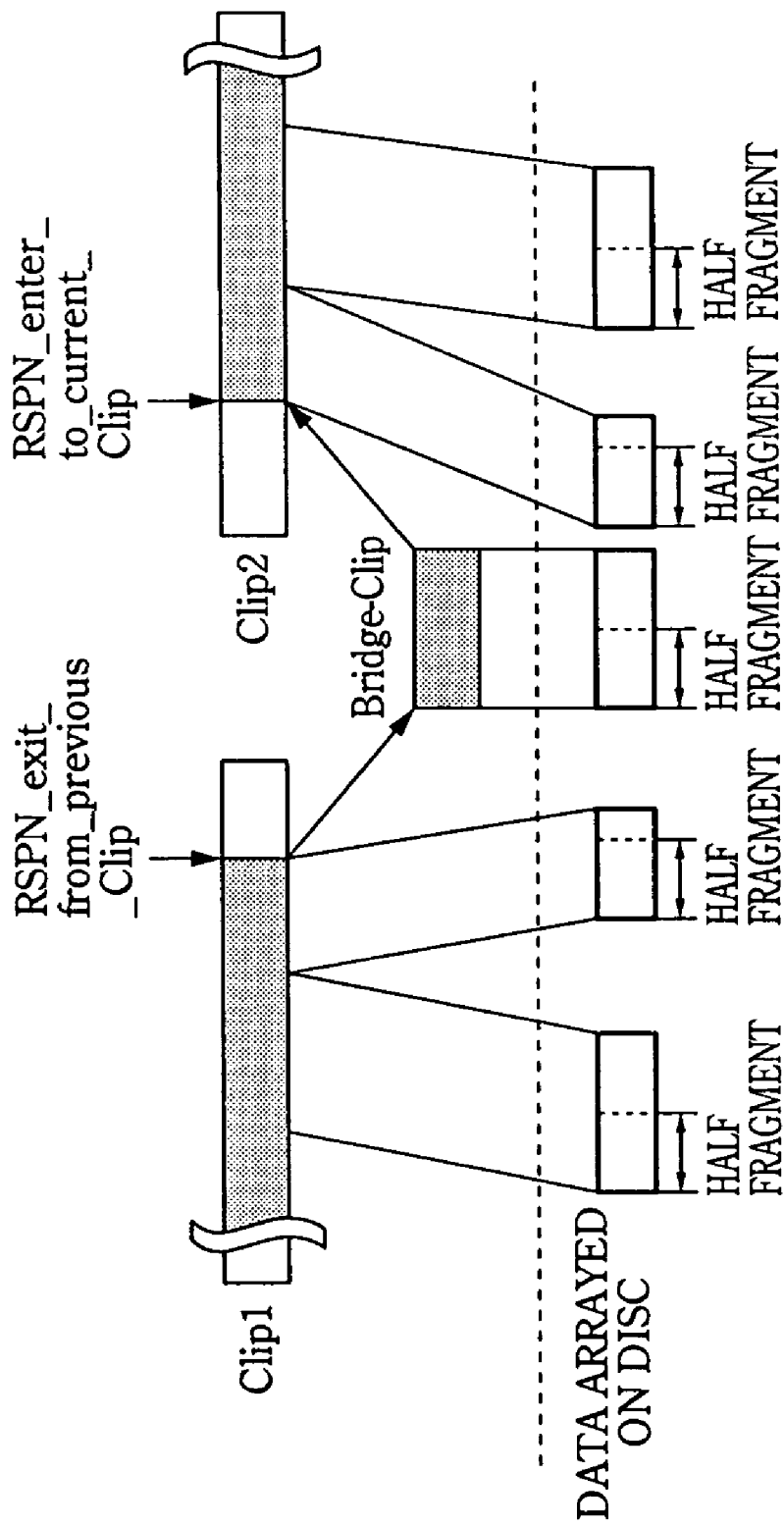
FIG. 102 illustrates seamless connection employing BridgeSequence.
Figure 103:
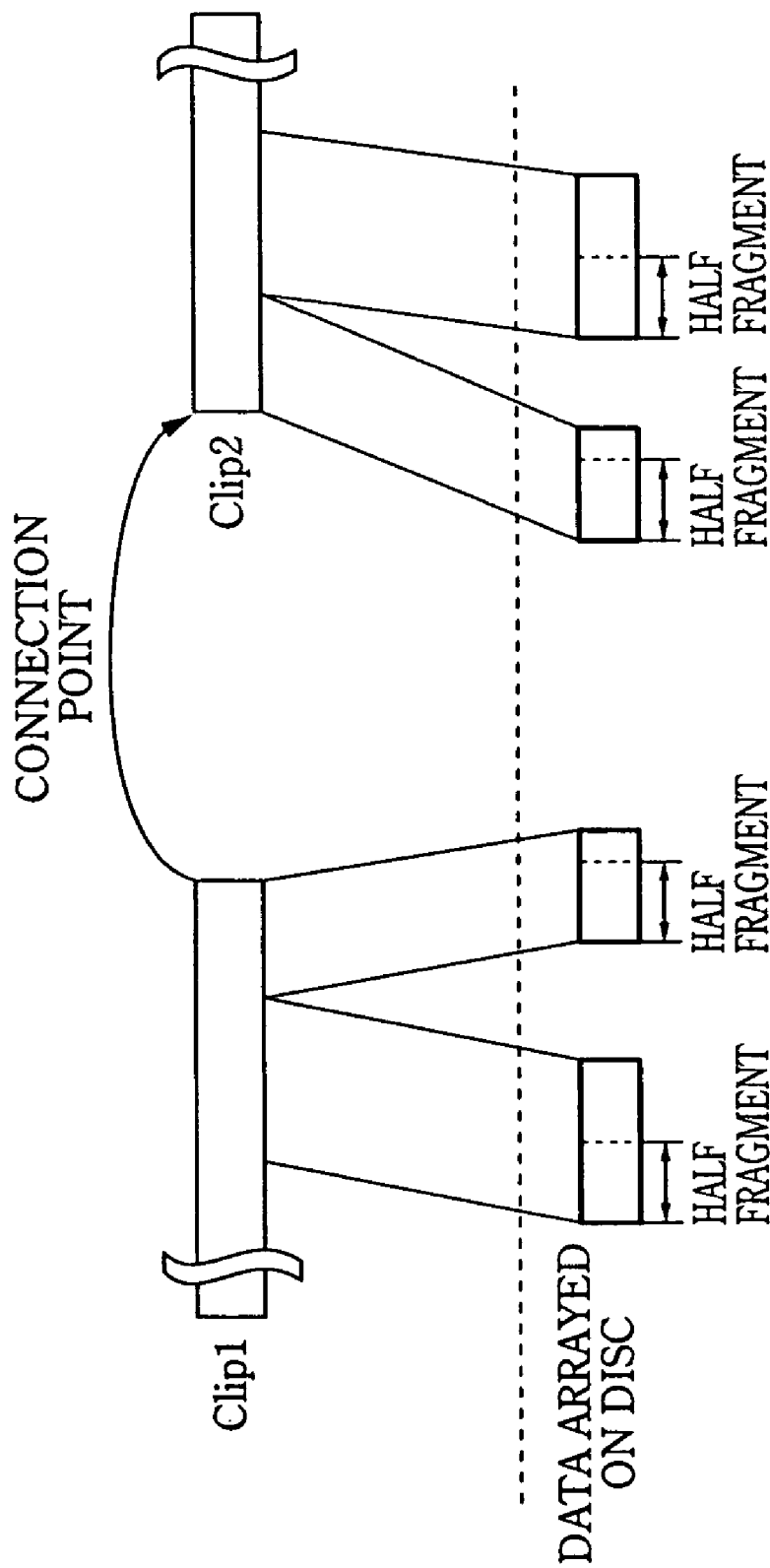
FIG. 103 illustrates seamless connection not employing BridgeSequence.

By way of explaining the limitations on data allocation in using the Bridge-Clip with reference to FIG. 102, seamless connection must be created such as to guarantee continuous data supply by the file system. This must be done by arraying the Bridge-Clip AV stream, connected to the Clip1 (Clip AV stream file) and Clip2 (Clip AV stream file), such as to satisfy the data allocation prescriptions.

The RSPN_exit_from_previous_Clip must be selected so that the stream portion of the Clip1 (Clip AV stream file) previous to RSPN_exit_from_previous_Clip (Clip AV stream file) will be arrayed in a continuous area not smaller than one-half fragment. The data length of the Bridge-Clip AV stream must be selected so as to be arrayed in a continuous area not smaller than one-half fragment. RSPN_enter_to_current_Clip must be selected so that the stream portion of Clip2 (Clip AV stream file) subsequent to PN_enter_to_current_Clip is arrayed in a continuous area not smaller than one-half fragment.

By way of explaining the limitations of data allocation in case of seamless connection without using Bridge-Clip, seamless connection must be created so that continuous data supply will be guaranteed y the file system. This must be carried out by arraying the first portion of last portion of the Clip1 (Clip AV stream file) and the first portion of Clip2 (Clip AV stream file) such as to meet the data allocation prescriptions.

The first stream portion of Clip1 (Clip AV stream file) must be arranged in a continuous area not shorter than one half fragment. The first stream portion of Clip2 (AV stream file) must be arranged in a continuous area not smaller than one half fragment.

Next, the DVR-STD is explained. The DVR-STD is a conceptual model for modeling the decoding processing in generating and verifying the DVR MPEG-2 transport stream. On the other hand, the DVR-STD is a conceptual model for modeling the decoding processing in generating and verifying the AV stream referenced by two PlayItems connected seamlessly as described above.

Figure 104:
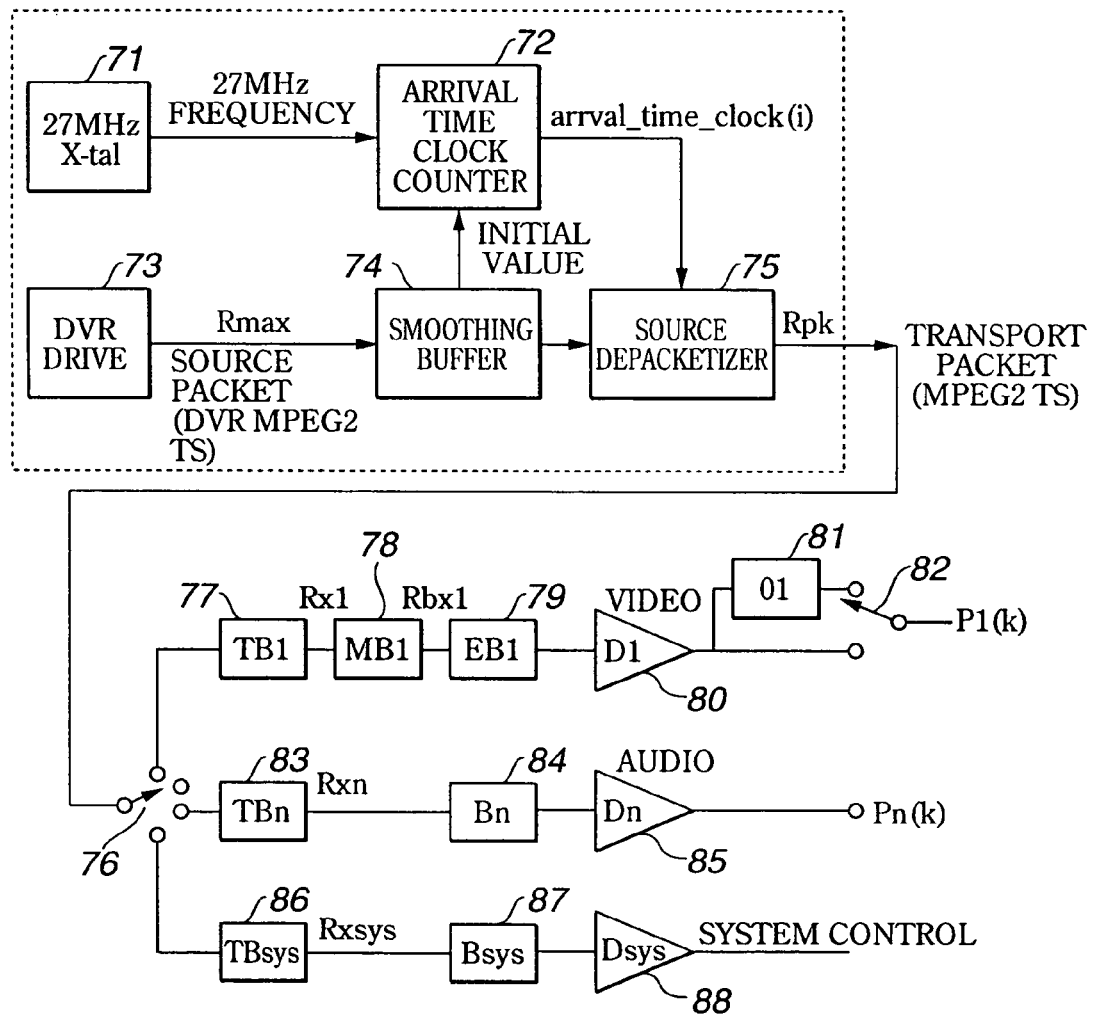
FIG. 104 shows a DVRSTD model.

FIG. 104 shows a DVR-STD model. The model shown in FIG. 104 contains, as a constituent element, a DVR MPEG-2 transport stream player model. The notation such as n, Tbn, Mbn, Ebn, Tbsys, Bsys, Rxn, Rbxn, Rxsys, Dn, Dsys, On and Pn(k) are the same as those defined in T-STD of ISO/IEC138188-1. That is, n is an index number of an elementary stream and Tbn is a transport buffer of an elementary stream n.

Mbn is a multiplex buffer of the elementary stream n, and is present only in a video stream. Ebn is an elementary stream buffer in the elementary stream n. It is present only for the video stream. Tbsys is an input buffer for the system information in a program being decoded. Bsys is a main buffer in a system target decoder for the system information for a program being decoded. Rbxn is a transmission rate with which data is removed from Mbn and is present only for a video stream.

Rxsys is a transmission rate with which data is removed from Tbsys. Dn is a decoder in an elementary stream n. Dsys is s decoder pertinent to the system information of a program being decoded. On is a re-ordering buffer in a video stream. Pn(k) is a number k presentation unit in the elementary stream n.

The decoding process for DVR-STD is explained. During the time a sole DVR MPEG-2 transport stream is being reproduced, the timing the transport packet is input to the Tbsys buffer is determined by the arrival_time_stamp of the source packet. The prescriptions for the decoding operation and the display operation are the same as those prescribed in ISO/IEC 13818-1.

The decoding process while the seamlessly connected PlayItem is being reproduced is explained. Here, reproduction of two AV streams, referenced by the seamlessly connected PlayItem, is explained. In the following explanation, the reproduction of the aforementioned TS1 And TS2, shown for example in FIG. 96, is explained. Meanwhile, TS1 and TS2 are a previous stream and a current stream, respectively.

Figure 105:
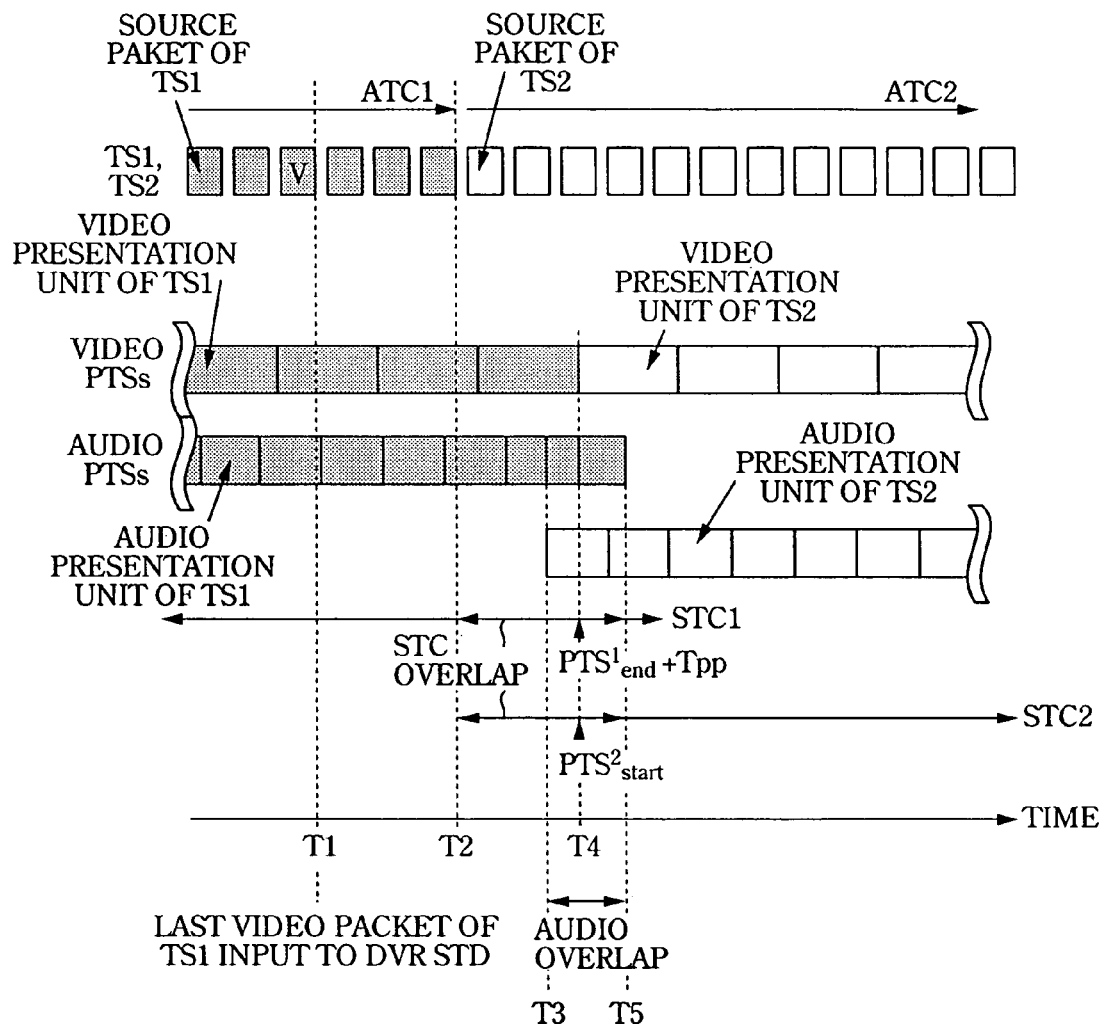
FIG. 105 shows a timing chart for decoding and display.

FIG. 105 shows a timing diagram for inputting, decoding and displaying a transport packet when transferring from a given AV stream (TS1) to the next AV stream (TS2) seamlessly connected thereto. During the time of transferring from a preset AV stream (TS1) to the next AV stream (TS2), connected seamlessly thereto, the time axis of the arrival time base of TS2 (indicated STC2 in FIG. 105) is not the same as the time axis of the arrival time base of TS1 (indicated STC1 in FIG. 105).

Moreover, the time axis of the system time base of TS2 (indicated STC2 in FIG. 105) is not the same as the time axis of the system time base of TS1 (indicated STC1 in FIG. 105). Video display is required to be seamlessly contiguous, while there may be overlap in the display time of the audio presentation unit.

The input timing to the DVR-STD is explained. Until the time T1, that is the time until the last video packet of TS1 is completely input to the TB1 of DVR-STD, the input timing to the TB1, Tbn or TBsys of DVR-STD is determined by the arrival_time_stamp of the source packet of TS1.

The remaining packet of TS1 must be input to the buffer of Tbn or Tbsys at a bitrate of TS_recording_rate (TS1), where TS_recording_rate (TS1) is a value of the TS_recording_rate defined in the ClipInfo( ) associated with the Clip1. The time the last byte of TS1 is input to the buffer is the time T2. Thus, in the domain from time T1 until time T2, arrival_time_stamp of the source packet is discounted.

If N1 is the number of bytes of the transport packet next following the last video packet of TS1, the time DT1 from time T1 until time DT1 is the time required for N1 bytes to be completely input at a bitrate of TS_recording_rate (TS1), and is calculated in accordance with the following equation:

$$DT1=T2-T1=N1/TS\_recording\_rate\ (TS1).$$

During the time as from T1 until T2, the values of Rxn and Rxsys are both changed to the value of TS_recording_rate (TS1). The buffering operation other than this rule are the same as that of the T-STD.

At time T2, the arrival time clock counter is reset to the value of arrival_time_stamp of the first source packet of TS2. The input timing of the TB1, Tbn or TBsys to the DVR-STD is determined by the arrival_time_stamp of the source packet of TS2. The Rxn and Rxsys are both changed to values defined in T-STD.

By way of explaining additional audio buffering and system data buffering, the audio decoder and the system decoder are required to have a surplus buffer quantity (approximately one second equivalent data volume) in addition to the buffer volume defined in T-STD.

By way of explaining the video presentation timing, display of the video presentation unit must be contiguous, via junction, in a manner free of gap. It is noted that STC1 is the time axis of the TS1 system time base (shown as STC1 in FIG. 105), while STC2 is the time axis of the TS2 system time base (shown as STC2 in FIG. 97). More accurately, STC2 begins at a time point the first PCR is input to T-STD.

The offset between STC1 and STC2 is determined as follows: If PTS1end is a PTS on STC1 associated with the last video presentation unit of TS1, and PTS2start is PTS on STC2 associated with the first video presentation unit of TS2, while Tpp is the display period of the last video presentation unit of TS1, the offset STC_delta between two system time bases may be calculated in accordance with the following equation:

$$STC\_delta=PTS1end+Tpp-PTS2start.$$

By way of explaining the audio presentation, there may be overlap of display timing of audio presentation unit, which overlap may be 0 to less than 2 audio frames (see "audio overlap" shown in FIG. 105). Which audio sample should be selected and re-synchronization of the display of the audio presentation unit to corrected time base at back of the junction point are set on the player.

By way of explaining the system time clocks of DVR-STD, the last audio presentation unit of TS1 is displayed at time T5. The system time clocks may be overlapped with between time T2 and time T5. During this domain, DVR-STD is switched between the old time base value (STC1) and t the new time base value (STC2). The value of STC2 may be calculated in accordance with the following equation:

$$STC2 = STC1 - STC\_delta.$$

The buffering continuity is explained. STC1video_end is the value of STC on the system time base STC1 when the last byte of the last video packet of TS1 reaches TB1 of DVR-STD, while STC2video_end is a value calculated into a value on the system time base STC2. The STC2video_end is calculated by the following equation:

$$STC2\text{video\_end} = STC1\text{video\_end} - STC\_delta.$$

In order that the DVR-STD will be obeyed, the following two conditions are required. First, the timing of arrival of the first byte of the first video packet of TS2 at the TB1 of the DVR-STD must satisfy the following inequality:

$$STC22\text{video\_start} > STC21\text{video\_end} + \Delta T1.$$

If, in order that the inequality be met, the partial stream of Clip1 and/or Clip2 is to be re-encoded and/or re-multiplexed, it is carried out as necessary.

Next, on the time axis of the system time base in which STC1 and STC2 are converted on the same time axis, input of video packets from TS1 and the next following video packet input from TS2 must not overflow nor underflow the video buffer.

Based on this syntax, data structure and rule, contents of data recorded on the recording medium or the replay information can be managed properly such that the user is able to confirm the contents of data properly recorded on the recording medium or reproduce desired data readily.

Although the present embodiment is explained taking the MPEG-2 transport stream as a multiplexed stream as an example, this is merely exemplary such that the present embodiment may be applied to a MPEG2 program stream or to a DSS transport stream used in DirecTV service (trademark) of USA.

Figure 106:
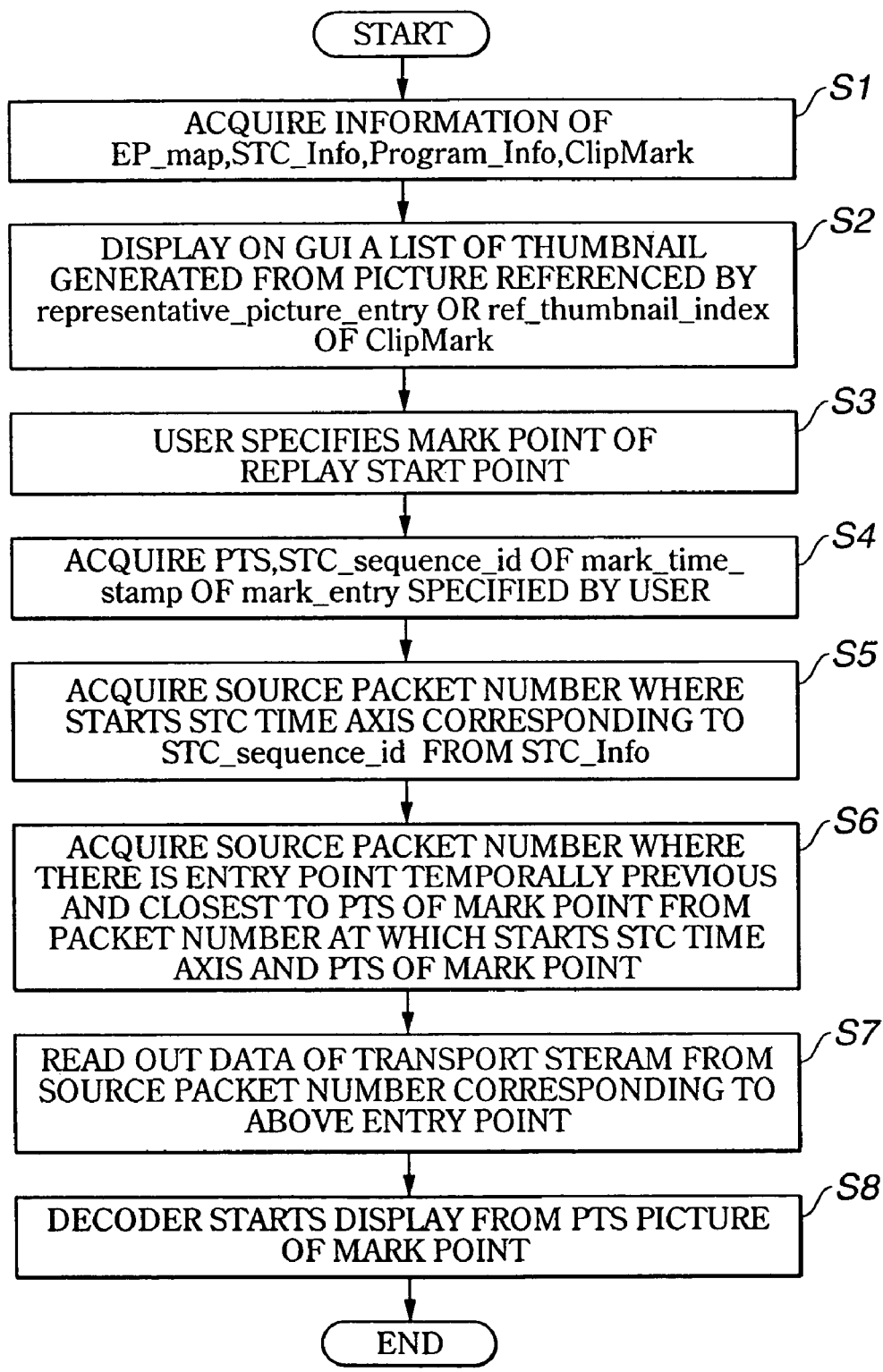
FIG. 106 is a flowchart for illustrating indexing reproduction of a scene indicated by a mark point in the case of the syntax of FIG. 81.

The processing of locating reproduction of a scene represented by a mark point in case the syntax of mark_entry( ) and representative_picture_entry( ) is configured as shown in FIG. 81 is explained with reference to the flowchart of FIG. 106.

First, at step S1, a controller 23 of a recording and/or reproducing apparatus 1 reads out the EP_map (FIG. 70), STC_Info (FIG. 52) and ClipMark (FIG. 78) as database of the DVR transport stream from the recording medium 100.

At step S2, the controller 23 formulates a list of a thumbnail from the picture referenced by representative_picture_entry (FIG. 81) or ref_thumbnail_index to output the so formed list from a terminal 24 as a user interface input/output for display on a menu of GUI. If, In this case, ref_thumbnail_index has an effective value, ref_thumbnail_index is prioritized with respect to representative_picture_entry.

At step S3, a user designates a mark point of the reproduction start point. This is realized by the user selecting a thumbnail picture from the menu screen displayed as GUI. The controller 23 is responsive to this selecting operation to acquire a mark point associated with the designated thumbnail.

At step S4, the controller 23 acquires PTS of mark_Time_stamp and STC_sequenc_id of mark_entry (FIG. 81) specified at step S3.

At step S5, the controller 23 acquires, from STC_Info (FIG. 52), a source packet number at which to start the STC time axis associated with STC_sequence_id acquired at step S4.

At step S6, the controller 23 acquires, from the packet number at which starts the STC time axis acquired at step S5 and from a PTS of the mark point acquired at step S4, a source packet number where there is the entry point (I-picture) temporally previous and closest to the PTS of the mark point.

At step S7, the controller 23 reads out data of the transport stream from the source packet number containing the entry point acquired at step S6 to send the read-out data to the AV recorder 27.

At step S8, the controller 23 controls the AV recorder 27 to start the display as from the picture of the PTS of the mark point acquired at step S4.

The above-described operation is further explained with reference to FIGS. 107 to 109.

Figures 107, 108, 109:
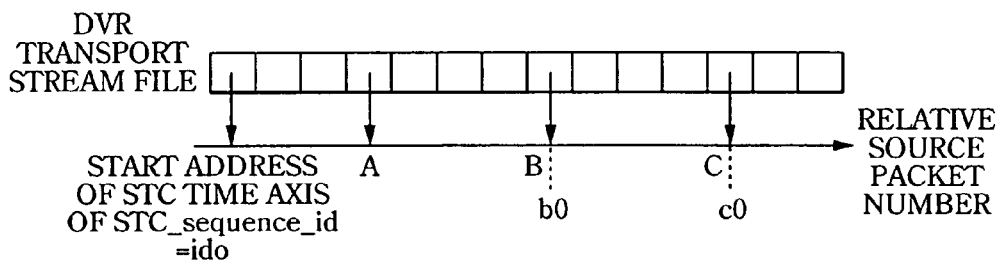
FIG. 107 illustrates the operation of reproduction in case the mark_entry( )/representative_picture_entry( ) of ClipMark in FIG. 75
FIG. 108 shows an example of EP_mark.
FIG. 109 shows an example of ClipMark.

It is assumed that a DV transport stream has CM (commercial) inserted in the DVR transport stream file has a STC time axis of STC_EP_start of STC_sequence_id=id=id0, as shown in FIG. 107, and that the source packet number with which the time axis begins is smaller than the source packet number of the source beginning point A. It is also assumed that the CM (commercial) is added between the source packet numbers B and C.

In this case, there are registered in EP_map, corresponding to the EP_map shown in FIG. 70, in association with A, B and C shown as RSPN_EP_start, respective PTSs, as PTS(A), PTS(B) and PTS(C), as shown in FIG. 108.

Referring to FIG. 109, there are recorded mark_entry and representative_picture_entry, in the ClipMark of FIG. 78, in association with the mark type values (FIG. 79) of 0x92, 0x94 and 0x95 representing scene start, CM start and CM end, as shown in FIG. 109.

As the Mark_time_stamp of mark_entry, PTS(a1), PTS(b0) and PTS(c0) are registered in association with the scene start, CM start and CM end, with the respective STC_sequence_id being id0.

Similarly, as mark_time-stamp of the representative_picture_entry, PTS(a2), PTS(b0) and PTS(c) are registered in association with the scene start, CM start and CM end, with the respective STC_sequence_id being id0.

If PTS(A)<PTS(a1), a packet number A is acquired at step S6. At step S7, a transport stream beginning at packet number A is supplied to the AV decoder 27 and, at step S8, display is initiated as from the PTS(a1).

Figure 110:
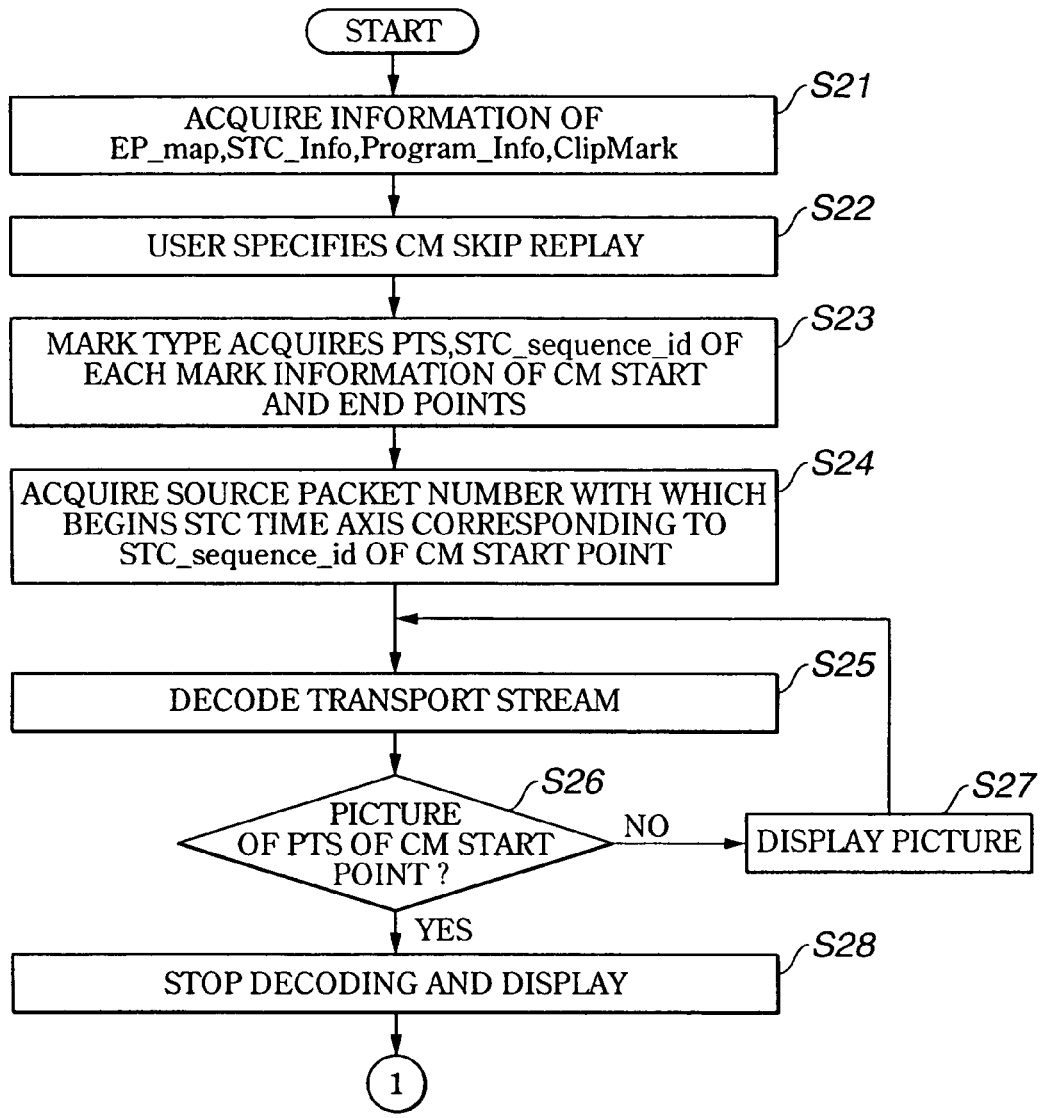
FIG. 110 is a flowchart for illustrating the CM skipping reproducing processing in case the mark_entry( )/representative_picture_entry( ) of ClipMark in FIG. 75
Figure 111:
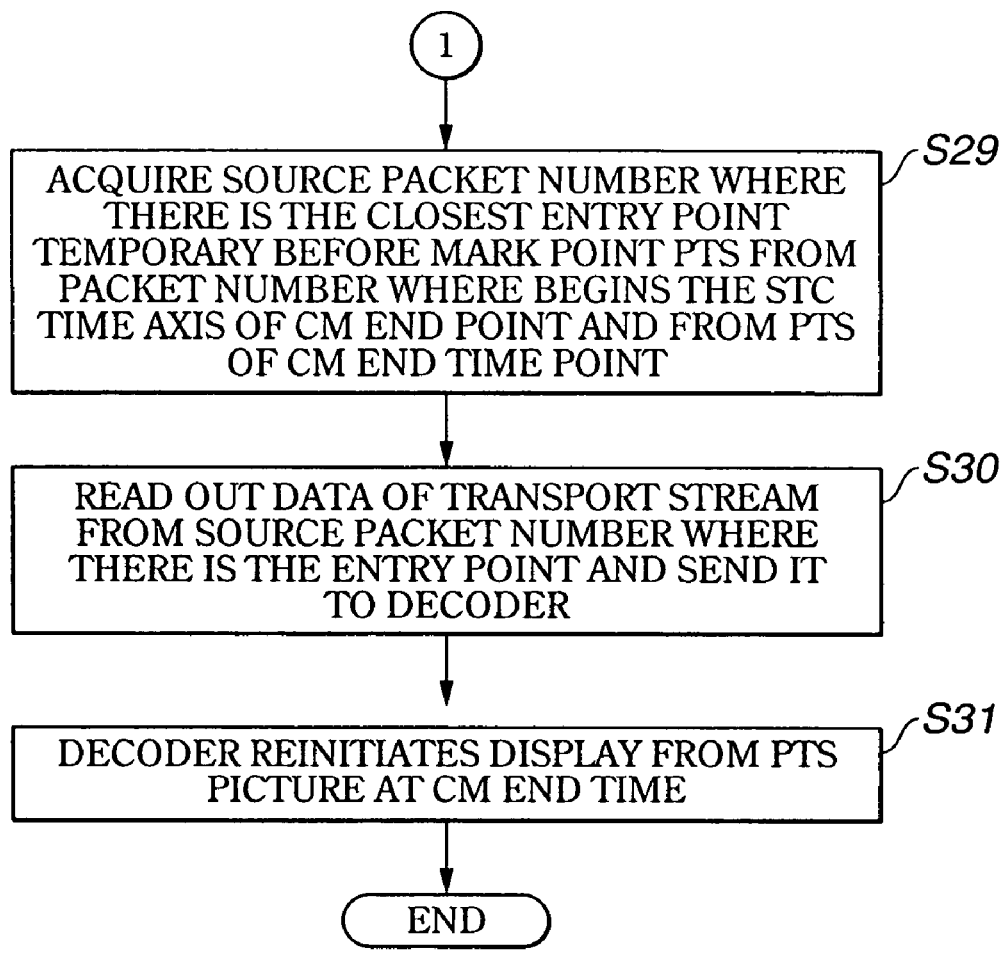
FIG. 111, continuing to FIG. 110, is a flowchart for illustrating the CM skipping reproducing processing in case the mark_entry( )/representative_picture_entry( ) of ClipMark in FIG. 75

Referring to the flowchart of FIG. 110, the processing of CM skip reproduction in case the syntax of mark_entry and representative_picture_entry is configured as shown in FIG. 81.

At step S21, the controller 23 reads out from the recording medium 100 the EP_map (FIG. 70), STC_Info (FIG. 52), Program_Info (FIG. 54) and ClipMark (FIG. 78). At step S22, the user designates CM skip reproduction from a terminal 24 as a user interface input/output.

At step S23, the controller 23 acquires the PTS of the mark information as the CM start point (0x94) and associated STC_sequence_id (FIG. 81).

At step S24, the controller 23 acquires, from STC_Info (FIG. 52), a source packet number of the CM beginning and end points, where begins the STC time axis corresponding to STC-sequence-id.

At step S25, the controller 23 causes the transport stream to be read out from the recording medium to route it to the AV decoder 27 to start the decoding.

At step S26, the controller 23 verifies whether or not the current displayed picture is a picture of the PTS of the CM start point. If the current display picture is not the picture of the CM start time point, the controller proceeds to step S27 to continue displaying the picture. The processing then reverts to step S25 to repeat subsequent steps.

If, at step S26, the current displayed picture is verified to be a picture of the PTS of the CM start point, the processing transfers to step S28 where the controller 23 controls the AV decoder 27 to halt the decoding and display.

At step S29, the controller 23 acquires the packet number where begins the STC time axis associated with the STC_sequence_id of the CM end point, while acquiring, from the packet number and the PTS of the CM end point acquired by the processing at step S23, the source packet number where there is an entry point temporally previous and closest to the PTS of the point.

At step S30, the controller 23 controls the AV decoder 27 to reinitiate display from the picture of the PTS of the CM end point.

At step S31, the controller 23 controls the AV decoder 27 to reinitiate display from the picture of the PTS at the CM end point.

Referring to FIGS. 107 to 109, the above-described operation is explained further. The CM start time point and the CM end point are present in this embodiment on the common time axis of STC_sequence-id=id0. The source packet number where begins the STC time axis is selected to be smaller than the source packet number A of the scene start point.

If the transport stream is decoded and, at step S26, the display time is found to be the PTS (b0), that is if the display time point is found to be CM start time point, display is halted by the AV decoder 27. If PTS(C)<PTS(c0), decoding is started from the stream, beginning from the data of the packet number C at step S30. At step S31, display is re-started from the picture of PTS(c0).

Figure 112:
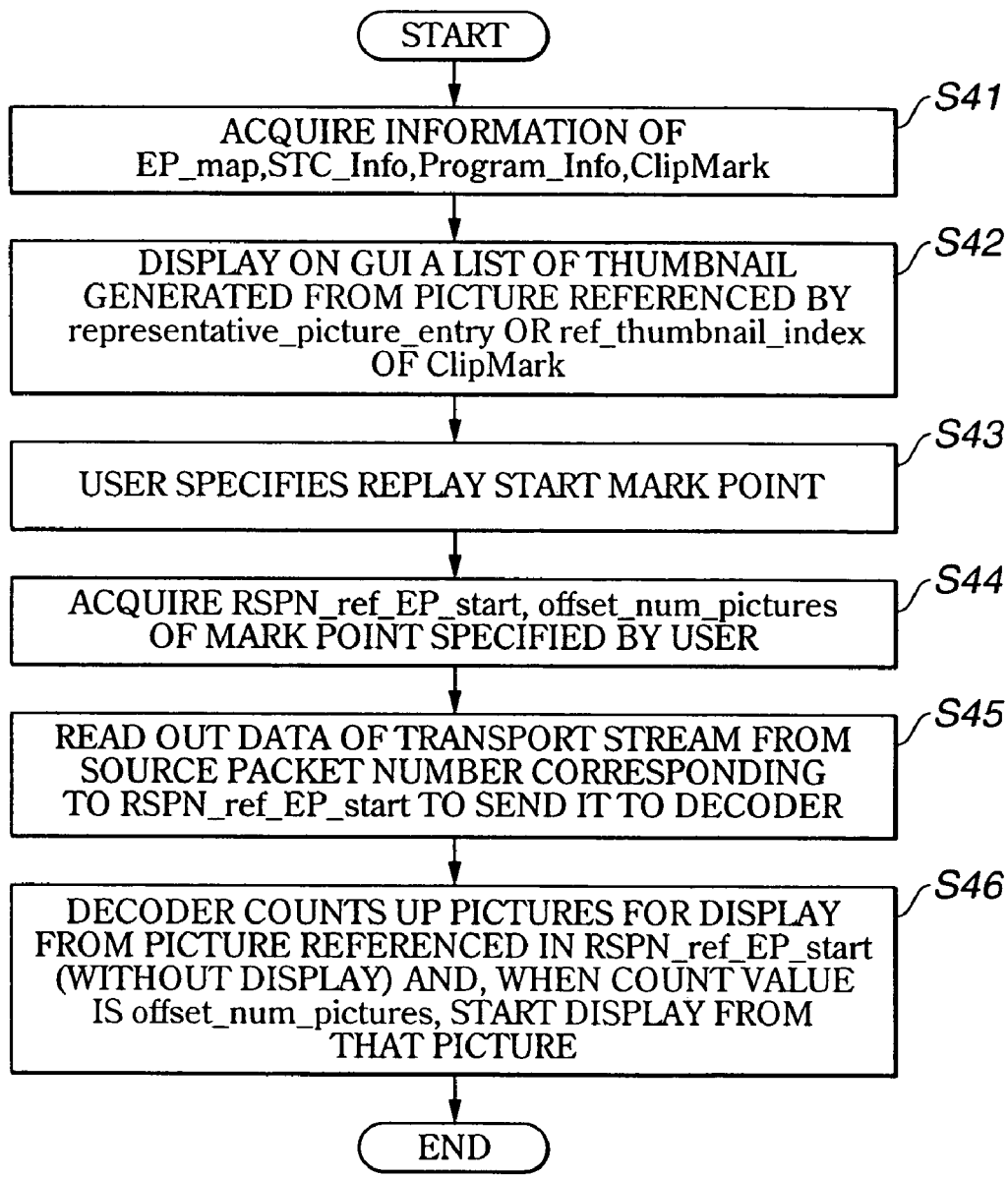
FIG. 112 is a flowchart for illustrating the indexing reproduction of a scene indicated by a mark point in case the mark_entry( )/representative_picture_entry( ) of ClipMark in FIG. 75

This method can be applied not only to CM skip reproduction but also to skip reproduction of a scene between two points specified by the ClipMark in general. * Referring to the flowchart of FIG. 112, the CM locating reproduction processing indicated by the mark point, in case mark_entry and representative_picture_entry are of the syntax structure shown in FIG. 82, is explained.

At step S41, the controller 23 acquires the information of EP_map (FIG. 70), STC_Info (FIG. 52), Program_Info (FIG. 54) and ClipMark (FIG. 78).

At step S42, the controller 23 generates a list of thumbnails from the picture referenced by the representative_picture_entry (FIG. 82) or the picture referenced by ref_thumbnail_index contained in the ClipMark (FIG. 78), read out at step S41, to display the so generated list on a menu screen. If the ref_thumbnail_index has an effective value, ref_thumbnail_index is prioritized with respect to representative_picture_entry.

At step S43, the user specifies a mark point of the replay start point. This designation is carried out e.g., by the user selecting the thumbnail picture from the menu screen displayed by the processing of step S42 to specify the mark point associated with the thumbnail.

At step S44, the controller 23 acquires the RSPN_ref_EP_start and offset_num_pictures (FIG. 82) of the mark point specified by the processing of step S43.

At step S45, the controller 23 causes data of a transport stream to be read out from the source packet number corresponding to the RSPN_ref EP_start acquired at step S44 to route it to AV decoder 27.

At step S46, the controller 23 controls the AV decoder 27 to count up the pictures to be displayed, as from the picture referenced (without displaying) by the RSPN_ref_EP_start, and starts display as from the picture corresponding to the count value of offset_num_pictures.

Figures 113, 114, 115:
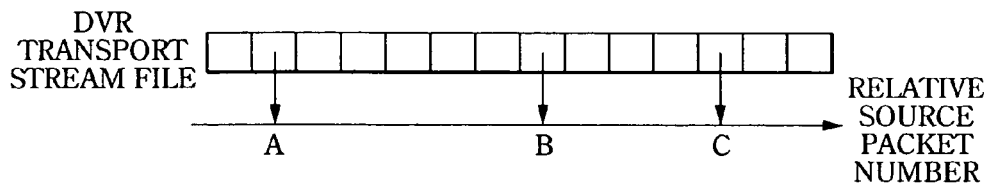
FIG. 113, continuing to FIG. 112, is a flowchart for illustrating reproduction in case the mark_entry( )/representative_picture_entry( ) of ClipMark in FIG. 75
FIG. 114 shows an example of EP_map.
FIG. 115 shows an example of ClipMark.

Referring to FIGS. 113 to 115, the above-described processing is explained further. In the present embodiment, a scene is started in the DVR transport stream file such that the CM is inserted as from the source packet number B up to the source packet C. So, PTS(A), PTS(B) and PTS(C) are registered as PTS_EP_start in the EP_map, in association with A, B and C as RSPN_EP_start, as shown in FIG. 114.

Moreover, mark_entry and representative_picture_entry are registered in association with scene start, CM start and CM end, as shown in FIG. 115. In mark_entry, A, B and C are registered as RSPN_ref_EP_start, in association with scene start, CM start and CM end, while M1, N1 and N2 are registered as offset_num_pictures. Similarly, in representative_picture_entry, M2, N1 and N2 are registered as offset_num_pictures, in association with scene start, CM start and CM end, while M1, N1 and N2 are registered as offset_num_pictures.

If locating reproduction is commanded from a picture corresponding to scene start, the decoding is started from a stream beginning from data of a packet number A to count up pictures to be displayed, as from the picture PTS(A), without displaying, to start displaying as from a picture for which offset_num_pictures has assumed the value of M1.

Figure 116:
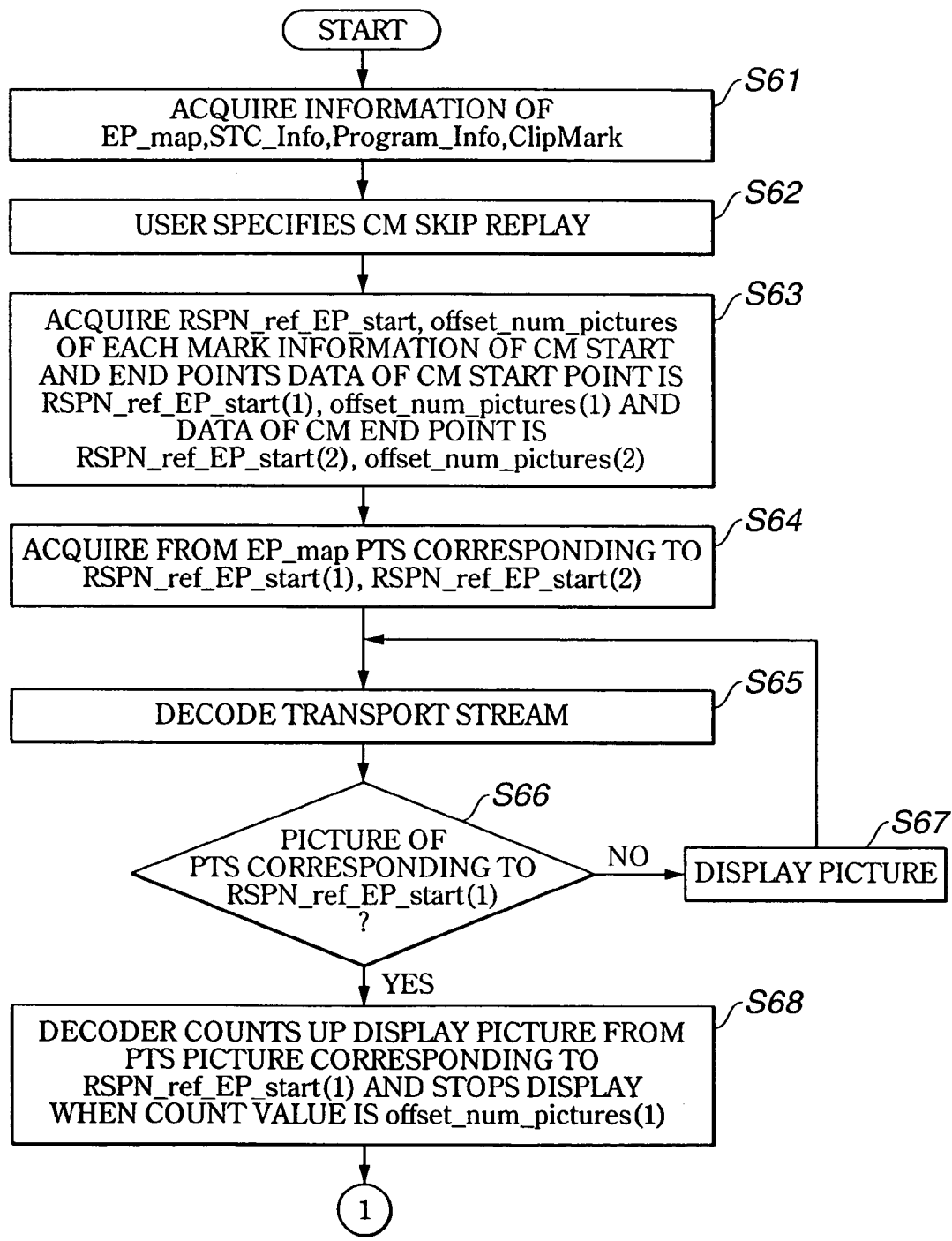
FIG. 116 is a flowchart for illustrating the CM skipping reproducing processing in case the mark_entry( )/representative_picture_entry( ) of ClipMark in FIG. 75
Figure 117:
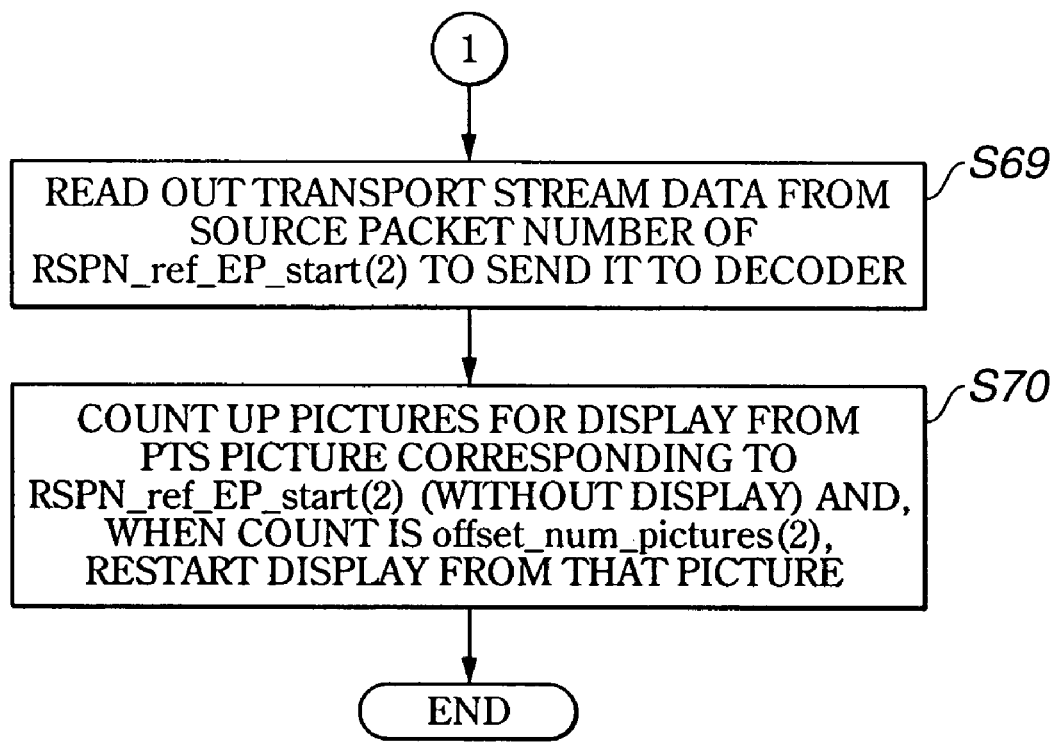
FIG. 117, continuing to FIG. 116, is a flowchart for illustrating the CM skipping reproducing processing in case the mark_entry( )/representative_picture_entry( ) of ClipMark in FIG. 75

The processing of CM skip reproduction in case the syntax of mark_entry and representative_picture_entry are of a structure shown in FIG. 82 is now explained by referring to the flowchart of FIG. 116.

At step S61, the controller 23 acquires the information on EP_map (FIG. 70), STC_Info (FIG. 52), Program_Info (FIG. 54) and ClipMark (FIG. 78).

If the user commands CM skip reproduction at step S62, the controller 23 acquires, at step S63, RSPN_ref_EP_start and offset_num_pictures (FIG. 82) as the mark information of respective points as CM start point and CM end point. The CM start point data is RSPN_ref_EP start(1) and offset_num_pictures(1), whilst the CM end point data is RSPN_ref_EP start(2) and offset_num_pictures(2).

At step S64, the controller 23 acquires PTS corresponding to RSPN_ref_EP_start(1) and RSPN_ref_EP_start(2) from EP_map (FIG. 70).

At step S65, the controller 23 causes a transport stream to be read out from the recording medium 100 to send it to the AV decoder 27.

At step S66, the controller 23 verifies whether or not the current display picture is the picture of PTS associated with RSPN_ref_EP_start(1) and RSPN_ref_EP_start(2) and, if the current picture displayed is not the picture of PTS associated with RSPN_ref_EP_start(1), it proceeds to step S67 to cause the picture to be displayed continuously. The controller 23 then reverts to step S65 to repeat the subsequent process.

If, at step S66, the current picture displayed is the picture of PTS associated with RSPN_ref_EP_start(1), the controller 23 proceeds to step S68 to control the AV decoder 27 to count up the picture displayed as from the picture of the PTS associated with RSPN_ref_EP_start(1) to halt the display when the count value is offset_num_pictures(1).

At step S69, the controller 23 causes transport stream to be read out beginning from the source packet number of RSPN_ref_EP_start(2) to route the read-out data to the AV decoder 27.

At step S70, the controller 23 counts up the picture to be displayed, as from the picture of PTS associated with the RSPN_ref_EP_start(2) (without displaying) and, when the count value is offset_num_pictures(2), the controller causes display to be started at the corresponding picture.

By way of explaining the above-described operation further by referring to FIGS. 113 to 115, the time PTS(B) and PTS(C) corresponding to the packet numbers B and C, respectively, are first obtained, based on EP_map (FIG. 114). The Clip AV stream is decoded and, when the value is N1 (FIG. 15), the display is halted.

Decoding is re-started as from the stream beginning from the data of the packet number C to count up the picture displayed, as from the picture of the PTS(C) and, when the value is N2(FIG. 115), display is re-started as from the picture.

The above processing may be applied not only to a case of CM skipping reproduction but also to reproduction of a scene with skipping between two points specified by the ClipMark.

Figure 118:
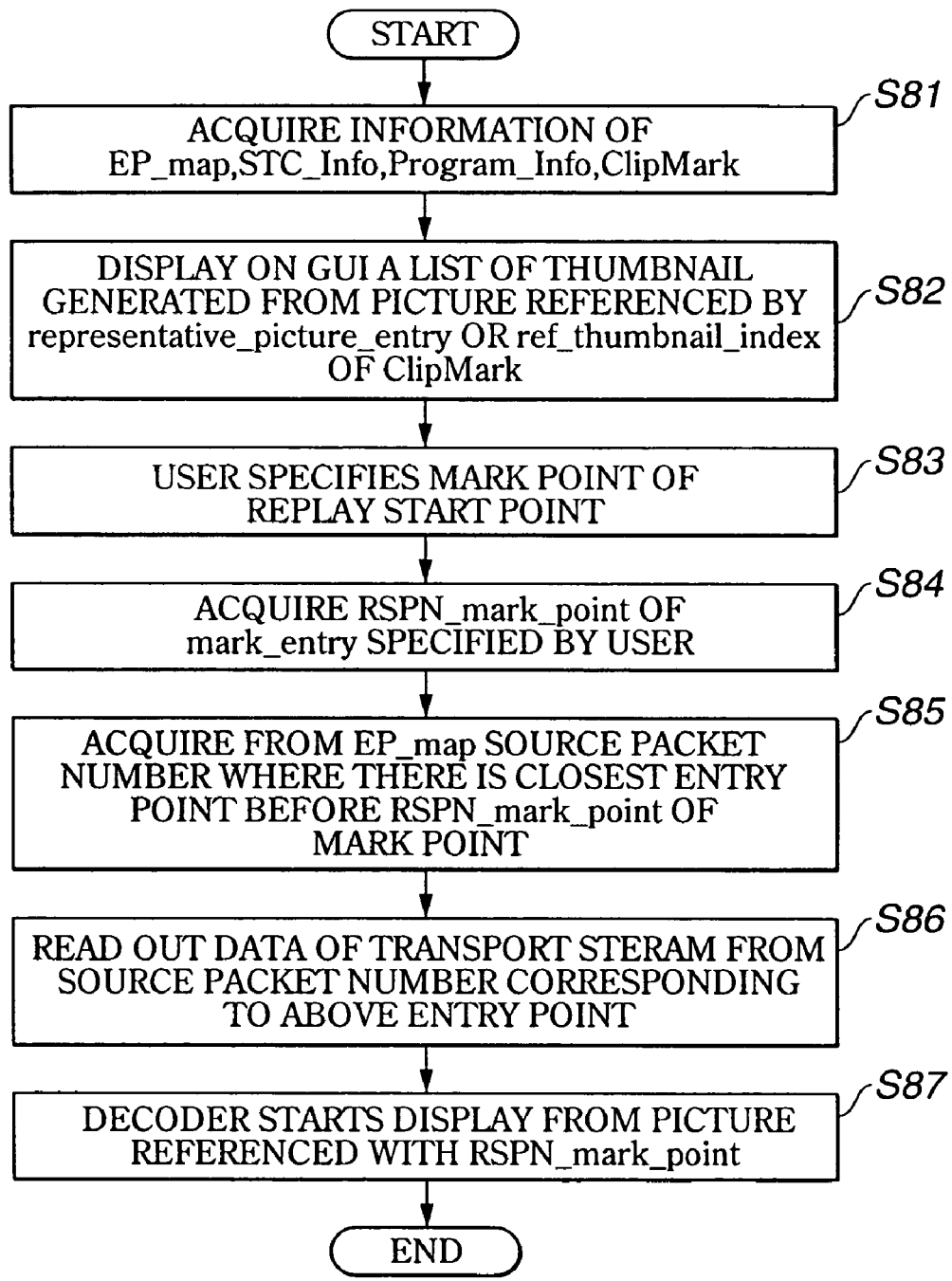
FIG. 118 is a flowchart for illustrating the indexing reproduction of a scene indicated by a mark point in case the mark_entry( )/representative_picture_entry( ) of ClipMark in FIG. 75

The processing of locating a scene specified by a mark point and reproducing the so located scene is explained with reference to the flowchart of FIG. 118 in case the syntax of mark_entry and representative_picture_entry elementary stream is as shown in FIG. 84.

At step S81, the information on EP_map (FIG. 70), STC_Info (FIG. 52), Program_Info (FIG. 54) and ClipMark (FIG. 78) is acquired.

At step S82, the controller 23 generates a list of thumbnails, referenced by representative_picture_entry or ref_thumbnail_index of ClipMark (FIG. 78) to display the so generated list as GUI menu picture. If the ref_thumbnail_index has an effective value, ref_thumbnail_index is prioritized with respect to representative_picture_entry.

At step S83, a user specifies a mark point of the reproduction start point. This designation is made as the user selects a thumbnail picture from the menu picture and specifies the mark point associated with the thumbnail.

At step S84, the controller 23 acquires the RSPN_mark_point (FIG. 84) specified by the user.

At step S85, the controller 23 acquires, from the EP_map, the source packet number of the entry point previous and closest to the RSPN_mark_point of the mark_point (FIG. 70).

At step S86, the controller 23 reads out data of the transport stream from the source packet number associated with the entry point acquired at step S85 to route the so read out data to the AV decoder 27.

At step S87, the controller 23 controls the AV decoder 27 to start display as from the picture referenced by RSPN_mark_point.

Figures 119, 120, 121:
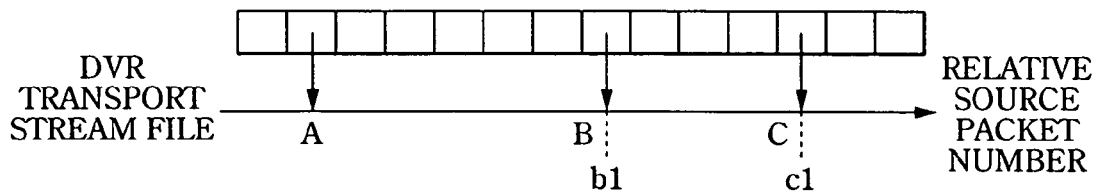
FIG. 119, continuing to FIG. 118, is a flowchart for illustrating reproduction in case the mark_entry( )/representative_picture_entry( ) of ClipMark in FIG. 75

The above-described processing is explained in more detail by referring to FIGS. 119 to 121. In the present embodiment, the DVR transport stream file is such a one in which a scene starts with the source packet and CM is inserted as from the source packet number B to the source packet number C. So, PTS_EP_start are registered as PTS(A), PTS(B) and PTS(C), in association with A, B and C as RSPN_EP_start of FIG. 120. In the ClipMark shown in FIG. 21, a1, b1 and c1 are registered as RSPN_mark_point of maker entry, while a2, b1 and c1 are registered as RSPN_mark_point of representative_picture_entry, in association with the scene start, CM start and CM end, respectively.

If, in locating a picture at a scene start for reproduction, the packet number A is such that A<a1, decoding is started as from a stream beginning from the data of the packet number A, such that display is started as from a picture corresponding to the source packet number a1.

The CM skipping reproduction processing in case the syntax of mark_entry and representative_picture_entry is as shown in FIG. 84 is now explained with reference to the flowcharts of FIGS. 122 and 123.

At step S101, the controller 23 acquires the information on EP_map (FIG. 70), STC_Info (FIG. 52), Program_Info (FIG. 54) and ClipMark (FIG. 78).

At step S102, the user specifies CM skipping reproduction.

At step S103, the controller 23 acquires the RSPN_mark_point (FIG. 84) of the mark information of each point for which the mark type (FIG. 79) is the CM start point or the CM end point. The controller 23 sets the data of the CM start point and data of the CM end point as RSPN_mark_point(1) and as RSPN_mark_point(2), respectively.

At step S104, the controller 23 causes a transport stream to be read out from the recording medium 100 to output the read out stream for decoding.

At step S105, the controller 23 verifies whether or not the current picture is a picture corresponding to RSPN_mark_point(1). If the current picture is not a picture corresponding to RSPN_mark_point(1), the controller 23 proceeds to step S106 to continue to display the picture. The processing then reverts to step S11 to repeat the subsequent process.

If, at step S105, the current display picture has been verified to be a picture associated with RSPN_mark_point(1), the processing transfers to step S107, where the controller 23 controls the AV decoder 27 to halt the decoding and display.

Then, at step S108, the source packet number previous and closest to RSPN_mark_point(2) is acquired from EP_map (FIG. 70).

At step S109, the controller 23 reads out the transport stream data from the source packet number associated with the entry point acquired at step S108 to route it to the AV decoder 27.

At step S110, the controller 23 controls the AV decoder 27 to re-start the display as from the picture referenced by RSPN_mark_point(2).

By way of explaining the above-described processing in more detail by referring to the embodiment of FIGS. 119 to 121, the Clip AV stream is decoded and display is halted at a display picture corresponding to the source packet number b1 (FIG. 21). If the source packet number C<source packet number c1, decoding is re-started as from the stream beginning from the data of the packet number C, and display is re-started as from the stream beginning from the data of the packet number c1.

As described above, a preset location is specified on the PlayList by a time stamp, which time stamp is converted in each Clip information of each Clip into a data address to have access to a preset position of the Clip AV stream.

More specifically, if a book mark or a Resume point is specified by the user as PlayList mark as time stamp on the time axis, the PlayList on reproduction may use the ClipMark of the ClipMark being referenced by the PlayList to access the scene start or end point of the Clip AV stream.

Meanwhile, the ClipMark syntax may be as shown in FIG. 126 instead of in FIG. 78.

In the present embodiment, RSPN_mark is inserted in place of reserved_for_MakerID, mark_entry( ) and representative_picture_entry of FIG. 78. The 32-bit field of this RSPN_mark denotes the relative address of the source packet containing the first byte of the access unit the mark is referencing. RSPN_mark is sized in terms of the source packet number as a unit. It is defined in the Clip Information file as from the first source packet of the AV stream file and is counted with the value of the offset_SPN as an initial value.

The structure is otherwise the same as the structure of FIG. 78.

The ClipMark syntax may further be configured as shown in FIG. 127. In the present embodiment, RSPN_ref_EP_start and offset_num_pictures are inserted in place of RSPN_mark in FIG. 126. These are similar to those shown in FIG. 82.

FIG. 128 is a flowchart for illustrating the preparation of ClipMark of the syntax shown in FIG. 81 in encoding and recording analog AV signals. Reference is made to the block diagram of FIG. 1 showing a recording and/or reproducing apparatus 1. At step S200, an analysis unit 14 analyzes input AV signals from terminals 11, 12 for detecting characteristic points, which may be exemplified by a program locating point or a scene change point designating a characteristic scene pertinent to contents of an AV stream.

At step S201, the controller 23 acquires PTS of a picture at the characteristic point. At step S202, the controller 23 stores the information on the characteristic point in ClipMark. Specifically, the information explained in connection with semantics and syntax of ClipMark of the present embodiment is stored. At step S203, the Clip Information file and the Clip AV stream file are recorded on a disc.

FIG. 129 is a flowchart for illustrating the preparation of ClipMark of the syntax of FIG. 81 in recording a transport stream input from a digital interface. Reference is had to the block diagram of the recording and/or reproducing apparatus 1 shown in FIG. 1. At step S211, the demultiplexer 26 and the controller 23 acquire the elementary stream PID of the program to be recorded. If there are plural elementary streams to be analyzed, the totality of elementary streams PIDs are acquired.

At step S212, the demultiplexer 26 separates the elementary streams from the program of the transport stream input from the terminal 13. The AV decoder 27 decodes the elementary stream into AV signals. At step S213, the analysis unit 14 analyzes the AV signals to detect characteristic points.

At step S214, the controller 23 acquires the PTS of the picture of the characteristic point and STC-sequence-id of the STC to which it belongs. Specifically, the controller 23 stores the information explained in the semantics and the syntax of the ClipMark in the present embodiment.

At step S216, the Clip information file and the Clip AV stream file are recorded on the disc.

As shown in the flowcharts of FIGS. 128 and 129, the AV stream file, that is the ClipMark for storing the mark indicating the characteristic picture in the Clip AV stream file, is recorded in the management information data file in the AV stream file, that is in the Clip Information file.

FIG. 130 is a flowchart for illustrating the preparation of RealPlayList. Reference is made to the block diagram of FIG. 1 of the recording and/or reproducing apparatus 1 for explanation. At step S221, the controller 23 records the Clip AV stream. At step S222, the controller 23 formulates PlayList( ) comprised of the PlayItem covering the totality of reproducible range of the Clip. If there is a STC discontinuous point in the Clip and PlayList( ) is made up of two or more PlayItems, connection condition between the PlayItems is also determined.

At step S223, the controller 23 creates UIAppInfoPlayList( ). At step S224, the controller 23 forms PlayListMark. At step S225, the controller 23 forms MakersPrivateData. At step S226, the controller 23 records the Real PlayList file.

So, one Real PlayList file is created every time a Clip AV stream is newly recorded.

FIG. 131 is a flowchart illustrating the formation of the Virtual PlayList. At step S231, reproduction of one Real PlayList, recorded on the disc, is specified through a user interface. From the reproduction range of the Real PlayList, the reproduction domain indicated by IN and OUT points is specified.

At step S232, the controller 23 verifies whether or not the designating processing for the reproduction range by the user has been finished in its entirety. If, at step S232, it is verified that the operation of designating the reproduction range by the user has not been finished, processing reverts to step S231 to repeat the subsequent processing. If it is verified that the operation has been finished, processing transfers to step S233.

At step S233, the connection condition (connection_condition) between two consecutively reproduced reproduction domains is determined by the user over a user interface, or by the controller 23. If the user fails to produce a sub-path, the processing at step S234 is skipped.

At step S235, the controller 23 forms PlayList( ) based on the reproduction range information specified by the user and on the connection_condition. At step S236, the controller 23 forms UIAppInfoPlayList( ). At step S237, the controller 23 forms PlayListMark. At step S238, the controller 23 forms MakerPrivateData. At step S239, the controller 23 causes the Virtual PlayList file to be recorded on the disc.

From the playback range of the RealPlayList, recorded on the disc, the user selects the playback range the or she desires to view, and one Virtual PlayList file is formed from one set of the playback ranges grouped together to another.

FIG. 132 is a flowchart for illustrating the reproduction of the PlayList. Reference is had to the block diagram of the recording and/or reproducing apparatus 1 of FIG. 1. At step S241, the controller 23 acquires Info.dvr, Clip Information file, PlayList file and the information on the thumbnail file to form a GUI picture showing a list of the PlayList recorded on the disc for demonstration on the GUI.

At step S242, the user commands the controller 23 to reproduce one PlayList through a user interface. At step S243, the controller 23 acquires a source packet number having an entry point temporally previous and closest to IN_time from the PTS of IN_time and STC-sequence-id of the current PlayItem. At step S244, the controller 23 reads out the data of the AV stream from the source packet number to route the so read-out data to the AV decoder 27.

If the PlayItem is reproduced temporally before the above-mentioned PlayItem, the controller 23 manages control at step S245 so that connection processing of display to the PlayItem will be performed in accordance with connection_condition. At step S246, the AV decoder 27 starts display as from the picture of the PTS of IN_time.

At step S247, the AV decoder 27 continuously decodes the AV stream. At step S248, the controller 23 checks whether or not the picture currently displayed is a picture of PTS of OUT_time. If it is verified at step S28 that the picture currently displayed is a picture of the PTS of OUT_time, processing transfers to step S250 and, if otherwise, to step S249.

At step S249, the processing of displaying the picture verified to be a PTS picture is executed. Then, processing reverts to step S247 to repeat the subsequent processing. On the other hand, the controller 23 at step S250 verifies whether or not the PlayItem is the last one in the current PlayList and, if the PlayItem is verified to be the last one in the current PlayList, processing of the flowchart of FIG. 132 is terminated. If the PlayItem is verified not to be the last one in the current PlayList, processing reverts to step S243 to repeat the subsequent processing.

FIG. 133 is a flowchart for illustrating the preparation of PlayListMark. Reference is made to the block diagram of FIG. 1 showing the respective apparatus 1.

At step S262, reproduction of one PlayList is commanded by the user to the controller 23. At step S263, the reproducing unit 3 starts reproducing the designated PlayList, as explained with reference to the flowchart of FIG. 132.

At step S264, the user commands the controller 23, through the user interface, the setting of a mark at a favorite scene. At step S265, the controller 23 acquires the PTS of the mark and the PlayList_id of the PlayItem to which it belongs.

At step S266, the controller 23 stores the mark information in the PlayListMark( ). At step S267, the PlayList file is recorded on the disc.

In this manner, the mark point specified by the user from the reproduction range of the PlayList, or the PlayListMark, for storing the marks specifying the resume point in reproducing the ClipMark of the Clip, is recorded on the PlayList file.

FIG. 134 is a flowchart for illustrating the locating reproduction employing the ClipMark of the Clip referenced by the PlayList and the PlayListMark in reproducing the PlayList. The syntax of ClipMark( ) is as shown in FIG. 81. Reference is made to the block diagram of FIG. 1 showing the recording and/or reproducing apparatus 1 for explanation.

At step S271, the controller 23 acquires the information of Info.dvr, Clip Information file, PlayList file and the information on the thumbnail file to create a GUI picture showing a list of PlayLists recorded on the disc for demonstration on the GUI. 61 through the user interface.

At step S272, reproduction of one PlayList is commanded by the user through a user interface. At step S273, the controller 23 displays a list of thumbnails generated from a picture referenced by the ClipMark of the Clip referenced by the PlayList through the user interface on the GUI.

At step S274, a mark point of the reproduction start point is specified to the controller 23 by the user. At step S275, the controller 23 verifies whether or not the mark selected by the processing at step S274 is the mark stored in the PlayListMark. If the selected mark is verified at step S275 to be a mark stored in the PlayListMark, processing transfers to step S276 and, if otherwise, to step S278.

At step S276, the controller 23 acquires the PTS of the mark and the PlayItem_id to which it belongs. At step S277, the controller 233 acquires the STC-sequence-id of the AV stream referenced by the PlayItem indicated by the PlayItem_id.

At step S278, the controller 23 causes the AV stream to be input to the AV. decoder 27, based on STC-sequence-id and the PTS of the mark. Specifically, the processing similar to that of steps S243 and S244 of the flowchart of FIG. 132 is performed, using the STC-sequence-id and the PTS of the mark. At step S279, the reproducing unit 3 starts display as from the picture of the PTS of the mark point.

When the PlayList is reproduced, the mark stored in the ClipMark of the Clip referenced by the PlayList can be referenced, as explained in connection with FIG. 9. Thus, if one clip is referenced by RealPlayList or plural Virtual PlayLists, these PlayLists can co-own the ClipMark of the Clip, so that mark data can be managed efficiently.

If PlayListMark and ClipMark, combined together, are defined in the PlayList, without defining the ClipMark in the Clip, and if one Clip is referenced by Real PlayList or plural PlayLists, the respective PlayLists have the ClipMark information of the same contents, thus worsening the data recording efficiency.

FIG. 135 shows another typical syntax of PlayListMark( ). Length indicates the number of bytes as from the byte directly after the length field to the last byte of the PlayListMark( ). Number_of_PlayList_marks denote the number of entries of marks stored in the PlayListMark.

Mark_invalid_flag is a one-bit flag and, if this value is set to 0, it indicates that this mark has the effective information. If the value is set to 1, it indicates that this mark is effective.

If the user has made an operation of erasing the entry of a mark on the user interface, the recording and/or reproducing apparatus 1 may change the value of the mark_invalid_flag to 1 instead of erasing the entry of the mark from the PlayMarkList.

Mark_type denotes the mark type and has the meaning shown in FIG. 136. Mark_mame_length denotes the byte length of the mark name indicated in the mark_name field. The value of this field is not larger than 32. Ref_to_PlayItem_id denotes the value of PlayItem_id specified by the PlayItem where the mark is put. The value defined in Play List( ) corresponding to a given PlayItem is defined in the PlayList( ).

Mark_time_stamp stores the time stamp indicating the point specified by the mark. Mark_time_stamp specifies the time in the reproduction range specified in IN_time and OUT_time defined in the PlayItem specified by the ref_to_PlayItem_id. The meaning of time stamp is the same as that of FIG. 44.

If entry_ES_PID is set to 0xFFFF, the mark is a pointer on the common time axis common to the totality of elementary streams used by the PlayList. If entry_ES_PID is set to a value other than 0xFFFF, entry_ES_PID denotes the value of the PID of the transport packet containing the elementary stream specified by the mark.

Ref_thumbnail_index denotes the information of the thumbnail picture appended to the mark. The meaning of the information is the same as the ref_thumbnail_index. Mark_name denotes the mark name. The number of bytes specified by the mark_name_length from left of the field is the effective character letters, and denotes the name. The character letters are encoded by a method specified by the character_set in the UIAppInfoPlayList.

The value of bytes next following the effective character letters in the mark_name field may be any value. In the case of this syntax, marks may denote the specified elementary stream. For example, if the PlayList references a multi-view program having plural video streams in the program, entry_ES_PID is used for setting the video PID denoting one video stream in the program.

It is assumed that the user is reproducing the PlayList referencing the multi-view program, and that the user is seeing one view of the multi-view. It is also assumed that the user has sent a command for skipping the reproduction to the next mark point. In such case, the recording and/or reproducing apparatus 1 should use the mark of the entry_ES_PID of the same value as the video PID of the view currently seen by the user. The recording and/or reproducing apparatus should not change the view arbitrarily. The recording and/or reproducing apparatus 1 may use the mark set on the entry_ES_PID of 0xFFFF. In this case, the view is not to be changed arbitrarily by the recording and/or reproducing apparatus 1.

FIG. 137 shows a modification of the ClipMark( ) of the syntax shown in FIG. 81. Length denotes the number of bytes as from the byte directly following the length field to the last byte of the ClipMark( ). If mark_type specifies a value from 0x60 to 0x7F, maker_ID denotes the ID of the maker who has defined the mark_type.

Number_of_Clip_marks denotes the number of entries of the marks stored in ClipMark. Mark_invalid_flag is a one-bit flag and, if its value is set to 0 or 1, it indicates that the mark has the effective information or is invalid, respectively.

If the user has made an operation of erasing an entry of a mark on the user interface, the recorder may change the value of the mark_invalid_flag to 1 instead of erasing the mark entry from the ClipMark. Mark_type indicates the mark type and has the meaning shown in FIG. 138.

Ref_to_STC_id denotes the STC-sequence-id specifying the STC-sequence where both the mark_time_stamp and representative_picture_time_stamp are located. The value of STC-sequence-id is defined in STCInfo( ). Mark_time_stamp has the same meaning as the mark_time_stamp in case of mark_entry( ) in FIG. 81.

If entry_ES_PID is set to 0xFFFF, its mark is a pointer to the time axis common to the totality of the elementary streams in the Clip. If entry_ES_PID is set to a value other than 0xFFFF, entry_ES_PID denotes the value of PID of the transport packet containing the elementary stream specified by the mark.

Ref_to_thumbnail index denotes the information of a thumbnail picture appended to the mark. Its meaning is the same as that of ref_thumbnail_index of FIG. 78. Representative_picture_time_stamp has the same meaning as that of mark_time_stamp in the case of representative_picture_entry( ) of FIG. 81.

In the case of the syntax shown in FIG. 137, the mark may indicate a particular elementary stream. For example, if Clip contains a multi-view program having plural video streams in a program, entry_ES_PID is used for setting the video PID specifying one video stream in the program.

It is assumed that the user is reproducing a PlayList referencing a multi-view program and that the user is seeing one view of the multi-view. It is also assumed that the user has sent to the recording and/or reproducing apparatus 1 a command of skipping-reproducing the next mark point. In such case, the recording and/or reproducing apparatus 1 should use the mark of entry_ES_PID, having the same value as that of the video PID of the view currently seen by the user, while the recording and/or reproducing apparatus 1 is not allowed to change the view arbitrarily. The recording and/or reproducing apparatus 1 may use the mark for which entry_ES_PID is set to 0xFFFF. In such case, the recording and/or reproducing apparatus again is not allowed to change the view at will.

Based on the above-described syntax, data structure and rule, the contents of data recorded on the recording medium 100 or the replay information can be managed appropriately to reproduce the desired data extremely readily.

With the above-described data structure, the PlayList file and the Clip Information file, for example, are separated from each other and recorded in this form. Thus, if the contents of preset PlayList or Clip are changed on editing, there is no necessity of changing other files unrelated with the file. As a result, the file contents can be changed readily while shorter time may suffice for such changing or recording.

If initially Info.dvr is read, the disc recording contents are presented to the user interface and only the PlayList file commanded for reproduction by the user and the Clip Information file pertinent thereto are read out from the disc, the user queuing time may be reduced.

If the totality of the PlayList file or the Clip Information file are formed into one file and recorded into one file, the file size is increased considerably, and hence the time needed in changing the file contents for recording is significantly larger than in the case of separating the respective files for recording. Such deficiency may be prevented from occurring by application of the present invention.

As described above, the AV stream file, that is the ClipMark for storing the mark specifying a characteristic picture in the AV stream file, is recorded in the management information data file of the AV stream, while the mark point specified by the user from the reproduction range of the PlayList, that is the object having the information on the reproduction sequence defined by the combination of the domains specified in the AV stream, or the PlayListsMark for storing the mark indicating the Resume point in reproducing the object, is recorded on the object.

By so doing, the mark stored in the ClipMark of the Clip referenced by the PlayList can be referenced in reproducing the PlayList. Therefore, these PlayLists are able to co-own one ClipMark when one Clip is referenced by the RealPlayList or plural Virtual PlayLists, so that mark data can be managed efficiency.

If, in case ClipMark is not defined in Clip, but PlayMarkList and ClipMark, combined together, are defined only in the PlayList, one Clip is referenced by Real PlayList or plural Virtual PlayLists, the respective PlayLists own the mark information of the same contents. The data recording efficiency then is low. This can be prevented from occurring by application of the present invention.

If EP_mark for storing the address of the entry point as the AV stream ancillary information and the ClipMark for storing the picture type of the mark point, such as program locating point, and the address in the AV stream of the picture, are rendered into a file and recorded in this form on the recording medium 100, the encoding information of a stream necessary for reproducing the AV file can be managed appropriately.

By this Clip Information file information, the user is able to search a scene of interest from the AV stream recorded in the recording medium 100, such as program locating point, thus facilitating the decision of the readopt position of the AV stream from the recording medium 100 responsive to the command for random access by the user or commands for special reproduction, while enabling stream decoding to be started promptly.

The above-described sequence of operations can be executed not only on a hardware but also on a software. In this case, the recording and/or reproducing apparatus 1 can be formed by a personal computer such as is shown in FIG. 139.

Referring to FIG. 139, the CPU (central processing unit) 201 executes a variety of processing operations in accordance with a program stored in a ROM (read-only memory) 202 or a program loaded from the memory unit 208 to the RAM (random-access memory) 203, in which RAM data necessary in executing a variety of operations to be performed by the CPU 201 are stored.

The CPU 201, ROM 202 and RAM 203 are interconnected over a bus 204, to which bus there is also connected an input/output interface 205.

To the input/output interface 205, there are connected an input unit 206 comprised of a keyboard and a mouse, a display made up of CRT and LCD, an output unit 207, such as a loudspeaker, a memory device 208, such as a hard disc, and a communication unit 209, made up e.g., of a modem or a terminal adapter. The communication unit 209 performs communication processing over a network.

To the input/output interface 205, there are connected a drive 210, a magnetic disc 221, an optical disc 222, a magneto-optical disc 223 or a semiconductor memory 224, as necessary, while a computer program read out therefrom are installed as necessary in the memory device 208.

The above-described sequence of operations may be executed not only on a hardware but also on a software. If the sequence of operations is to be carried out on the software, the program forming the software or a variety of programs are installed on a dedicated hardware of a computer, such that the programs are installed form a recording medium, such as a general-purpose personal computer.

Referring to FIG. 139, this recording medium may be constituted by a package medium distributed for furnishing the user with a program, in addition to a computer. The package medium may be exemplified by, for example, a magnetic disc 221 (inclusive of floppy disc), an optical disc 222 (inclusive of CD-ROM (Compact Disc-Read Only memory)

and DVD (Digital versatile Disc)), a magneto-optical disc 223 (inclusive of MD (Mini-Disc)) or a semiconductor memory 224. In addition, the recording medium is constituted by a hard disc furnished to the user as it is pre-loaded on a computer and which includes a ROM 202 or a memory 208 having the program stored therein.

In the present specification, the respective steps stating the sequence of the program furnished by a medium includes not only the processing executed chronologically in accordance with the stated order but also the processing executed in parallel or batch-wise.

The system in the present specification denotes an entire apparatus made up of plural devices.

INDUSTRIAL APPLICABILITY

In the information processing method and apparatus and the program, according to the present invention, ClipMark formed by a mark specifying a characteristic picture extracted from an input AV stream, as management information for supervising the AV stream, and PlayListMark, formed by marks pointing to a picture optionally specified by a user, from a reproduction domain corresponding to the PlayList, which defines the combination of preset domains in the AV stream, are generated, while the ClipMark and PlayListMark are recorded as respective independent tables on a recording medium. Thus, it becomes possible to access a desired location of an AV stream promptly and reliably.

Moreover, in the information processing method and apparatus and the program, according to the present invention, the management information for supervising the AV stream including ClipMark formed by marks pointing to a characteristic picture extracted from an AV stream, is read out, and PlayListMark formed by a mark pointing to a picture optionally specified by a user is read out from a reproduction domain corresponding to the PlayList which defines the combination of preset domains in the AV stream. Moreover, the management information read out by the readout step and the information by the PlayListMark are presented, the ClipMark corresponding to the PlayList commanded to be reproduced by the user is referenced from the information presented by the presentation means, and the AV stream including the ClipMark, referenced by the referencing step, is reproduced from a position corresponding to the ClipMark. Thus, it becomes again possible to access a desired location of an AV stream promptly and reliably.

The invention claimed is:

1. An information processing apparatus comprising:
generating means for generating ClipMark formed by a mark specifying a characteristic picture extracted from an input AV stream, as management information for supervising the AV stream, and for generating PlayListMark, formed by marks pointing to a picture optionally specified by a user, from a reproduction domain corresponding to a PlayList defining the combination of preset domains in said AV stream; and
recording means for recording said ClipMark and PlayListMark as respective independent tables with a predetermined format on a recording medium,
wherein the PlayList comprises a Real PlayList and a Virtual PlayList, the Real PlayList co-owning a stream portion referenced by the Real PlayList, the Virtual PlayList not co-owning a stream portion referenced by the Virtual PlayList,
wherein the PlayList comprises a plurality of playback domains represented by a pair of an IN-point and an OUT-point on a time axis, and wherein the mark stored in the ClipMark of the Clip referenced by the PlayList is capable of being a reference when the PlayList is reproduced.

2. The information processing apparatus according to claim 1
wherein said generating means generates said ClipMark and said PlayListMark as a first syntax of a ClipInformation file and as a second syntax of a PlayList file, respectively.

3. The information processing apparatus according to claim 1
wherein, in reproducing said PlayList, said mark forming the ClipMark of said AV stream corresponding to the reproduction domain of said PlayList is referenced.

4. The information processing apparatus according to claim 1
wherein said mark of the PlayListMark comprises presentation time stamp and the identification information for indicating one reproduction domain specified on said AV stream data forming the reproduction route of said PlayList.

5. The information processing apparatus according to claim 1
wherein said mark forming the ClipMark or said mark forming said PlayListMark comprises the information specifying an entry point of an elementary stream.

6. The information processing apparatus according to claim 1
wherein said mark of the PlayListMark comprises the information of the type at least including the Resume point of the start point of a favorite scene or a Resume point of the PlayList specified by a user.

7. The information processing apparatus according to claim 1
wherein said mark of the ClipMark and said mark of the PlayListMark are represented by an address of a relative source packet corresponding to an entry point of said AV stream.

8. The information processing apparatus according to claim 7
wherein said mark of the ClipMark and said mark of the PlayListMark are represented by a first address of a relative source packet corresponding to an entry point of said AV stream and by a second address of an offset from said first address, respectively.

9. The information processing apparatus according to claim 1 further comprising:
type detection means for detecting the type of said characteristic picture detected at the time of recording by said first recording means;
said first recording means recording said mark forming said ClipMark and said type as detected by said detection means.

10. The information processing apparatus according to claim 1
wherein said mark of said ClipMark comprises a scene change point, a commercial start point, commercial end point or a title displaying scene.

11. The information processing apparatus according to claim 1
wherein said PlayListMark further comprises a mark specifying a Resume point in reproducing said PlayList.

12. An information processing method comprising:
a step of generating ClipMark formed by a mark specifying a characteristic picture extracted from an input AV stream, as management information for supervising the AV stream, and of generating PlayListMark, formed by marks pointing to a picture optionally specified by a user, from a reproduction domain corresponding to a PlayList defining the combination of preset domains in said AV stream; and a step of recording said ClipMark and PlayListMark as respective independent tables with a predetermined format on a recording medium, wherein the PlayList comprises a Real PlayList and a Virtual PlayList, the Real PlayList co-owning a stream portion referenced by the Real Playlist, the Virtual PlayList not co-owning a stream portion referenced by the Virtual PlayList, wherein the PlayList comprises a plurality of playback domains represented by a pair of an IN-point and an OUT-point on a time axis, and wherein the mark stored in the ClipMark of the Clip referenced by the PlayList is capable of being a reference when the PlayList is reproduced.

13. A recording medium storing executable program, when executed, causing a computer to process information, the executable program comprising:

a step of generating ClipMark formed by a mark specifying a characteristic picture extracted from an input AV stream, as management information for supervising the AV stream, and of generating PlayListMark, formed by marks pointing to a picture optionally specified by a user, from a reproduction domain corresponding to a PlayList defining the combination of preset domains in said AV stream; and a step of recording said ClipMark and PlayListMark as respective independent tables with a predetermined format on a recording medium, wherein the PlayList comprises a Real PlayList and a Virtual PlayList, the Real PlayList co-owning a stream portion referenced by the Real Playlist, the Virtual PlayList not co-owning a stream portion referenced by the Virtual PlayList, wherein the PlayList comprises a plurality of playback domains represented by a pair of an IN-point and an OUT-point on a time axis, and wherein the mark stored in the ClipMark of the Clip referenced by the PlayList is capable of being a reference when the PlayList is reproduced.

14. An information processing apparatus for reproducing data from a recording medium having recorded thereon an AV stream, ClipMark formed by a mark pointing to a characteristic picture extracted from said AV stream, and PlayListMark, formed by a mark pointing to a picture optionally specified by a user, from a reproduction domain corresponding to a PlayList defining the combination of preset domains in said AV stream, said information processing apparatus comprising:

reproducing means for reproducing data from said recording medium; and control means for acquiring a recording position corresponding to said mark stated in the ClipMark or PlayListMark reproduced and for controlling said reproducing means responsive to the so acquired recording position, wherein the PlayList comprises a Real PlayList and a Virtual PlayList, the Real PlayList co-owning a stream portion referenced by the Real Playlist, the Virtual PlayList not co-owning a stream portion referenced by the Virtual PlayList, wherein the PlayList comprises a plurality of playback domains represented by a pair of an IN-point and an OUT-point on a time axis, and wherein the mark stored in the ClipMark of the Clip referenced by the PlayList is capable of being a reference when the PlayList is reproduced.

15. The information processing apparatus according to claim 14 further comprising:

presentation controlling means for managing control to cause a list by a thumbnail picture associated with said PlayListMark to be presented to a user.

16. The information processing apparatus according to claim 14 wherein said mark corresponding to ClipMark and said mark corresponding to said PlayListMark are represented by an address of a relative source packet corresponding to an entry point of said AV stream.

17. The information processing apparatus according to claim 14 wherein said mark of the ClipMark and said mark of the PlayListMark are represented by a first address of a relative source packet corresponding to an entry point of said AV stream and by a second address of an offset from said first address, respectively.

18. The information processing apparatus according to claim 14 wherein said mark of said ClipMark comprises a scene change point, a commercial start point, a commercial end point or a title displaying scene.

19. An information processing method for reproducing data from a recording medium having recorded thereon an AV stream, ClipMark formed by a mark pointing to a characteristic picture extracted from said AV stream, and PlayListMark, formed by a mark pointing to a picture optionally specified by a user, from a reproduction domain corresponding to a PlayList defining the combination of preset domains in said AV stream, said information processing method comprising:

a reproducing step of reproducing data from said recording medium; and a controlling step acquiring a recording position corresponding to said mark stated in the ClipMark or PlayListMark reproduced and for controlling said reproducing step responsive to the acquired recording position, wherein the PlayList comprises a Real PlayList and a Virtual PlayList, the Real PlayList co-owning a stream portion referenced by the Real Playlist, the Virtual PlayList not co-owning a stream portion referenced by the Virtual PlayList, wherein the PlayList comprises a plurality of playback domains represented by a pair of an IN-point and an OUT-point on a time axis, and wherein the mark stored in the ClipMark of the Clip referenced by the PlayList is capable of being a reference when the PlayList is reproduced.

20. A recording medium storing an executable program, when executed, causing a computer to produce data from a recording medium having recorded thereon an AV stream, ClipMark formed by a mark pointing to a characteristic picture extracted from said AV stream, and PlayListMark, formed by a mark pointing to a picture optionally specified by a user, from a reproduction domain corresponding to a PlayList defining the combination of preset domains in said AV stream, said executable program comprising:

a reproducing step of reproducing data from said recording medium; and a controlling step of acquiring a recording position corresponding to said mark stated in the ClipMark or PlayListMark reproduced and for controlling said reproducing means responsive to the acquired recording position, wherein the PlayList comprises a Real PlayList and a Virtual PlayList, the Real PlayList co-owning a stream portion referenced by the Real Playlist, the Virtual PlayList not co-owning a stream portion referenced by the Virtual PlayList, wherein the PlayList comprises a plurality of playback domains represented by a pair of an IN-point and an OUT-point on a time axis, and wherein the mark stored in the ClipMark of the Clip referenced by the PlayList is capable of being a reference when the PlayList is reproduced.

* * * * *